US012462717B2

(12) United States Patent
Ohshima et al.

(10) Patent No.: US 12,462,717 B2
(45) Date of Patent: Nov. 4, 2025

(54) DISPLAY APPARATUS AND ELECTRONIC DEVICE

(71) Applicant: SEMICONDUCTOR ENERGY LABORATORY CO., LTD., Atsugi (JP)

(72) Inventors: Kazuaki Ohshima, Kanagawa (JP); Tatsunori Inoue, Kanagawa (JP); Yusuke Koumura, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 18/684,958

(22) PCT Filed: Aug. 17, 2022

(86) PCT No.: PCT/IB2022/057686
§ 371 (c)(1),
(2) Date: Feb. 20, 2024

(87) PCT Pub. No.: WO2023/026137
PCT Pub. Date: Mar. 2, 2023

(65) Prior Publication Data

US 2024/0371306 A1 Nov. 7, 2024

(30) Foreign Application Priority Data

Aug. 26, 2021 (JP) ................................ 2021-138119

(51) Int. Cl.
*G09G 3/00* (2006.01)
*G09G 3/32* (2016.01)
*G09G 3/3233* (2016.01)

(52) U.S. Cl.
CPC ............... *G09G 3/003* (2013.01); *G09G 3/32* (2013.01); *G09G 3/3233* (2013.01);
(Continued)

(58) Field of Classification Search
CPC ........ G09G 3/003; G09G 3/32; G09G 3/3233; G09G 2300/026; G09G 2330/021; G09G 2340/0435
(Continued)

(56) References Cited

U.S. PATENT DOCUMENTS 5,600,344 A 2/1997 Sono et al.
5,907,659 A 5/1999 Yamauchi et al.
(Continued)

FOREIGN PATENT DOCUMENTS

CN 001405749 A 3/2003
CN 110506249 A 11/2019
(Continued)

OTHER PUBLICATIONS

International Search Report (Application No. PCT/IB2022/057686) Dated Nov. 15, 2022.
(Continued)

*Primary Examiner* — Mark Edwards
(74) *Attorney, Agent, or Firm* — Fish & Richardson P.C.

(57) ABSTRACT

A display apparatus with reduced power consumption is provided. The display apparatus includes a display portion including a first region and a second region, a first driver circuit corresponding to the first region, a second driver circuit corresponding to the second region, a first circuit, a second circuit, a first signal generation circuit, and a second signal generation circuit. The first circuit has a function of generating a first image signal corresponding to a first image, and the second circuit has a function of generating a second image signal corresponding to a second image. The second image contains character information. The first signal generation circuit has a function of generating a clock signal with a first frame frequency, and the second signal generation circuit has a function of generating a clock signal
(Continued)

with a second frame frequency lower than the first frame frequency. The display apparatus displays the first image on the first region with the first frame frequency when the first image signal is transmitted to the first driver circuit, and displays the second image on the second region with the second frame frequency when the second image signal is transmitted to the second driver circuit.

5 Claims, 34 Drawing Sheets

(52) U.S. Cl.
CPC . *G09G 2300/026* (2013.01); *G09G 2330/021* (2013.01); *G09G 2340/0435* (2013.01)

(58) Field of Classification Search
USPC .......................................................... 345/204
See application file for complete search history.

(56) References Cited

U.S. PATENT DOCUMENTS

| | | | | |
|---|---|---|---|---|
| 6,329,973 | B1 | 12/2001 | Akimoto et al. | |
| 7,212,193 | B2 | 5/2007 | Ueda | |
| 7,423,623 | B2 | 9/2008 | Akimoto et al. | |
| 7,928,952 | B2 | 4/2011 | Akimoto et al. | |
| 9,025,933 | B2 | 5/2015 | Hattori et al. | |
| 9,865,068 | B2 | 1/2018 | Tsurumi et al. | |
| 10,984,755 | B2 | 4/2021 | Chida | |
| 11,156,841 | B2 | 10/2021 | Ozawa | |
| 11,170,580 | B2 | 11/2021 | Nonoyama et al. | |
| 2002/0024496 | A1 | 2/2002 | Akimoto et al. | |
| 2003/0052873 | A1 | 3/2003 | Ueda | |
| 2005/0151729 | A1* | 7/2005 | Akimoto | G06F 3/147 345/98 |
| 2007/0040813 | A1* | 2/2007 | Kushler | G06F 3/0237 345/173 |
| 2011/0200302 | A1* | 8/2011 | Hattori | H04N 13/156 386/290 |
| 2015/0227248 | A1 | 8/2015 | Yamazaki et al. | |
| 2016/0301932 | A1 | 10/2016 | Kurokawa | |
| 2018/0046367 | A1* | 2/2018 | Kim | G06F 3/0485 |
| 2020/0258314 | A1 | 8/2020 | Nonoyama. et al. | |
| 2021/0080728 | A1* | 3/2021 | Ozawa | G02B 27/0172 |
| 2022/0152475 | A1 | 5/2022 | Hayakawa | |

FOREIGN PATENT DOCUMENTS

| | | | |
|---|---|---|---|
| CN | 112526749 | A | 3/2021 |
| CN | 113678191 | A | 11/2021 |
| DE | 102018103572 | | 8/2018 |
| EP | 0558056 | A | 9/1993 |
| EP | 0852371 | A | 7/1998 |
| EP | 1296309 | A | 3/2003 |
| JP | 05-241127 | A | 9/1993 |
| JP | 07-154712 | A | 6/1995 |
| JP | 11-275486 | A | 10/1999 |
| JP | 2002-209177 | A | 7/2002 |
| JP | 2003-098992 | A | 4/2003 |
| JP | 2012-060240 | A | 3/2012 |
| JP | 2013-157992 | A | 8/2013 |
| JP | 2021-047227 | A | 3/2021 |
| WO | WO-1997/011447 | | 3/1997 |
| WO | WO-2018/143028 | | 8/2018 |
| WO | WO-2018/150831 | | 8/2018 |
| WO | WO-2020/203832 | | 10/2020 |

OTHER PUBLICATIONS

Written Opinion (Application No. PCT/IB2022/057686) Dated Nov. 15, 2022.

* cited by examiner

DISPLAY APPARATUS AND ELECTRONIC DEVICE

CROSS REFERENCE TO RELATED APPLICATIONS

This application is a U.S. National Phase Application under 35 U.S.C. § 371 of International Application PCT/IB2022/057686, filed on Aug. 17, 2022, which is incorporated by reference and claims the benefit of a foreign priority application filed in Japan on Aug. 26, 2021, as Application No. 2021-138119.

TECHNICAL FIELD

One embodiment of the present invention relates to a display apparatus and an electronic device.

Note that one embodiment of the present invention is not limited to the above technical field. The technical field of the invention disclosed in this specification and the like relates to an object, a driving method, or a manufacturing method. Alternatively, one embodiment of the present invention relates to a process, a machine, manufacture, or a composition of matter. Therefore, specific examples of the technical field of one embodiment of the present invention disclosed in this specification include a semiconductor device, a display apparatus, a liquid crystal display apparatus, a light-emitting device, a power storage device, an imaging device, a memory device, a signal processing device, a processor, an electronic device, a system, a driving method thereof, a manufacturing method thereof, and a testing method thereof.

BACKGROUND ART

Display apparatuses included in electronic devices for XR (Extended Reality or Cross Reality) such as VR (Virtual Reality) or AR (Augmented Reality), mobile phones such as smartphones, tablet information terminals, laptop PCs (personal computers), and the like have undergone various improvements in recent years. For example, a display apparatus with a high screen resolution, a display apparatus with high color reproducibility (NTSC ratio), a display apparatus with a small driver circuit, and a display apparatus with reduced power consumption have been developed.

Examples of the aspect ratio of a display region of a display apparatus include 16:9, 4:3, 3:2, and 1:1. Meanwhile, contents (images (including a moving image), applications, and games) displayed on a display apparatus are not limited to the above-described ratios and can have a variety of aspect ratios. For example, moving images of a movie and the like often have an aspect ratio called CinemaScope (2.35:1); thus, in the case where an image with CinemaScope is displayed on a display apparatus with an aspect ratio of 16:9, a part that is not used for display of the image is generated. Since the part is displayed in black, the part is called a black display region, a black region, or a black band portion in some cases.

Patent Document 1 discloses a technique for displaying text information such as subtitles on black regions generated by a difference in aspect ratio between a display apparatus and an image.

REFERENCE

Patent Document

[Patent Document 1] Japanese Published Patent Application No. H11-275486

SUMMARY OF THE INVENTION

Problems to be Solved by the Invention

As described above, in the case where text information is inserted into a black region in displaying, on a display apparatus, an image having a different aspect ratio from the aspect ratio of the display apparatus, the text information needs to be generated using an image generator. The text information generated with the image generator is transferred to the display region of the display apparatus as an image signal, together with an image having a different aspect ratio from that of the display apparatus; thus a gate driver circuit operates constantly. Moreover, a timing controller is also needed to adjust the timing of inserting the text information as an image signal. Thus, the power consumption of the gate driver circuit and the timing controller is increased in some cases.

An object of one embodiment of the present invention is to provide a display apparatus in which text information is inserted into a black region in displaying, on the display apparatus, an image having a different aspect ratio from that of the display apparatus. Another object of one embodiment of the present invention is to provide a display apparatus with reduced power consumption. Another object of one embodiment of the present invention is to provide a display apparatus with a reduced circuit area. Another object of one embodiment of the present invention is to provide an electronic device including any of the display apparatuses. Another object of one embodiment of the present invention is to provide a novel display apparatus and a novel electronic device.

An object of one embodiment of the present invention is to provide an operation method of a display apparatus in which text information is inserted into a black region in displaying, on the display apparatus, an image having a different aspect ratio from that of the display apparatus. Another object of one embodiment of the present invention is to provide a novel method for operating a display apparatus.

Note that the objects of one embodiment of the present invention are not limited to the objects listed above. The objects listed above do not preclude the existence of other objects. Note that the other objects are objects that are not described in this section and will be described below. The objects that are not described in this section are derived from the description of the specification, the drawings, and the like and can be extracted as appropriate from the description by those skilled in the art. Note that one embodiment of the present invention is to achieve at least one of the objects listed above and the other objects. Note that one embodiment of the present invention does not necessarily achieve all of the objects listed above and the other objects.

Means for Solving the Problems (1)

One embodiment of the present invention is a display apparatus including a display portion including a first region and a second region, a first driver circuit corresponding to the first region, a second driver circuit corresponding to the second region, a first circuit, a second circuit, a first signal generation circuit, and a second signal generation circuit. The first circuit has a function of generating a first image signal corresponding to a first image, and the second circuit has a function of generating a second image signal corresponding to a second image. Note that the second image contains a character string. The first signal generation circuit has a function of generating a clock signal with a first frame frequency, and the second signal generation circuit has a function of generating a clock signal with a second frame frequency. Note that the first frame frequency is higher than the second frame frequency. The display apparatus has a function of displaying the first image on the first region with the first frame frequency when the first image signal is transmitted to the first driver circuit, and a function of displaying the second image on the second region with the second frame frequency when the second image signal is transmitted to the second driver circuit.

(2)

In the above (1), in another embodiment of the present invention, a first region and a center portion of the display portion may include a region overlapping with each other. The center portion of the display portion is a circular region having an intersection portion of two diagonal lines of the display portion as a center and a radius of L/64 or less. In addition, L is a length of the diagonal line (diagonal size) of the display portion.

(3)

Another embodiment of the present invention is an electronic device including the display apparatus in the above (1) or (2), a sound input portion, a conversion portion, and an image generation portion. The sound input portion has a function of obtaining an external sound. The conversion portion has a function of generating text information corresponding to the external sound. The image generation portion has a function of generating data of the second image containing a character string corresponding to the text information. The second circuit has a function of obtaining the data and generating the second image signal corresponding to the second image.

(4)

Another embodiment of the present invention is an electronic device including the display apparatus in the above (1) or (2), a sensor, a conversion portion, and an image generation portion. The sensor has a function of capturing movement of a person or an object. The conversion portion has a function of generating text information corresponding to the content captured by the sensor. The image generation portion has a function of generating data of the second image containing a character string corresponding to the text information. The second circuit has a function of obtaining the data and generating the second image signal corresponding to the second image.

(5)

Another embodiment of the present invention is an electronic device including the display apparatus in the above (1) or (2), an antenna, a conversion portion, and an image generation portion. The antenna has a function of receiving notification information from an external device. The conversion portion has a function of generating text information corresponding to the notification information received by the antenna. The image generation portion has a function of generating data of the second image containing a character string corresponding to the text information. The second circuit has a function of obtaining the data and generating the second image signal corresponding to the second image.

Effect of the Invention

One embodiment of the present invention can provide a display apparatus in which text information is inserted into a black region in displaying, on the display apparatus, an image having a different aspect ratio from that of the display apparatus. Another embodiment of the present invention can provide a display apparatus with reduced power consumption. Another embodiment of the present invention can provide a display apparatus with a reduced circuit area. Another embodiment of the present invention can provide an electronic device including any of the display apparatuses. Another embodiment of the present invention can provide a novel display apparatus and a novel electronic device.

An embodiment of the present invention can provide an operation method of a display apparatus in which text information is inserted into a black region in displaying, on the display apparatus, an image having a different aspect ratio from that of the display apparatus. Another embodiment of the present invention can provide a novel method for operating a display apparatus.

Note that the effects of one embodiment of the present invention are not limited to the effects listed above. The effects listed above do not preclude the existence of other effects. Note that the other effects are effects that are not described in this section and will be described below. The effects that are not described in this section are derived from the description of the specification, the drawings, and the like and can be extracted as appropriate from the description by those skilled in the art. Note that one embodiment of the present invention has at least one of the effects listed above and the other effects. Accordingly, depending on the case, one embodiment of the present invention does not have the effects listed above in some cases.

MODE FOR CARRYING OUT THE INVENTION

Figure 1A:
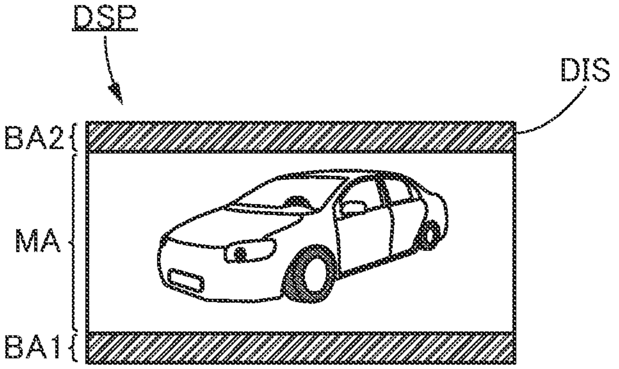
FIG. 1A to FIG. 1C are diagrams illustrating an example of an image displayed on a display apparatus.

In this specification and the like, a semiconductor device refers to a device that utilizes semiconductor characteristics, and means a circuit including a semiconductor element (e.g., a transistor, a diode, and a photodiode), or a device including the circuit. The semiconductor device also means all devices that can function by utilizing semiconductor characteristics. For example, an integrated circuit, a chip including an integrated circuit, and an electronic component including a chip in a package are each an example of the semiconductor device. Moreover, a memory device, a display apparatus, a light-emitting apparatus, a lighting device, an electronic device, and the like themselves are semiconductor devices or include semiconductor devices in some cases.

In the case where there is description "X and Y are connected" in this specification and the like, the case where X and Y are electrically connected, the case where X and Y are functionally connected, and the case where X and Y are directly connected are regarded as being disclosed in this specification and the like. Accordingly, without being limited to a predetermined connection relation, for example, a connection relation shown in drawings or texts, a connection relation other than one shown in drawings or texts is regarded as being disclosed in the drawings or the texts. Each of X and Y denotes an object (e.g., a device, an element, a circuit, a wiring, an electrode, a terminal, a conductive film, or a layer).

For example, in the case where X and Y are electrically connected, one or more elements that allow electrical connection between X and Y (e.g., a switch, a transistor, a capacitor, an inductor, a resistor, a diode, a display device, a light-emitting device, and a load) can be connected between X and Y. Note that a switch has a function of being controlled to be turned on or off. That is, the switch has a function of being in a conducting state (on state) or a non-conducting state (off state) to control whether current flows or not.

For example, in the case where X and Y are functionally connected, one or more circuits that allow functional connection between X and Y (e.g., a logic circuit (e.g., an inverter, a NAND circuit, or a NOR circuit); a signal converter circuit (e.g., a digital-analog converter circuit, an analog-digital converter circuit, or a gamma correction circuit); a potential level converter circuit (e.g., a power supply circuit such as a step-up circuit or a step-down circuit, or a level shifter circuit for changing the potential level of a signal); a voltage source; a current source; a switching circuit; an amplifier circuit (e.g., a circuit that can increase signal amplitude, the amount of current, or the like, an operational amplifier, a differential amplifier circuit, a source follower circuit, or a buffer circuit); a signal generation circuit; a memory circuit; or a control circuit) can be connected between X and Y. For instance, even if another circuit is provided between X and Y, X and Y are regarded as being functionally connected when a signal output from X is transmitted to Y.

Note that an explicit description "X and Y are electrically connected" includes the case where X and Y are electrically connected (i.e., the case where X and Y are connected with another element or another circuit provided therebetween) and the case where X and Y are directly connected (i.e., the case where X and Y are connected without another element or another circuit provided therebetween).

This specification describes a circuit structure in which a plurality of elements are electrically connected to a wiring (a wiring for supplying a constant potential or a wiring for transmitting a signal). For example, in the case where X is directly connected to a wiring and Y is directly connected to the wiring, this specification may describe that X and Y are directly electrically connected to each other.

It can be expressed as, for example, "X, Y, a source (sometimes called one of a first terminal and a second terminal) of a transistor, and a drain (sometimes called the other of the first terminal and the second terminal) of the transistor are electrically connected to each other, and X, the source of the transistor, the drain of the transistor, and Y are electrically connected to each other in this order". Alternatively, it can be expressed as "a source of a transistor is electrically connected to X; a drain of the transistor is electrically connected to Y; and X, the source of the transistor, the drain of the transistor, and Y are electrically connected to each other in this order". Alternatively, it can be expressed as "X is electrically connected to Y through a source and a drain of a transistor, and X, the source of the transistor, the drain of the transistor, and Y are provided in this connection order". When the connection order in a circuit structure is defined by an expression similar to the above examples, a source and a drain of a transistor can be distinguished from each other to specify the technical scope. Note that these expressions are examples and the expression is not limited to these expressions. Here, each of X and Y denotes an object (e.g., a device, an element, a circuit, a wiring, an electrode, a terminal, a conductive film, or a layer).

Even when independent components are electrically connected to each other in a circuit diagram, one component has functions of a plurality of components in some cases. For example, when part of a wiring also functions as an electrode, one conductive film has both functions of a wiring and an electrode. Thus, electrical connection in this specification includes, in its category, such a case where one conductive film has functions of a plurality of components.

In this specification and the like, a "resistor" can be, for example, a circuit element having a resistance value higher than 0Ω or a wiring having a resistance value higher than 0Ω. Therefore, in this specification and the like, a "resistor" includes a wiring having a resistance value, a transistor in which current flows between a source and a drain, a diode, and a coil. Thus, the term "resistor" can be sometimes replaced with the terms "resistance", "load", "region having a resistance value", or the like. Conversely, the term "resistor", "load", or "region having a resistance value" can be sometimes replaced with the term "resistor". The resistance value can be, for example, preferably higher than or equal to 1 mΩ and lower than or equal to 10Ω, further preferably higher than or equal to 5 mΩ and lower than or equal to 5Ω still further preferably higher than or equal to 10 mΩ and lower than or equal to 1Ω. As another example, the resistance value may be higher than or equal to 1Ω and lower than or equal to $1\times10^9$Ω.

In this specification and the like, a "capacitor" can be, for example, a circuit element having an electrostatic capacitance value higher than 0 F, a region of a wiring having an electrostatic capacitance value higher than 0 F, parasitic capacitance, or gate capacitance of a transistor. The term "capacitor", "parasitic capacitance", or "gate capacitance" can be replaced with the term "capacitance" in some cases. Conversely, the term "capacitance" can be replaced with the term "capacitor", "parasitic capacitance", or "gate capacitance" in some cases. In addition, a "capacitor" (including a "capacitor" with three or more terminals) includes an insulator and a pair of conductors between which the insulator is interposed. Thus, the term "pair of conductors" of "capacitor" can be replaced with "pair of electrodes", "pair of conductive regions", "pair of regions", or "pair of terminals". In addition, the terms "one of a pair of terminals" and "the other of the pair of terminals" are referred to as a first terminal and a second terminal, respectively, in some cases. Note that the electrostatic capacitance value can be higher than or equal to 0.05 fF and lower than or equal to 10 pF, for example. For another example, the electrostatic capacitance value may be higher than or equal to 1 pF and lower than or equal to 10 μF.

In this specification and the like, a transistor includes three terminals called a gate, a source, and a drain. The gate is a control terminal for controlling the conducting state of the transistor. Two terminals functioning as the source and the drain are input/output terminals of the transistor. One of the two input/output terminals serves as the source and the other serves as the drain on the basis of the conductivity type (n-channel type or p-channel type) of the transistor and the levels of potentials applied to the three terminals of the transistor. Thus, the terms "source" and "drain" can sometimes be replaced with each other in this specification and the like. In this specification and the like, expressions "one of a source and a drain" (or a first electrode or a first terminal) and "the other of the source and the drain" (or a second electrode or a second terminal) are used in description of the connection relation of a transistor. Depending on the transistor structure, a transistor may include a back gate in addition to the above three terminals. In that case, in this specification and the like, one of the gate and the back gate of the transistor may be referred to as a first gate and the other of the gate and the back gate of the transistor may be referred to as a second gate. Moreover, the terms "gate" and "back gate" can be replaced with each other in one transistor in some cases. In the case where a transistor includes three or more gates, the gates may be referred to as a first gate, a second gate, and a third gate in this specification and the like.

In this specification and the like, for example, a transistor with a multi-gate structure having two or more gate electrodes can be used as the transistor. With the multi-gate structure, channel formation regions are connected in series; accordingly, a plurality of transistors are connected in series. Thus, with the multi-gate structure, the amount of off-state current can be reduced, and the withstand voltage of the transistor can be increased (the reliability can be improved). Alternatively, with the multi-gate structure, drain-source current does not change very much even if drain-source voltage changes at the time of an operation in a saturation region, so that a flat slope of voltage-current characteristics can be obtained. By utilizing the flat slope of the voltage-current characteristics, an ideal current source circuit or an active load having an extremely high resistance value can be obtained. Accordingly, a differential circuit, a current mirror circuit, and the like having excellent properties can be obtained.

In this specification and the like, circuit elements such as a "light-emitting device" and a "light-receiving device" sometimes have polarities called an "anode" and a "cathode". In the case of a "light-emitting device", the "light-emitting device" can sometimes emit light when a forward bias is applied (a positive potential with respect to a "cathode" is applied to an "anode"). In the case of a "light-receiving device", current is sometimes generated between an "anode" and a "cathode" when a zero bias or a reverse bias is applied (a negative potential with respect to a "cathode" is applied to an "anode") and the "light-receiving device" is irradiated with light. As described above, an "anode" and a "cathode" are sometimes regarded as input/output terminals of the circuit elements such as a "light-emitting device" and a "light-receiving device". In this specification and the like, an "anode" and a "cathode" of the circuit element such as a "light-emitting device" or a "light-receiving device" are sometimes called terminals (a first terminal, a second terminal, and the like). For example, one of an "anode" and a "cathode" is called a first terminal and the other of the "anode" and the "cathode" is called a second terminal in some cases.

The case where a single circuit element is illustrated in a circuit diagram may include a case where the circuit element includes a plurality of circuit elements. For example, the case where a single resistor is illustrated in a circuit diagram may include a case where two or more resistors are electrically connected to each other in series. For another example, the case where a single capacitor is illustrated in a circuit diagram may include a case where two or more capacitors are electrically connected to each other in parallel. For another example, the case where a single transistor is illustrated in a circuit diagram may include a case where two or more transistors are electrically connected to each other in series and their gates are electrically connected to each other. Similarly, for another example, the case where a single switch is illustrated in a circuit diagram may include a case where the switch includes two or more transistors which are electrically connected to each other in series or in parallel and whose gates are electrically connected to each other.

In this specification and the like, a node can be referred to as a terminal, a wiring, an electrode, a conductive layer, a conductor, or an impurity region depending on the circuit structure and the device structure. Furthermore, a terminal or a wiring can be referred to as a node.

In this specification and the like, "voltage" and "potential" can be replaced with each other as appropriate. "Voltage" refers to a potential difference from a reference potential, and when the reference potential is a ground potential, for example, "voltage" can be replaced with "potential". Note that the ground potential does not necessarily mean 0 V. Moreover, potentials are relative values, and, for example, a potential supplied to a wiring, a potential applied to a circuit or the like, and a potential output from a circuit or the like change with a change of the reference potential.

In this specification and the like, the terms "high-level potential" and "low-level potential" do not mean a particular potential. For example, in the case where two wirings are both described as "functioning as a wiring for supplying a high-level potential", the levels of the high-level potentials supplied from the wirings are not necessarily equal to each other. Similarly, in the case where two wirings are both described as "functioning as a wiring for supplying a low-level potential", the levels of the low-level potentials supplied from the wirings are not necessarily equal to each other.

"Current" means a charge transfer phenomenon (electrical conduction); for example, the description "electrical conduction of positively charged particles occurs" can be rephrased as "electrical conduction of negatively charged particles occurs in the opposite direction". Therefore, unless otherwise specified, "current" in this specification and the like refers to a charge transfer phenomenon (electrical conduction) accompanied by carrier movement. Examples of a carrier here include an electron, a hole, an anion, a cation, and a complex ion, and the type of carrier differs between current flow systems (e.g., a semiconductor, a metal, an electrolyte solution, and a vacuum). The "direction of current" in a wiring or the like refers to the direction in which a carrier with a positive charge moves, and the amount of current is expressed as a positive value. In other words, the direction in which a carrier with a negative charge moves is opposite to the direction of current, and the amount of current is expressed as a negative value. Thus, in the case where the polarity of current (or the direction of current) is not specified in this specification and the like, the description "current flows from element A to element B" can be rephrased as "current flows from element B to element A". The description "current is input to element A" can be rephrased as "current is output from element A".

Ordinal numbers such as "first", "second", and "third" in this specification and the like are used to avoid confusion among components. Thus, the ordinal numbers do not limit the number of components. In addition, the ordinal numbers do not limit the order of components. In this specification and the like, for example, a "first" component in one embodiment can be referred to as a "second" component in other embodiments or the scope of claims. For another example, a "first" component in one embodiment in this specification and the like can be omitted in other embodiments or the scope of claims.

In this specification and the like, the terms for describing positioning, such as "over" and "under", are sometimes used for convenience to describe the positional relation between components with reference to drawings. The positional relation between components is changed as appropriate in accordance with the direction in which the components are described. Thus, the positional relation is not limited to the terms described in the specification and the like, and can be described with another term as appropriate depending on the situation. For example, the expression "an insulator positioned over (on) the top surface of a conductor" can be replaced with the expression "an insulator positioned under (on) a bottom surface of a conductor" when the direction of a drawing showing these components is rotated by 180°.

Furthermore, the terms "over" and "under" do not necessarily mean that a component is placed directly over or directly under and in direct contact with another component. For example, the expression "electrode B over insulating layer A" does not necessarily mean that the electrode B is formed over and in direct contact with the insulating layer A, and does not exclude the case where another component is provided between the insulating layer A and the electrode B. Similarly, for example, the expression "electrode B above insulating layer A" does not necessarily mean that the electrode B is formed above and in direct contact with the insulating layer A, and does not exclude the case where another component is provided between the insulating layer A and the electrode B. Similarly, for example, the expression "electrode B under insulating layer A" does not necessarily mean that the electrode B is formed under and in direct contact with the insulating layer A, and does not exclude the case where another component is provided between the insulating layer A and the electrode B.

In this specification and the like, components arranged in a matrix and their positional relation are sometimes described using terms such as "row" and "column". The positional relation between components is changed as appropriate in accordance with the direction in which the components are described. Thus, the positional relation is not limited to the terms described in the specification and the like, and can be described with another term as appropriate depending on the situation. For example, the term "row direction" can be replaced with the term "column direction" when the direction of the diagram is rotated by 90°.

In this specification and the like, the terms "film" and "layer" can be interchanged with each other depending on the situation. For example, the term "conductive layer" can be changed into the term "conductive film" in some cases. For another example, the term "insulating film" can be changed into the term "insulating layer" in some cases. Alternatively, the terms "film" and "layer" are not used and can be interchanged with another term depending on the case or the situation. For example, the term "conductive layer" or "conductive film" can be changed into the term "conductor" in some cases. For another example, the term "insulating layer" or "insulating film" can be changed into the term "insulator" in some cases.

In this specification and the like, the terms "electrode", "wiring", "terminal", and the like do not limit the functions of such components. For example, an "electrode" is used as part of a "wiring" in some cases, and vice versa. Furthermore, the term "electrode" or "wiring" also includes, for example, the case where a plurality of "electrodes" or "wirings" are formed in an integrated manner. For example, a "terminal" is used as part of a "wiring" or an "electrode"

in some cases, and vice versa. Furthermore, the term "terminal" also includes the case where a plurality of "electrodes", "wirings" or "terminals" are formed in an integrated manner, for example. Therefore, for example, an "electrode" can be part of a "wiring" or a "terminal", and a "terminal" can be part of a "wiring" or an "electrode". Moreover, the term "electrode", "wiring", or "terminal" is sometimes replaced with the term "region" depending on the case.

In this specification and the like, the terms "wiring", "signal line", and "power supply line" can be interchanged with each other depending on the case or the situation. For example, the term "wiring" can be changed into the term "signal line" in some cases. As another example, the term "wiring" can be changed into the term "power supply line" or the like in some cases. Conversely, the term "signal line" or "power supply line" can be changed into the term "wiring" in some cases. The term "power supply line" can be changed into the term "signal line" in some cases. Conversely, the term "signal line" can be changed into the term "power supply line" in some cases. The term "potential" that is applied to a wiring can be changed into the term "signal" depending on the case or the situation. Conversely, the term "signal" can be changed into the term "potential" in some cases.

In this specification and the like, a metal oxide is an oxide of a metal in a broad sense. Metal oxides are classified into an oxide insulator, an oxide conductor (including a transparent oxide conductor), an oxide semiconductor (also simply referred to as an OS), and the like. For example, in the case where a metal oxide is included in a channel formation region of a transistor, the metal oxide is referred to as an oxide semiconductor in some cases. That is, when a metal oxide can form a channel formation region of a transistor that has at least one of an amplifying function, a rectifying function, and a switching function, the metal oxide can be referred to as a metal oxide semiconductor. In the case where an OS transistor is mentioned, the OS transistor can also be referred to as a transistor including a metal oxide or an oxide semiconductor.

In this specification and the like, a metal oxide containing nitrogen is also collectively referred to as a metal oxide in some cases. A metal oxide containing nitrogen may be called a metal oxynitride.

In this specification and the like, an impurity in a semiconductor refers to, for example, an element other than a main component of a semiconductor layer. For example, an element with a concentration of lower than 0.1 atomic % is an impurity. When an impurity is contained, for example, at least one of an increase in the density of defect states in a semiconductor, a decrease in carrier mobility, and a decrease in crystallinity occurs in some cases. In the case where the semiconductor is an oxide semiconductor, examples of an impurity that changes characteristics of the semiconductor include Group 1 elements, Group 2 elements, Group 13 elements, Group 14 elements, Group 15 elements, and transition metals other than the main components; specific examples are hydrogen (contained also in water), lithium, sodium, silicon, boron, phosphorus, carbon, and nitrogen. Specifically, in the case where the semiconductor is a silicon layer, examples of an impurity that changes characteristics of the semiconductor include Group 1 elements, Group 2 elements, Group 13 elements, and Group 15 elements (except oxygen and hydrogen).

In this specification and the like, a switch has a function of being in a conducting state (on state) or a non-conducting state (off state) to control whether current flows or not. Alternatively, a switch has a function of selecting and changing a current path. Thus, a switch may have two terminals or three or more terminals through which current flows, in addition to a control terminal. For example, an electrical switch or a mechanical switch can be used. That is, a switch can be any element capable of controlling a current, and is not limited to a particular element.

Examples of an electrical switch include a transistor (e.g., a bipolar transistor and a MOS transistor), a diode (e.g., a PN diode, a PIN diode, a Schottky diode, a MIM (Metal Insulator Metal) diode, a MIS (Metal Insulator Semiconductor) diode, and a diode-connected transistor), and a logic circuit in which such elements are combined. Note that in the case of using a transistor as a switch, a "conducting state" of the transistor refers to a state where a source electrode and a drain electrode of the transistor can be regarded as being electrically short-circuited or a state where current can flow between the source electrode and the drain electrode. Furthermore, a "non-conducting state" of the transistor refers to a state where the source electrode and the drain electrode of the transistor can be regarded as being electrically disconnected. Note that in the case where a transistor operates just as a switch, there is no particular limitation on the polarity (conductivity type) of the transistor.

An example of a mechanical switch is a switch using a MEMS (micro electro mechanical systems) technology. Such a switch includes an electrode that can be moved mechanically and controls conduction and non-conduction with movement of the electrode.

In this specification and the like, a device formed using a metal mask or an FMM (fine metal mask, high-resolution metal mask) may be referred to as a device having an MM (metal mask) structure. In this specification and the like, a device formed without using a metal mask or an FMM may be referred to as a device having an MML (metal maskless) structure.

In this specification and the like, a structure in which light-emitting layers in light-emitting devices of different colors (here, blue (B), green (G), and red (R)) are separately formed or separately patterned may be referred to as an SBS (Side By Side) structure. In this specification and the like, a light-emitting device capable of emitting white light may be referred to as a white-light-emitting device. Note that a combination of white-light-emitting devices with coloring layers (e.g., color filters) enables a full-color display apparatus.

Light-emitting devices can be classified roughly into a single structure and a tandem structure. A device with a single structure includes one light-emitting unit between a pair of electrodes, and the light-emitting unit preferably includes one or more light-emitting layers. When white light emission is obtained using two light-emitting layers, the two light-emitting layers are selected such that emission colors of the light-emitting layers are complementary colors. For example, when an emission color of a first light-emitting layer and an emission color of a second light-emitting layer are complementary colors, a light-emitting device can be configured to emit white light as a whole. When white light emission is obtained using three or more light-emitting layers, a light-emitting device is configured to emit white light as a whole by combining emission colors of the three or more light-emitting layers.

A device with a tandem structure includes two or more light-emitting units between a pair of electrodes, and each light-emitting unit preferably includes one or more light-emitting layers. To obtain white light emission, the structure is made such that light from light-emitting layers of the plurality of light-emitting units can be combined to be white light. Note that a structure for obtaining white light emission is similar to that in the case of a single structure. In the device with a tandem structure, an intermediate layer such as a charge-generation layer is preferably provided between the plurality of light-emitting units.

When the above white-light-emitting device (having a single structure or a tandem structure) and the above light-emitting device having an SBS structure are compared to each other, the light-emitting device having an SBS structure can have lower power consumption than the white-light-emitting device. The light-emitting device having an SBS structure is suitably used in the case where the power consumption is required to be low. Meanwhile, the white-light-emitting device is suitable in terms of lower manufacturing cost or higher manufacturing yield because the manufacturing process of the white-light-emitting device is simpler than that of the light-emitting device having an SBS structure.

In this specification, "parallel" indicates a state where two straight lines are placed at an angle greater than or equal to −10° and less than or equal to 10°. Thus, the case where the angle is greater than or equal to −5° and less than or equal to 5° is also included. In addition, "approximately parallel" or "substantially parallel" indicates a state where two straight lines are placed at an angle greater than or equal to −30° and less than or equal to 30°. Moreover, "perpendicular" indicates a state where two straight lines are placed at an angle greater than or equal to 80° and less than or equal to 100°. Thus, the case where the angle is greater than or equal to 85° and less than or equal to 95° is also included. Furthermore, "approximately perpendicular" or "substantially perpendicular" indicates a state where two straight lines are placed at an angle greater than or equal to 60° and less than or equal to 120°.

In this specification and the like, one embodiment of the present invention can be constituted by appropriately combining a structure described in an embodiment with any of the structures described in the other embodiments. In addition, in the case where a plurality of structure examples are described in one embodiment, the structure examples can be combined as appropriate.

Note that a content (or part of the content) described in one embodiment can be applied to, combined with, or replaced with at least one of another content (or part of the content) in the embodiment and a content (or part of the content) described in one or a plurality of different embodiments.

Note that in each embodiment, a content described in the embodiment is a content described using a variety of diagrams or a content described with text disclosed in the specification.

Note that by combining a diagram (or part thereof) described in one embodiment with at least one of another part of the diagram, a different diagram (or part thereof) described in the embodiment, and a diagram (or part thereof) described in one or a plurality of different embodiments, much more diagrams can be provided.

Embodiments described in this specification are described with reference to the drawings. Note that the embodiments can be implemented in many different modes, and it will be readily appreciated by those skilled in the art that modes and details can be changed in various ways without departing from the spirit and scope thereof. Therefore, the present invention should not be interpreted as being limited to the description in the embodiments. Note that in the structures of the invention in the embodiments, the same portions or portions having similar functions are denoted by the same reference numerals in different drawings, and repeated description thereof is omitted in some cases. In perspective views and the like, description of some components may be omitted for clarity of the drawings.

In this specification and the like, when a plurality of components are denoted with the same reference numerals, and in particular need to be distinguished from each other, an identification sign such as "_1", "[n]", or "[m,n]" is sometimes added to the reference numerals. Components denoted with identification signs such as "_1", "[n]", and "[m,n]" in the drawings and the like are sometimes described without such identification signs in this specification and the like when the components do not need to be distinguished from each other.

In the drawings in this specification, the size, the layer thickness, or the region is exaggerated for clarity in some cases. Therefore, they are not limited to the illustrated scale. The drawings are schematic views showing ideal examples, and embodiments of the present invention are not limited to shapes, values, or the like shown in the drawings. For example, variations in signal, voltage, or current due to noise, variations in signal, voltage, or current due to difference in timing, or the like can be included.

Embodiment 1

In this embodiment, a display apparatus of one embodiment of the present invention and an operation method of the display apparatus will be described.

Structure Example

FIG. 1A illustrates a display apparatus DSP of one embodiment of the present invention and a display portion DIS included in the display apparatus DSP. FIG. 1A illustrates an automobile displayed on the display portion DIS as an example. FIG. 1A illustrates a state where an image having a different aspect ratio from the aspect ratio of the display apparatus DSP is displayed on the display portion DIS.

In this specification and the like, when the ratio of the number of pixels in the row direction to the number of pixels in the column direction of the display apparatus DSP illustrated in FIG. 1A is expressed by X/Y (X and Y are real numbers of positives excluding 0 and X is greater than or equal to Y), the aspect ratio of the display apparatus DSP is denoted by X:Y.

The aspect ratio of the image displayed on the display portion DIS is P:Q (P and Q are positive real numbers excluding 0 and P is greater than or equal to Q). When P/Q is a value larger than X/Y, the image is displayed on the display portion DIS in contact with the left edge and the right edge of the display portion DIS. Then, black is displayed in a remaining space of the display portion DIS where the image is displayed. In FIG. 1A, a region where an image is displayed is referred to as an image region MA, and regions of black display (where nothing is displayed) are referred to as a black region BA1 and a black region BA2.

Note that in the case where P/Q has the same value as X/Y, the aspect ratio of the display apparatus DSP and the aspect ratio of an image displayed on the display portion DIS agree with each other; thus, the image is displayed on the display portion DIS of the display apparatus DSP without a black region in some cases.

Figure 1B:
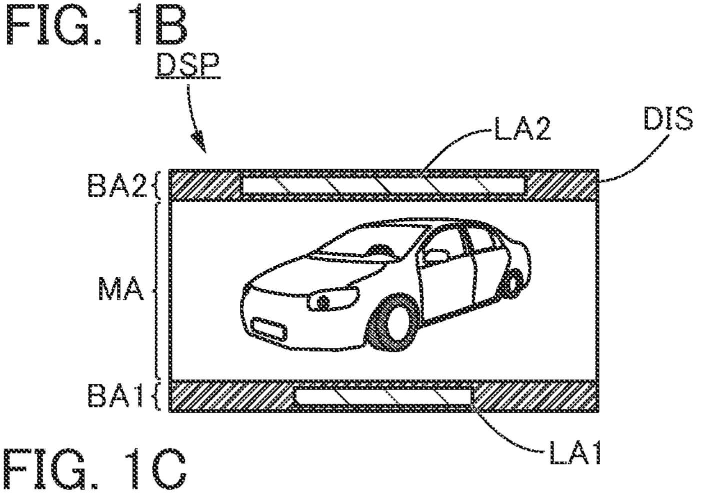

In FIG. 1A, the display apparatus DSP may display text information on the black region BA1 and the black region BA2. For example, as illustrated in FIG. 1B, the display apparatus DSP can display a character string LA1 and a character string LA2 on the black region BA and the black region BA2, respectively. The character string LA1 and the character string LA2 can be, for example, subtitles, superimposed text of prompt report, or notification information corresponding to an image displayed on the image region MA. Alternatively, in the case where a play screen of a video game is displayed on the display apparatus DSP, for example, the character string LA1 and the character string LA2 can be information of the video game (e.g., status of an operation character, setting information of the video game, and operation method).

Specifically, for example, the character string LA1 of the black region BA1 may be subtitles for an image displayed on the image region MA, and the character string LA2 of the black region BA2 may be a notification message. The display apparatus DSP may display the character string LA1 only on the black region BA1 without displaying the character string LA2 on the black region BA2.

Figure 1C:
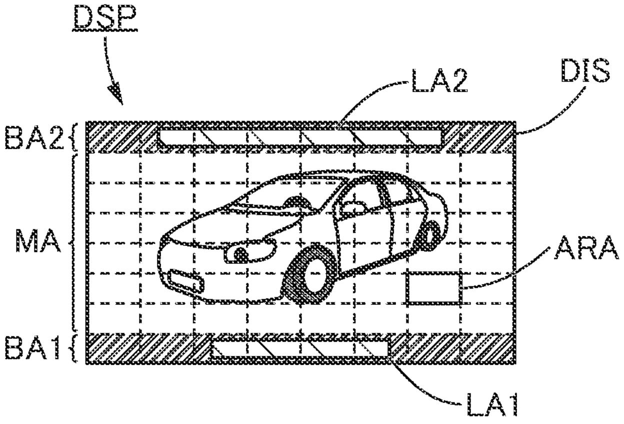

Here, the display apparatus DSP in which the display portion DIS is divided into a plurality of display regions is considered. Specifically, as illustrated in FIG. 1C, the display apparatus DSP displays an image on the display portion DIS including a plurality of display regions ARA. In particular, displaying an image on the divided display region ARA is performed with a driver circuit corresponding to the display region ARA (e.g., a gate driver circuit and a source driver circuit). That is, the display apparatus DSP in FIG. 1C has a structure in which a driver circuit is provided in each of the plurality of display regions ARA.

Since the display region ARA in the image region MA is a region where an image is displayed, a selection signal and an image signal are frequently input to pixel circuits included in the display region ARA in the image region MA. Thus, the frame frequency of the display region ARA in the image region MA becomes high. In particular, in the case where the image is a moving image, the frame frequency of the display region ARA in the image region MA is sometimes higher than that of a still image.

On the other hand, the display region ARA included in each of the black region BA1 and the black region BA2 functions as a region for displaying black, the character string LA1, and the character string LA2. In the case where text information displayed on the display apparatus is read by a person, there is no need to increase the frame frequency of an image displaying the text information. For example, the frame frequency of the display region ARA included each of in the black region BA1 and the black region BA2 can be greater than or equal to 1 Hz and lower than or equal to 10 Hz. Alternatively, the frame frequency may be higher than or equal to 1/10 Hz and lower than or equal to 10 Hz, or higher than or equal to 1/60 Hz and lower than or equal to 10 Hz. Thus, the character string LA1 and the character string LA2 displayed on the black region BA1 and the black region BA2, respectively, can be rewritten with a fewer times (a lower frame frequency) than an image (particularly in a moving image) displayed on the image region MA.

In the case where one or both of the black region BA1 and the black region BA2 displays no character string (performs black display), the driver circuit corresponding to the display region ARA where no character string is displayed may be stopped temporarily. The driver circuit for the display region ARA is stopped so as not to display a character string on one or both of the black region BA1 and the black region BA2, enabling a reduction in power consumption of the driver circuit.

In addition, the character string LA1 and the character string LA2 may contain a still image such as an icon or Emoji (pictogram) in addition to text. Depending on the case, the character string LA1 and the character string LA2 may contain only an icon or Emoji (pictogram), without containing text. In the case where a person watches a still image displayed on the display apparatus, it is unnecessary to increase the frame frequency as in the case of displaying text; thus, the character string LA1 and the character string LA2 each including a still image can be displayed on the black region BA1 and the black region BA2. Note that although the frame frequency of the black region BA1 and the black region BA2 is lower than the frame frequency of the image region MA, the character string LA1 or the character string LA2 displayed on the black region BA1 or the black region BA2 may contain an icon or Emoji containing a moving image or animation, if the image quality is acceptable.

Figure 2A:
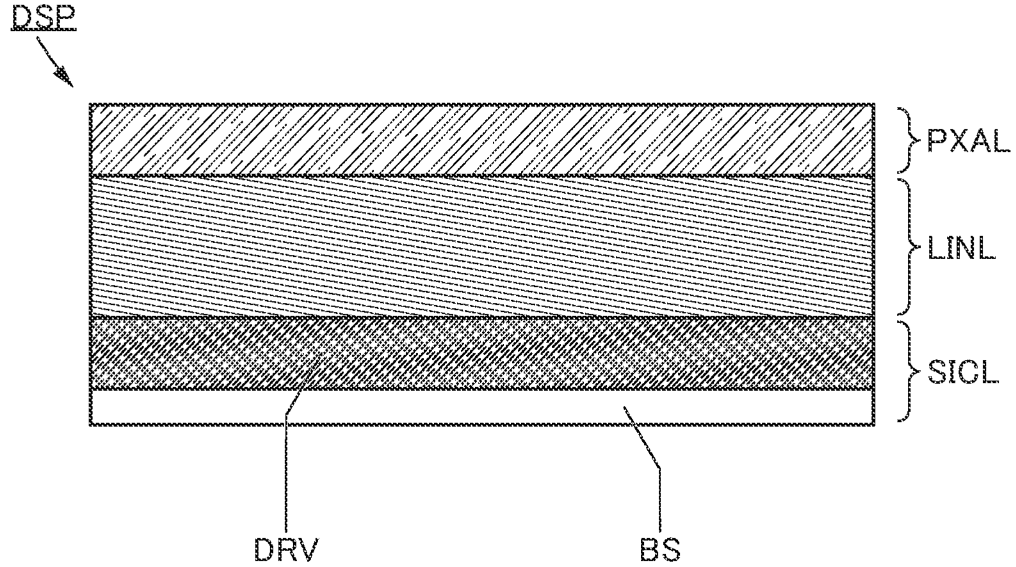
FIG. 2A and FIG. 2B are schematic cross-sectional views illustrating a structure example of a display apparatus.

Next, a specific structure example of the display apparatus DSP in FIG. 1C will be described. FIG. 2A is a schematic cross-sectional view of the display apparatus DSP in FIG. 1C. The display apparatus DSP includes a pixel layer PXAL, a wiring layer LINL, and a circuit layer SICL, for example.

The wiring layer LINL is provided over the circuit layer SICL, and the pixel layer PXAL is provided over the wiring layer LINL. Note that the pixel layer PXAL overlaps with a region including a driver circuit region DRV described later.

The circuit layer SICL includes a substrate BS and the driver circuit region DRV.

As the substrate BS, a semiconductor substrate (e.g., a single crystal substrate) formed of silicon or germanium can be used, for example. Besides the semiconductor substrate, for example, an SOI (Silicon On Insulator) substrate, a glass substrate, a quartz substrate, a plastic substrate, a sapphire glass substrate, a metal substrate, a stainless steel substrate, a substrate including stainless steel foil, a tungsten substrate, a substrate including tungsten foil, a flexible substrate, an attachment film, or paper or a base material film containing a fibrous material can be used as the substrate BS. Examples of the glass substrate include barium borosilicate glass, aluminoborosilicate glass, and soda lime glass. Examples of the flexible substrate, the attachment film, the base material film, and the like include plastics typified by polyethylene terephthalate (PET), polyethylene naphthalate (PEN), polyether sulfone (PES), and polytetrafluoroethylene (PTFE). Another example is a synthetic resin such as an acrylic resin. Other examples include polypropylene, polyester, polyvinyl fluoride, and polyvinyl chloride. Other examples include polyamide, polyimide, aramid, an epoxy resin, an inorganic vapor deposition film, and paper. Note that in the case where the manufacturing process of the display apparatus DSP includes heat treatment, a highly heat-resistant material is preferably selected for the substrate BS.

In the description of this embodiment, the substrate BS is a semiconductor substrate containing silicon or the like as a material. Therefore, a transistor included in the driver circuit region DRV can be a transistor including silicon in a channel formation region (hereinafter referred to as a Si transistor).

The driver circuit region DRV is provided over the substrate BS.

The driver circuit region DRV includes, for example, a driver circuit for driving a pixel included in the pixel layer PXAL to be described later. Note that a specific structure example of the driver circuit region DRV will be described later.

The wiring layer LINL is provided over the circuit layer SICL.

For example, a wiring is provided in the wiring layer LINL. The wiring included in the wiring layer LINL functions as, for example, a wiring that electrically connects the driver circuit included in the driver circuit region DRV provided below the wiring layer LINL and the circuit included in the pixel layer PXAL provided above the wiring layer LINL.

The pixel layer PXAL includes, for example, a plurality of pixels. The plurality of pixels may be arranged in a matrix in the pixel layer PXAL.

Each of the plurality of pixels can express one color or a plurality of colors. In particular, the plurality of colors can be, for example, three colors of red (R), green (G), and blue (B). Alternatively, the plurality of colors may be one or more of, for example, red (R), green (G), blue (B), cyan (C), magenta (M), yellow (Y), and white (W). Note that in the case where each of pixels expressing different colors is called a subpixel and white is expressed by a plurality of subpixels expressing different colors, the plurality of subpixels are collectively called a pixel in some cases. In this specification and the like, a subpixel is referred to as a pixel for convenience in some cases.

Figure 3A:
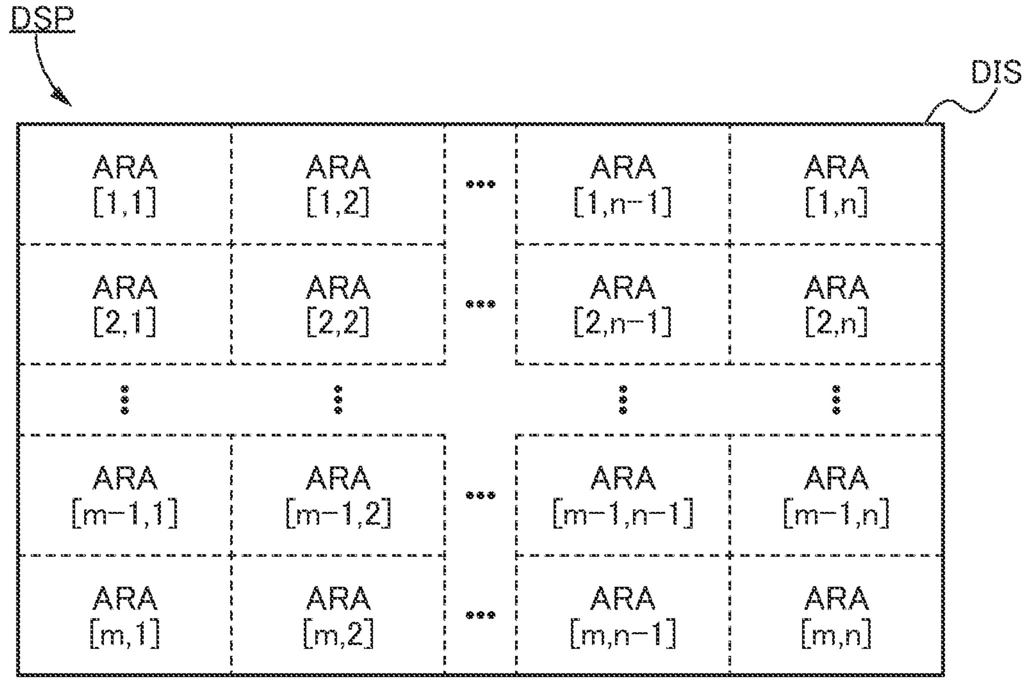
FIG. 3A is a schematic top view illustrating an example of a display portion of a display apparatus.

FIG. 3A is an example of a top view of the display apparatus DSP and illustrates only a display portion DIS. Note that the display portion DIS can be a top view of the pixel layer PXAL. In the display apparatus DSP in FIG. 3A, the display portion DIS is divided into regions in m rows and n columns (each of m and n is an integer greater than or equal to 1) as an example. Thus, the display portion DIS includes a display region ARA[1,1] to a display region ARA[m,n]. Note that FIG. 3A selectively illustrates the display region ARA[1,1], the display region ARA[2,1], the display region ARA[m−1,1], the display region ARA[m,1], the display region ARA[1,2], the display region ARA[2,2], the display region ARA[m−1,2], the display region ARA[m, 2], the display region ARA[1,n−1], the display region ARA [2,n−1], the display region ARA[m−1,n−1], ARA[m,n−1], the display region ARA[1,n], the display region ARA[2,n], the display region ARA[m−1,n], and the display region ARA[m,n], as an example.

For example, in the case where the display portion DIS is divided into 32 regions, m=4 and n=8 may be substituted into FIG. 3A. In the case where the display apparatus DSP has a screen resolution of 8K4K, the number of pixels is 7680×4320. In the case where the colors of subpixels of the display portion DIS are three colors, red (R), green (G), and blue (B), the total number of subpixels is 7680×4320×3. Here, in the case where a pixel array of the display portion DIS with a screen resolution of 8K4K is divided into 32 regions, the number of pixels per region is 960×1080, and when the colors of the subpixels of the display apparatus DSP are three colors, red (R), green (G), and blue (B), the number of subpixels per region is 960×1080×3.

Here, in the case where the display portion DIS of the display apparatus DSP in FIG. 3A is divided into regions in m rows and n columns, the driver circuit region DRV included in the circuit layer SICL is considered.

Figure 3B:
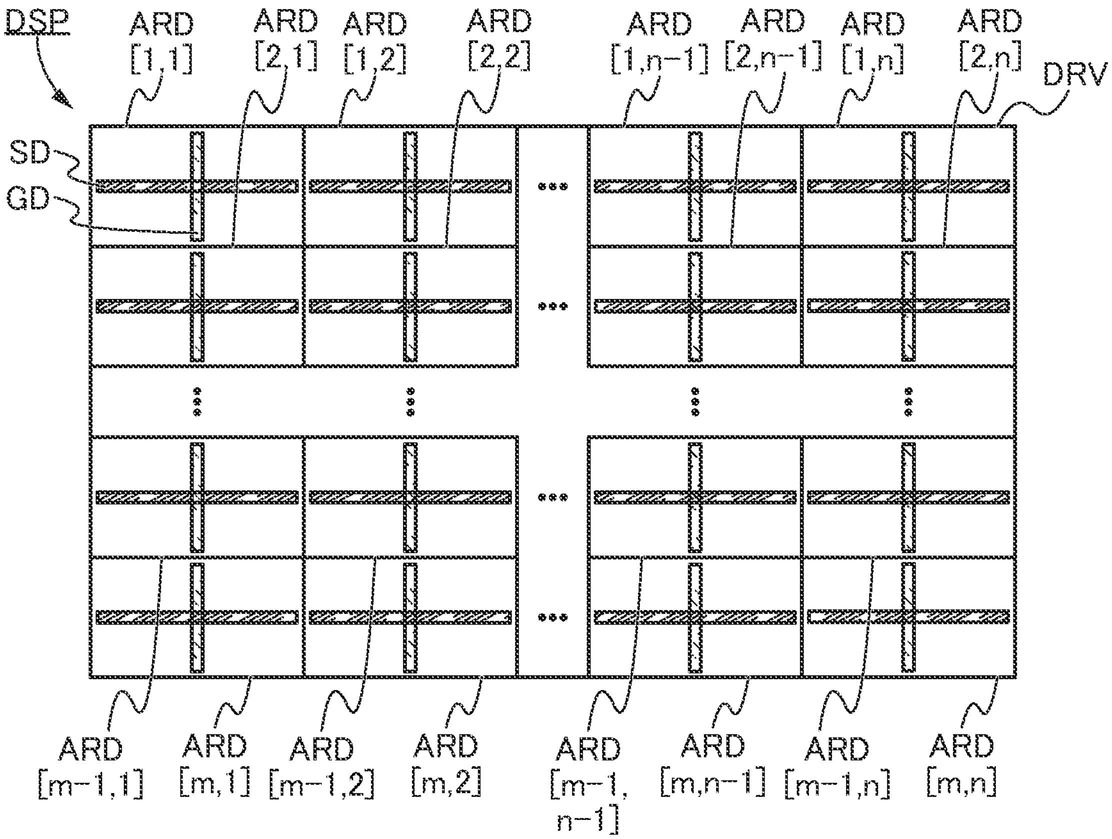
FIG. 3B is a schematic top view illustrating an example of a driver circuit region of the display apparatus.

FIG. 3B is an example of a top view of the display apparatus DSP, and illustrates only the driver circuit region DRV included in the circuit layer SICL.

Since the display portion DIS in the display apparatus DSP in FIG. 3A is divided into regions in m rows and n columns, each of the divided display regions ARA[1,1] to ARA[m,n] needs a corresponding driver circuit. Specifically, the driver circuit region DRV may also be divided into regions in m rows and n columns and a driver circuit may be provided in each of the divided regions.

The driver circuit region DRV in the display apparatus DSP in FIG. 3B includes regions divided into m rows and n columns. Thus, the driver circuit region DRV includes a circuit region ARD[1,1] to a circuit region ARD[m,n]. Note that FIG. 3B selectively illustrates the circuit region ARD [1,1], the circuit region ARD[2,1], the circuit region ARD [m−1,1], the circuit region ARD[m,1], the circuit region ARD[1,2], the circuit region ARD[2,2], the circuit region ARD[m−1,2], the circuit region ARD[m,2], the circuit region ARD[1,n−1], the circuit region ARD[2,n−1], the circuit region ARD[m−1,n−1], the circuit region ARD[m,n−1], the circuit region ARD[1,n], the circuit region ARD[2,n], the circuit region ARD[m−1,n], and the circuit region ARD [m,n], as an example.

Each of the circuit region ARD[1,1] to the circuit region ARD[m,n] includes a driver circuit SD and a driver circuit GD. For example, the driver circuit SD and the driver circuit GD included in a circuit region ARD[i,j] (not illustrated in FIG. 3B) positioned in the i-th row and the j-th column (i is an integer greater than or equal to 1 and less than or equal to m, and j is an integer greater than or equal to 1 and less than or equal to n) can drive a plurality of pixels included in the display region ARA[i,j] positioned in the i-th row and the j-th column in the display portion DIS. The driver circuit SD serves as, for example, a source driver circuit that transmits image signals to a plurality of pixels included in the corresponding display region ARA. The driver circuit SD may include a digital-analog conversion circuit that converts digital data of an image signal to analog data.

The driver circuit GD serves as, for example, a gate driver circuit that selects a plurality of pixels, which are destinations to which image signals are transmitted, in the corresponding display region ARA.

Note that the display apparatus DSP illustrated in FIG. 2A and FIG. 3A and FIG. 3B has a structure in which the display region ARA[i,j] and the circuit region ARD[i,j] overlap with each other in the display portion DIS, but the display apparatus of one embodiment of the present invention is not limited to the structure. In the structure of the display apparatus of one embodiment of the present invention, the display region ARA[i,j] and the circuit region ARD[i,j] do not necessarily overlap with each other.

Figure 2B:
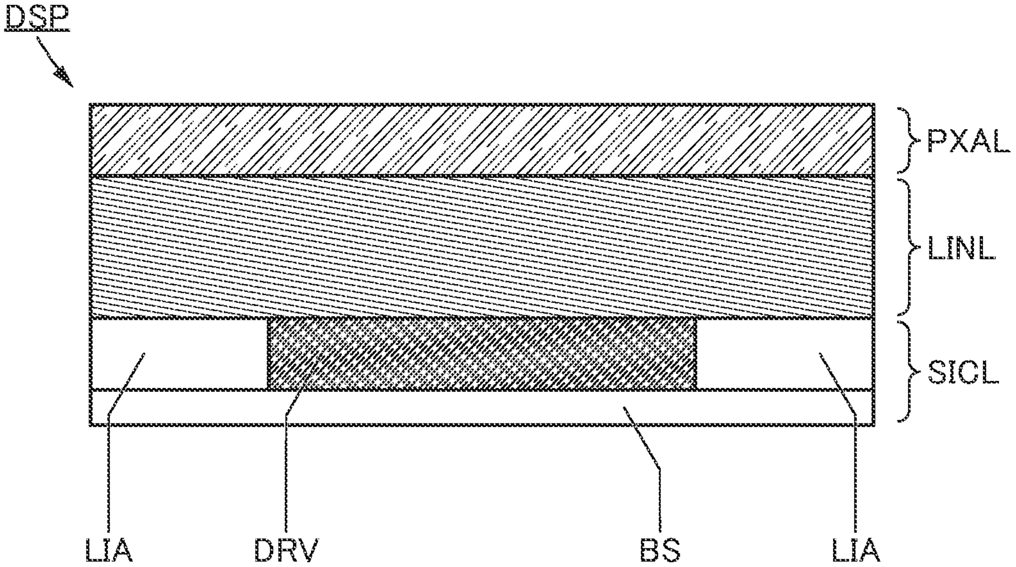

For example, as illustrated in FIG. 2B, the display apparatus DSP may have a structure in which not only the driver circuit region DRV but also a region LIA is provided over the substrate BS.

A wiring is provided in the region LIA, as an example. The wiring included in the region LIA may be electrically connected to a wiring included in the wiring layer LINL. At this time, the display apparatus DSP may have a structure in which a circuit included in the driver circuit region DRV and a circuit included in the pixel layer PXAL are electrically connected to each other through the wiring included in the region LIA and the wiring included in the wiring layer LINL. The display apparatus DSP may have a structure in which the circuit included in the driver circuit region DRV is electrically connected to the wiring or a circuit included in the region LIA through the wiring included in the wiring layer LINL.

The region LIA may include a GPU (Graphics Processing Unit), as an example. In the case where the display apparatus DSP includes a touch panel, the region LIA may include a sensor controller that controls a touch sensor included in the touch panel. The region LIA may also include a controller having a function of processing an input signal from the outside of the display apparatus DSP. The region LIA may include a voltage generation circuit for generating voltage supplied to the above-described circuit and a driver circuit included in the circuit region ARD.

In the case where a light-emitting device containing an organic EL material is used as a display element of the display apparatus DSP, an EL correction circuit may be included in the region LIA. The EL correction circuit has a function of appropriately adjusting the amount of current input to the light-emitting device containing an organic EL material, for example. Since the emission luminance of the light-emitting device containing an organic EL material is proportional to current, the luminance of light emitted from the light-emitting device is sometimes lower than a desired luminance when the characteristics of a driving transistor electrically connected to the light-emitting device are not favorable. For example, the EL correction circuit monitors the amount of current flowing through the light-emitting device and increases the amount of current flowing through the light-emitting device when the amount of current is smaller than a desired amount of current, whereby the luminance of light emitted from the light-emitting device can be increased. By contrast, when the amount of current is larger than a desired amount of current, the amount of current flowing through the light-emitting device may be adjusted to be small.

In the case where a liquid crystal element is used as the display element of the display apparatus DSP, a gamma correction circuit may be included in the region LIA.

Figure 4:
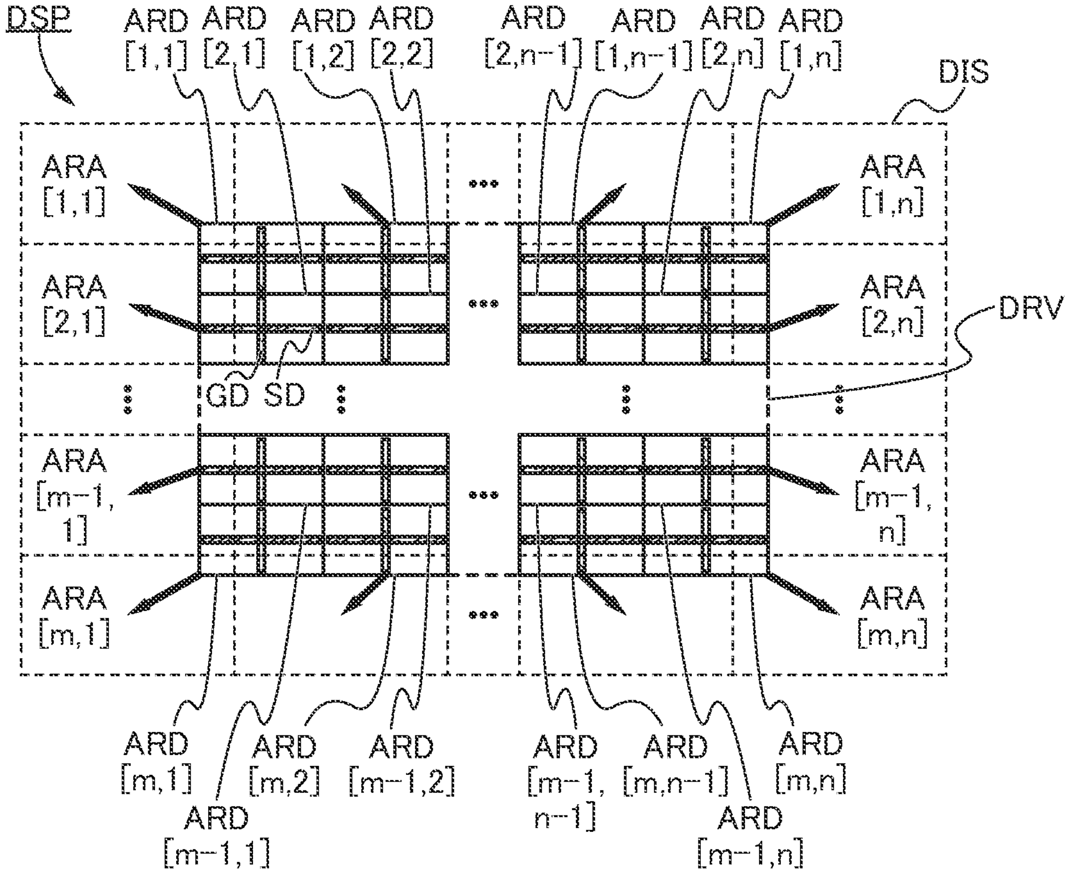
FIG. 4 is a schematic top view illustrating a structure example of a display apparatus.

FIG. 4 is an example of a top view of the display apparatus DSP illustrated in FIG. 2B, illustrating only the circuit layer SICL. The display apparatus DSP illustrated in FIG. 4 has a structure in which the driver circuit region DRV is surrounded by the region LIA, as an example. Thus, as illustrated in FIG. 4, the driver circuit region DRV is provided to overlap with the interior of the display portion DIS in the top view.

In the display apparatus DSP illustrated in FIG. 4, the display portion DIS is divided into the display region ARA[1,1] to the display region ARA[m,n] and the driver circuit region DRV is also divided into the circuit region ARD[1,1] to the circuit region ARD[m,n] as in FIG. 3A.

As in FIG. 4, a correspondence between the display region ARA and the circuit region ARD including a driver circuit that drives a pixel included in the display region ARA is shown by a thick arrow. Specifically, a driver circuit included in the circuit region ARD[1,1] drives a pixel included in the display region ARA[1,1], and a driver circuit included in the circuit region ARD[2,1] drives a pixel included in the display region ARA[2,1]. A driver circuit included in the circuit region ARD[m−1,1] drives a pixel included in the display region ARA[m−1,1], and a driver circuit included in the circuit region ARD[m,1] drives a pixel included in the display region ARA[m,1]. A driver circuit included in the circuit region ARD[1,n] drives a pixel included in the display region ARA[1,n], and a driver circuit included in the circuit region ARD[2,n] drives a pixel included in the display region ARA[2,n]. A driver circuit included in the circuit region ARD[m−1,n] drives a pixel included in the display region ARA[m−1,n], and a driver circuit included in the circuit region ARD[m,n] drives a pixel included in the display region ARA[m,n]. That is, although not illustrated in FIG. 4, a driver circuit included in the circuit region ARD[i,j] positioned in the i-th row and the j-th column drives a pixel included in the display region ARA[i,j].

In FIG. 2B, when the driver circuit included in the circuit region ARD in the circuit layer SICL and the pixel included in the display region ARA in the pixel layer PXAL are electrically connected through a wiring included in the wiring layer LINL, the display apparatus DSP can have a structure in which the display region ARA[i,j] and the circuit region ARD[i,j] do not necessarily overlap with each other. Accordingly, the positional relation between the driver circuit region DRV and the display portion DIS is not limited to the top view of the display apparatus DSP in FIG. 4, and the position of the driver circuit region DRV can be freely determined.

Note that in FIG. 3B and FIG. 4, the driver circuit SD and the driver circuit GD are arranged so as to form a cross in each of the circuit region ARD[1,1] to the circuit region ARD[m,n]; however, the arrangement of the driver circuit SD and the driver circuit GD is not limited to the structure of the display apparatus of one embodiment of the present invention. The arrangement of the driver circuit SD and the driver circuit GD may form an L shape in one circuit region ARD. Alternatively, one of the driver circuit SD and the driver circuit GD may be placed in upper and lower parts in a plan view and the other of the driver circuit SD and the driver circuit GD may be placed in right and left parts in the plan view.

Figure 5A:
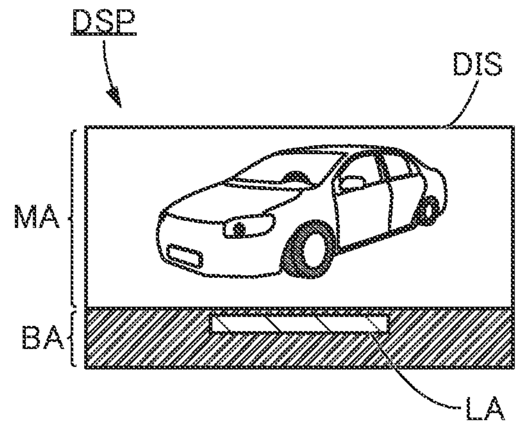
FIG. 5A to FIG. 5E are diagrams illustrating examples of an image displayed on a display apparatus.

Although FIG. 1A to FIG. 1C illustrate the example in which the black region BA1 and the black region BA2 are provided in upper and lower parts of the display portion DIS, the black 20) region displayed on the display portion DIS may be provided only on one side of the upper and lower parts of the display portion DIS. For example, as in the display apparatus DSP in FIG. 5A, the black region BA may be provided below the display portion DIS, and the image region MA may be provided above the display portion DIS. In FIG. 5A, the character string LA is displayed on the black region BA, for example.

The position at which the black region displayed on the display portion DIS is provided in the display apparatus of one embodiment of the present invention is not limited to the examples illustrated in FIG. 1A to FIG. 1C and FIG. 5A. The black region displayed on the display portion DIS of the display apparatus of one embodiment of the present invention may be changed as appropriate in accordance with the aspect ratio of an image displayed on the image region MA.

Figure 5B:
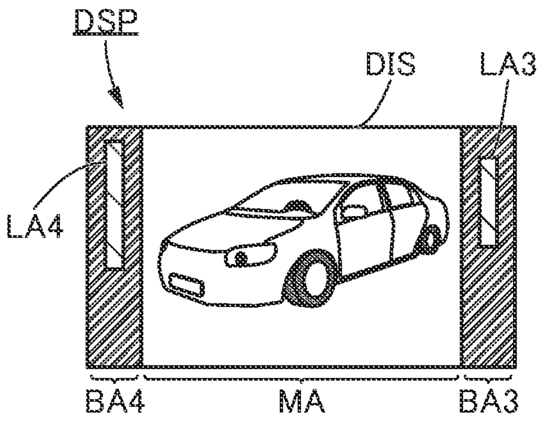

For example, in the case where the aspect ratio of the display apparatus DSP is set to X:Y and the aspect ratio of an image displayed on the display portion DIS is set to P:Q, the image is displayed on the display portion DIS as illustrated in FIG. 5B when P/Q is smaller than X/Y. In this case, in the display apparatus DSP, the image region MA is provided in contact with the upper end and the lower end of the display portion DIS and a black region BA3 and a black region BA4 are provided on the right and left parts of the display portion DIS. In FIG. 5B, for example, a character string LA3 is displayed on the black region BA3, and a character string LA4 is displayed on the black region BA4.

In the display apparatus of one embodiment of the present invention, the black region displayed on the display portion DIS may be provided in a manner in which the image region MA for displaying an image of the display portion DIS is determined first and the black region is provided in a remaining region of the display portion DIS. In that case, the image region MA preferably includes a center portion of the display portion DIS. Thus, the display apparatus DSP preferably includes a region where the center portion of the display portion DIS and part of a plurality of display regions ARA included in the image region MA overlap with each other.

Note that in this specification and the like, the center portion of the display portion DIS refers to a region including an intersection point of two diagonal lines of the display portion DIS. Specifically, when the length of the diagonal line (the diagonal size) of the display portion DIS is L, the center portion of the display portion DIS can be defined as a circular region with the intersection point of the two diagonal lines as a center. Note that the radius of the circle is preferably lower than or equal to L/8, further preferably lower than or equal to L/16, still further preferably lower than or equal to L/32, yet still further preferably lower than or equal to L/64, or yet still further preferably lower than or equal to L/128.

Accordingly, the shape of the black region is not limited to that in FIG. 1A to FIG. 1C, FIG. 5A, and FIG. 5B and can have a variety of shapes.

Figure 5C:
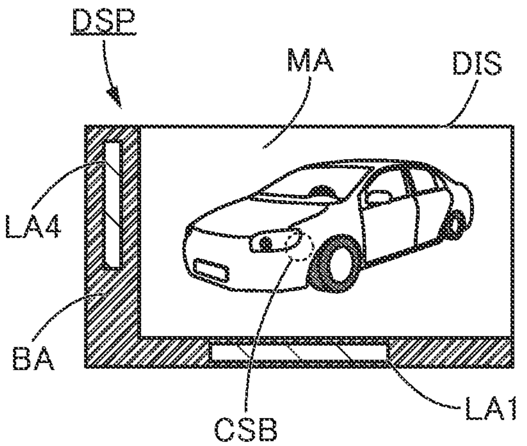

For example, as illustrated in FIG. 5C, an L shape may be employed. In the display apparatus DSP in FIG. 5C, the image region MA is provided, being in contact with the upper end and the right end of the display portion DIS and including the center portion CSB of the display portion DIS, and the black region BA is provided in a remaining region of the display portion DIS. In FIG. 5C, the character string LA1 and the character string LA4 are displayed on the black region BA, for example.

Although FIG. 5C illustrates the L-shaped black region BA positioned at the left end and the lower end of the display portion DIS, the shape of the black region displayed on the display portion DIS may be an L shape positioned at the right end and the lower end, an L shape positioned at the right end and the upper end, or an L shape positioned at the left end and the upper end depending on the position of the image region MA provided on the display portion DIS.

Figure 5D:
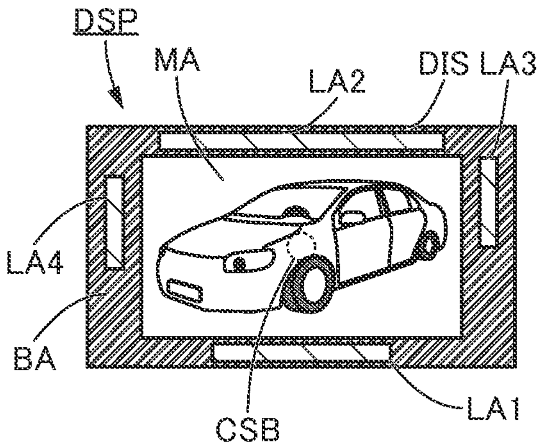

The shape of the black region provided in the display portion DIS is not limited to those in FIG. 1A to FIG. 1C and FIG. 5A to FIG. 5C, and may be, for example, a shape along the outer periphery of the display apparatus DSP (O-shape) as illustrated in FIG. 5D. In the display apparatus DSP in FIG. 5D, the image region MA is provided, not being in contact with the upper end, the lower end, the right end, or the left end of the display portion DIS and including the center portion CSB of the display portion DIS, and the black region BA is provided in contact with the upper end, the left end, the right end, and the lower end of the display portion DIS. In FIG. 5D, for example, the character string LA1 to the character string LA4 are displayed on the black region BA.

When an image is displayed on the display portion DIS in the display apparatus DSP described above, it is preferable that the image be displayed on the display portion DIS by being enlarged or reduced to fit in the display portion DIS without changing the aspect ratio of the image. Depending on circumstances, when an image is displayed on the display portion DIS, the image may be displayed on the display portion DIS by being enlarged or reduced to fit in the display portion DIS by changing the aspect ratio of the image.

Figure 5E:
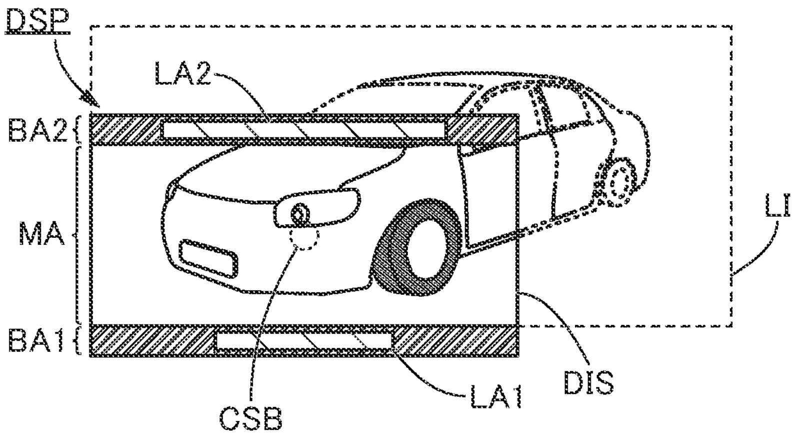

In the display apparatus DSP described above, the image displayed on the display portion DIS does not necessarily fit in the display portion DIS. Specifically, the display apparatus DSP may be configured to display only a part of the image, not the entire image, on the display section DIS. For example, as illustrated in FIG. 5E, the image in FIG. 5A to FIG. 5D may be enlarged and part of the image may be displayed on the image region MA. Note that in FIG. 5E, an image LI is an enlarged image, and part of the image LI is displayed on the image region MA. A part that is not displayed on the image region MA is shown with thick dashed lines. When an enlarged image is displayed in this manner, the shapes of the black region BA1 and the black region BA2 are preferably unchanged.

Figure 6:
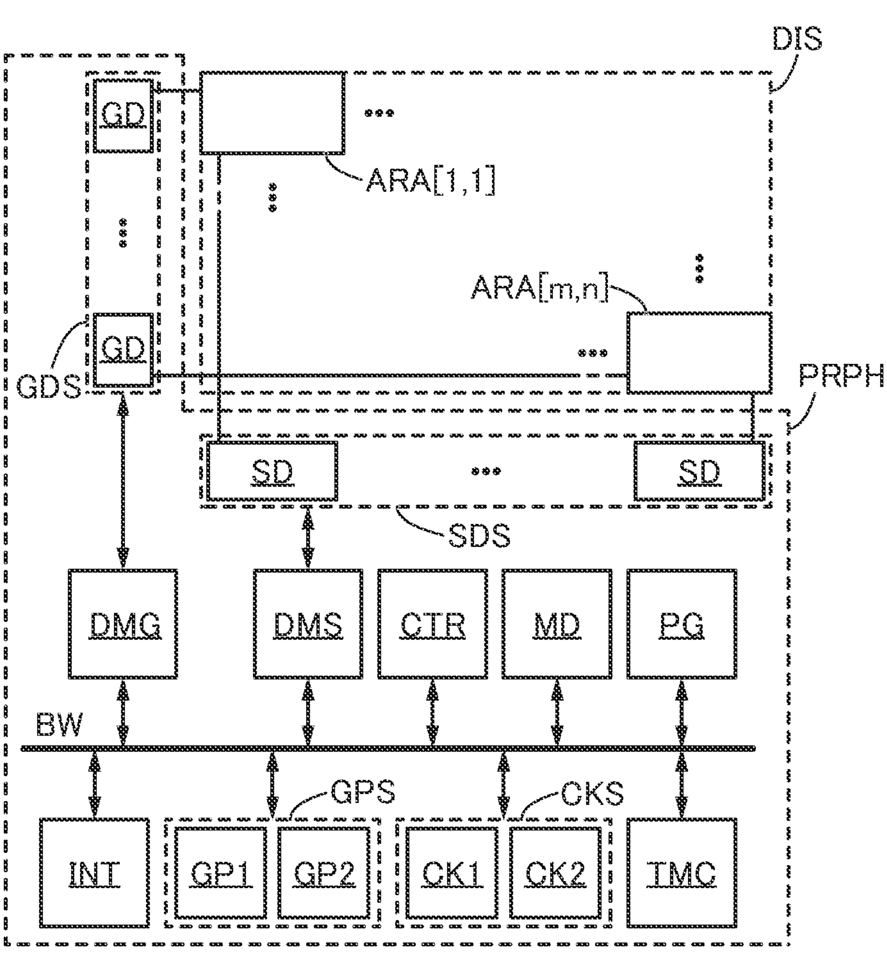
FIG. 6 is a block diagram illustrating a structure example of a display apparatus.

Next, examples of components included in the display apparatus DSP will be described. FIG. 6 is a block diagram illustrating an example of the display apparatus DSP. The display apparatus DSP illustrated in FIG. 6 includes the display portion DIS and a peripheral circuit PRPH.

The peripheral circuit PRPH includes a circuit GDS including a plurality of driver circuits GD, a circuit SDS including a plurality of driver circuits SD, a distribution circuit DMG, a distribution circuit DMS, a control unit CTR, a memory device MD, a voltage generation circuit PG, a timing controller TMC, a clock signal generation circuit CKS, an image processing unit GPS, and an interface INT.

Note that in the display apparatus DSP, the driver circuit region DRV including the plurality of driver circuits GD overlaps with the pixel layer PXAL including the plurality of display regions ARA as illustrated in FIG. 2A to FIG. 4; however, FIG. 6 illustrates the plurality of driver circuits GD arranged in a column, for convenience. Similarly, the driver circuit region DRV including the plurality of driver circuits SD overlaps with the pixel layer PXAL including the plurality of display regions ARA as illustrated in FIG. 2A to FIG. 4; however, FIG. 6 illustrates the plurality of driver circuits SD arranged in a row, for convenience.

The peripheral circuit PRPH is included in the circuit layer SICL illustrated in FIG. 2A and FIG. 2B, for example. The circuit GDS and the circuit SDS included in the peripheral circuit PRPH are included in the driver circuit region DRV illustrated in FIG. 2A and FIG. 2B, for example.

In the case of the display apparatus DSP in FIG. 2A, the distribution circuit DMG, the distribution circuit DMS, the control unit CTR, the memory device MD, the voltage generation circuit PG, the timing controller TMC, the clock signal generation circuit CKS, the image processing unit GPS, and the interface INT may each electrically connected to a circuit included in the driver circuit region DRV, as an external circuit, for example.

In the case of the display apparatus DSP in FIG. 2B, at least one of the distribution circuit DMG, the distribution circuit DMS, the control unit CTR, the memory device MD, the voltage generation circuit PG, the timing controller TMC, the clock signal generation circuit CKS, the image processing unit GPS, and the interface INT may be included in the region LIA. Among the above-described circuits, the circuit not included in the region LIA may be electrically connected to at least one of the circuit included in the region LIA and the circuit included in the driver circuit region DRV, as an external circuit.

The distribution circuit DMG, the distribution circuit DMS, the control unit CTR, the memory device MD, the voltage generation circuit PG, the timing controller TMC, the clock signal generation circuit CKS, the image processing unit GPS, and the interface INT transmit and receive signals mutually through a bus wiring BW.

The interface INT has, for example, a function of a circuit for taking image information output from an external device for displaying an image on the display apparatus DSP into the circuit in the peripheral circuit PRPH. Examples of the external device include a recording media player and a nonvolatile memory device such as a hard disk drive (HDD) and a solid state drive (SSD). The interface INT may be a circuit that outputs a signal from a circuit inside the peripheral circuit PRPH to a device outside the display apparatus DSP.

In the case where image information is input from the external device to the interface INT by wireless communication, the interface INT can include, for example, an antenna receiving the image information, a mixer, an amplifier circuit, and an analog-digital conversion circuit.

The control unit CTR has functions of processing control signals transmitted from the external device through the interface INT and controlling circuits included in the peripheral circuit PRPH.

The memory device MD has a function of temporarily holding data and an image signal. In that case, the memory device MD serves as a frame memory (sometimes referred to as a frame buffer), for example. The memory device MD may have a function of temporarily holding at least one piece of data transmitted from the external device through the interface INT and data processed in the control unit CTR. In that case, at least one of an SRAM (Static Random Access Memory) and a DRAM (Dynamic Random Access Memory) can be used as the memory device MD, for example.

The voltage generation circuit PG has a function of generating power supply voltages supplied to a pixel circuit included in the display portion DIS and a circuit included in the peripheral circuit PRPH. Note that the power generation circuit PG may have a function of selecting a circuit to which a voltage is to be supplied. For example, the voltage generation circuit PG stops supply of voltage to the circuit GDS, the circuit SDS, the image processing unit GPS, the timing controller TMC, and the clock signal generation circuit CKS in a period in which a still image is displayed on the display portion DIS, enabling a reduction in the total power consumption of the display apparatus DSP.

The timing controller TMC has a function of generating timing signals used in the plurality of driver circuits GD included in the circuit GDS and the plurality of driver circuits SD included in the circuit SDS. For the generation of the timing signal, a clock signal generated by the clock signal generation circuit CKS can be used.

The image processing unit GPS has a function of performing processing for drawing an image on the display portion DIS. For example, the image processing unit GPS may include a GPU (Graphics Processing Unit). Specifically, the image processing unit GPS is configured to perform pipeline processing in parallel and can thus perform high-speed processing of image data to be displayed on the display portion DIS. The image processing unit GPS can also have a function of a decoder for decoding an encoded image.

In FIG. 6, the image processing unit GPS includes a circuit GP1 and a circuit GP2. The circuit GP1 has a function of receiving image data to be displayed on the image region MA and generating an image signal from the image data, for example. The circuit GP2 has a function of receiving image data (black and character string) to be displayed on the black region BA and generating an image signal (black and character string) from the image data, for example.

The image processing unit GPS may also have a function of correcting color tone of an image displayed on the display portion DIS. In that case, the image processing unit GPS is preferably provided with one or both of a dimming circuit and a toning circuit. In the case where the display pixel circuit included in the display portion DIS includes an organic EL element, the circuit GP1 may be provided with an EL correction circuit.

The above-described image correction may be performed using artificial intelligence. For example, a current flowing in a display device included in a pixel (or a voltage applied to the display device) may be monitored and acquired, an image displayed on the display portion DIS may be acquired with an image sensor or the like, the current (or voltage) and the image may be used as input data in an arithmetic operation of the artificial intelligence (e.g., an artificial neural network), and the output result may be used to determine whether the image is needed to be corrected.

Such an arithmetic operation of artificial intelligence can be applied not only to image correction but also to upconversion processing (downconversion processing) of image data. Accordingly, upconversion (downconversion) of low screen resolution image data can be performed in accordance with the screen resolution of the display portion DIS, which enables a high-display-quality image to be displayed on the display portion DIS.

Note that for the above-described arithmetic operation of artificial intelligence, the GPU included in the image processing unit GPS can be used, for example. That is, the GPU can be used to perform arithmetic operations for various kinds of correction (e.g., color irregularity correction and upconversion).

Note that in this specification and the like, such a GPU performing an arithmetic operation of artificial intelligence is referred to as an AI accelerator. That is, the GPU may be replaced with an AI accelerator in the description in this specification and the like.

The clock signal generation circuit CKS has a function of generating a clock signal. The clock signal generation circuit CKS includes a circuit CK1 and a circuit CK2. For example, the circuit CK1 has a function of generating a clock signal for displaying a desired image on the image region MA provided in the display portion DIS, and for example, the circuit CK2 has a function of generating a clock signal for displaying an image (black and character string) on the black region BA provided in the display portion DIS.

Note that an image (black and character string) displayed on the black region BA provided in the display portion DIS can be displayed with a smaller number of rewriting times than that in the image region MA. Thus, the frame frequency of the clock signal generated in the circuit CK2 is preferably lower than the frame frequency of the clock signal generated in the circuit CK1. Accordingly, the circuit CK1 and the circuit CK2 may each be configured so as to change the frequency of clock signals generated therein.

The distribution circuit DMG has a function of transmitting a signal received from the bus wiring BW to one of the driver circuit GD for driving pixels included in the image region MA and the driver circuit GD for driving pixels included in the black region BA in accordance with the content of the signal.

The distribution circuit DMS has a function of transmitting a signal received from the bus wiring BW to one of the driver circuit SD for driving pixels included in the image region MA and the driver circuit SD for driving pixels included in the black region BA in accordance with the content of the signal.

Although not illustrated in FIG. 6, a level shifter may be included in the peripheral circuit PRPH. The level shifter has a function of converting signals input to circuits into appropriate levels, for example.

Note that the configuration of the peripheral circuit PRPH of the display apparatus DSP illustrated in FIG. 6 is an example, and the circuit configuration included in the peripheral circuit PRPH may be changed depending on circumstances. For example, in the case where the display apparatus DSP receives driving voltages of circuits from the outside, the display apparatus DSP does not need to generate the driving voltages. In that case, the display apparatus DSP may have a structure without including the voltage generation circuit PG.

Example of Operation Method

Figure 7:
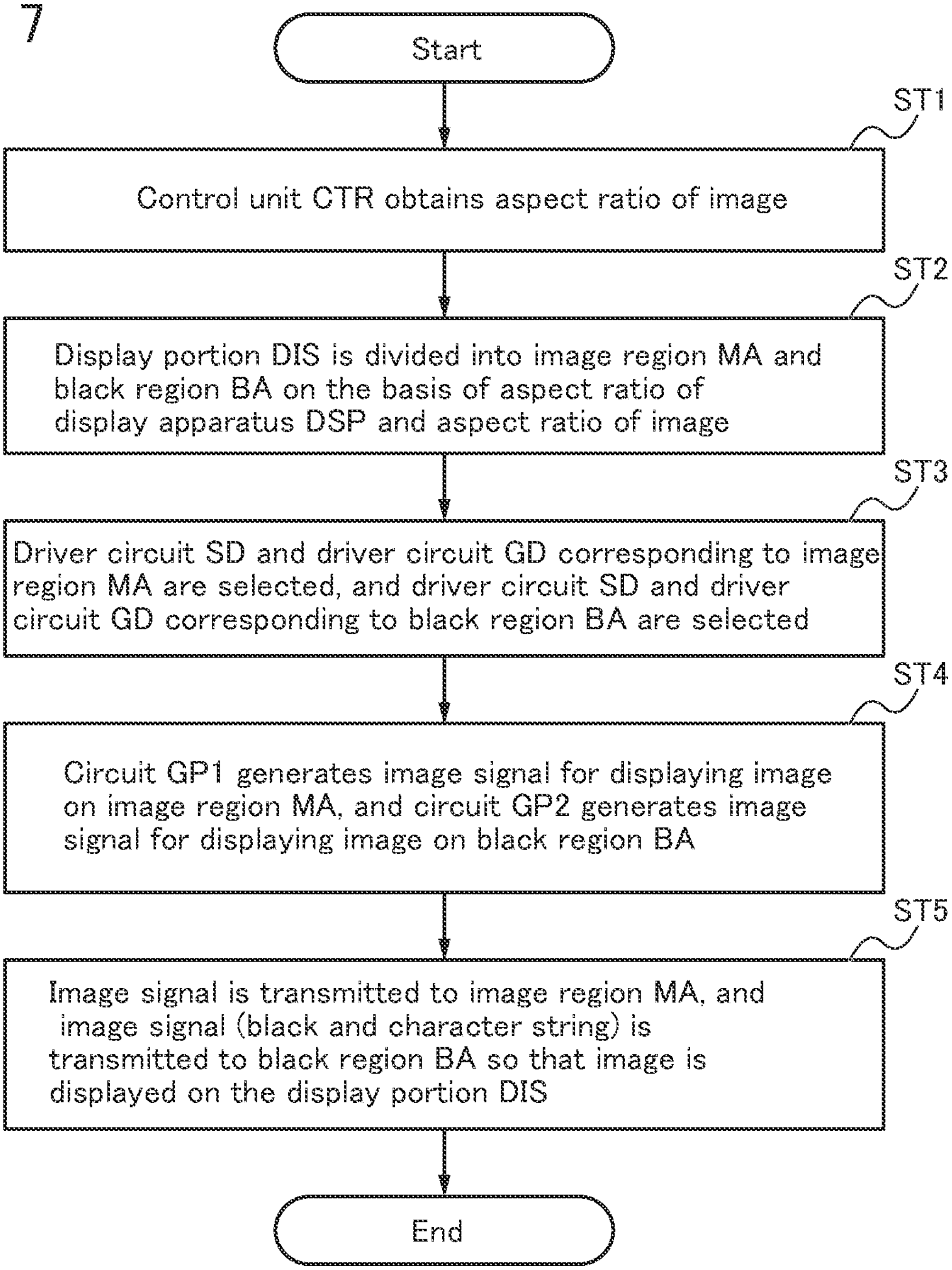
FIG. 7 is a flowchart illustrating an operation example of a display apparatus.

Next, an example of an operation method of the display apparatus of one embodiment of the present invention is described. FIG. 7 is a flowchart illustrating an example of an operation method of the display apparatus DSP illustrated in FIG. 6. The flowchart illustrated in FIG. 7 includes Step ST1 to Step ST5.

[Step ST1]

Step ST1 includes a step in which the control unit CTR obtains an aspect ratio of an image to be displayed on the display apparatus DSP. The image can be image information input from an external device to the interface INT.

[Step ST2]

Step ST2 includes a step in which the control unit CTR divides the display portion DIS into the image region MA for displaying an image on the display portion DIS and the black region BA where no image is displayed, on the basis of the aspect ratio of the display apparatus DSP and the aspect ratio of the image. Specifically, in this step, one of the image region MA and the black region BA is assigned to each of the display region ARA[1,1] to the display region ARA[m,n] included in the display portion DIS. Thus, an address of the display region ARA serving as the image region MA and an address of the display region ARA serving as the black region BA are determined among the display region ARA [1,1] to the display region ARA[m,n] included in the display portion DIS.

Note that the address of the display region ARA serving as the image region MA and the address of the display region ARA serving as the black region BA may be temporarily stored in the memory device MD.

[Step ST3]

Step ST3 includes a step in which information including the address of the display region ARA to serve as the image region MA and the address of the display region ARA to serve as the black region BA is transmitted to each of the distribution circuit DMG and the distribution circuit DMS, and the driver circuit GD and the driver circuit SD for driving the pixel circuit included in the image region MA are selected and the driver circuit GD and the driver circuit SD for driving the pixel circuit included in the black region BA are selected. Specifically, in this step, a plurality of driver circuits GD included in the distribution circuit DMG are divided into driver circuits GD for driving the pixel circuit of the display region ARA serving as the image region MA and driver circuits GD for driving the pixel circuit of the display region ARA serving as the black region BA. Similarly, in this step, a plurality of driver circuits SD included in the distribution circuit DMS are divided into driver circuits SD for driving the pixel circuit of the display region ARA serving as the image region MA and driver circuits SD for driving the pixel circuit of the display region ARA serving as the black region BA.

Thus, the distribution circuit DMG can receive a selection signal corresponding to the display region ARA of the image region MA and transmit the selection signal to the driver circuit GD for driving the pixel circuit included in the display region ARA of the image region MA, and the distribution circuit DMG can receive a selection signal corresponding to the display region ARA of the black region BA and transmit the selection signal to the driver circuit GD for driving the pixel circuit included in the black region ARA serving as the black region BA.

Similarly, the distribution circuit DMS can receive an image signal to be displayed on the display region ARA of the image region MA and transmit the image signal to the driver circuit GD corresponding to the display region ARA of the image region MA, and the distribution circuit DMS can receive the image signal (black and character string) displayed on the black region BA and transmit the image signal to the driver circuit GD corresponding to the display region ARA of the black region BA.

As described above, the driver circuits are divided into the driver circuits GD corresponding to the display region ARA included in the image region MA and the driver circuits GD corresponding to the display region ARA included in the black region BA, whereby the frame frequencies can be different values between the display region ARA included in the image region MA and the display region ARA included in the black region BA. In particular, the number of times of rewriting display images in the display region ARA included in the black region BA (displaying black or a character string) can be smaller than that in the display region ARA included in the image region MA (displaying a still image or a moving image); thus, the frame frequency in the display region ARA included in the black region BA can be lower than that in the display region ARA included in the image region MA.

[Step ST4]

In Step ST4, generation of an image signal for displaying an image on the image region MA of the display portion DIS by the image processing unit GPS and generation of an image signal for displaying an image (black, character string) on the black region BA of the display portion DIS are performed.

For example, generation of an image signal for displaying an image on the image region MA of the display portion DIS is performed by the circuit GP1 included in the image processing unit GPS. In the circuit GP1, for example, one or both of light adjustment and color adjustment are performed on an image displayed on the display portion DIS. In the case where the display pixel circuit included in the display portion DIS includes an organic EL element, the circuit GP1 may be provided with an EL correction circuit. The generated image signal is transmitted to the memory device MD or the distribution circuit DMS.

For example, generation of an image signal for displaying an image on the black region BA of the display portion DIS is performed by the circuit GP2 included in the image processing unit GPS. The circuit GP2 obtains image data containing a character string transmitted from the interface INT and generates an image signal (black and character string) from the image data, for example. The generated image signal (black and character string) is transmitted to the memory device MD or the distribution circuit DMS.

[Step ST5]

Step ST5 includes a step of transmitting the image signal generated by the circuit GP1 in Step ST4 to the display region ARA of the image region MA in the display portion DIS and transmitting the image signal (black and a character string) generated by the circuit GP2 in Step ST4 to the display region ARA of the black region BA in the display portion DIS. Thus, the display apparatus DSP can display an image on the image region MA and display black and a character string on the black region BA.

Note that the operation method of the structure example described in this specification and the like is not limited to Step ST1 to Step ST5 shown in FIG. 7. In this specification and the like, processing illustrated in the flowcharts is classified according to functions and illustrated as independent steps. However, in actual processing or the like, it is difficult to separate processing illustrated in the flowcharts on the function basis, and there can be one or both of a case where a plurality of steps are associated with one step and a case where one step is associated with a plurality of steps. Thus, the processing illustrated in the flowcharts is not limited to each step described in the specification, and the steps can be interchanged as appropriate according to circumstances. Specifically, in some cases, the order of steps can be changed, a step can be added or omitted, for example, according to circumstances.

Note that this embodiment can be combined with any of the other embodiments in this specification as appropriate.

Embodiment 2

In this embodiment, an electronic device including the display apparatus described in the above embodiment is described. Note that the electronic device can be a head-mounted display, for example.

When a user wears a head-mounted display, an image (light) displayed on the display apparatus in the head-mounted display is given to the eyes of the user. In the case where a speaker (a sound output portion) is provided in a head-mounted display, sound from the speaker is supplied to the user's ear.

By increasing the definition of the display portion of the display apparatus or the color reproducibility of the display portion, the sense of reality and the sense of immersion with the head-mounted display can be improved. When a headphone that can reduce sound (e.g., environmental sound) from the outside is used as the speaker, the sense of reality and the sense of immersion with the head mounted display can be further improved.

However, by improving the sense of reality and the sense of immersion, a user wearing a head-mounted display is less likely to obtain information on the outside environment in some cases. For example, a user wearing the head-mounted display cannot see the surroundings of the user, and thus the user cannot notice a change in the surroundings in some cases. Specifically, when another person approaches a user wearing the head-mounted display, the user cannot notice the approach of the person. For another example, when another person calls the user wearing the head-mounted display, the user cannot notice the call in some cases. Furthermore, for example, a user wearing the head-mounted display cannot notice sounds such as call alerts (e.g., intercom sounds), alarm sounds (e.g., sounds of gas leak alarm, fire alarm, and emergency earthquake warning), and surrounding environmental sounds in some cases.

One embodiment of the present invention is an electronic device considered in view of the above problems. Specifically, one embodiment of the present invention is an electronic device (head-mounted display) with which a user is capable of obtaining information on the outside environment in wearing the electronic device (head-mounted display).

Structure Example 1

Figure 8A:
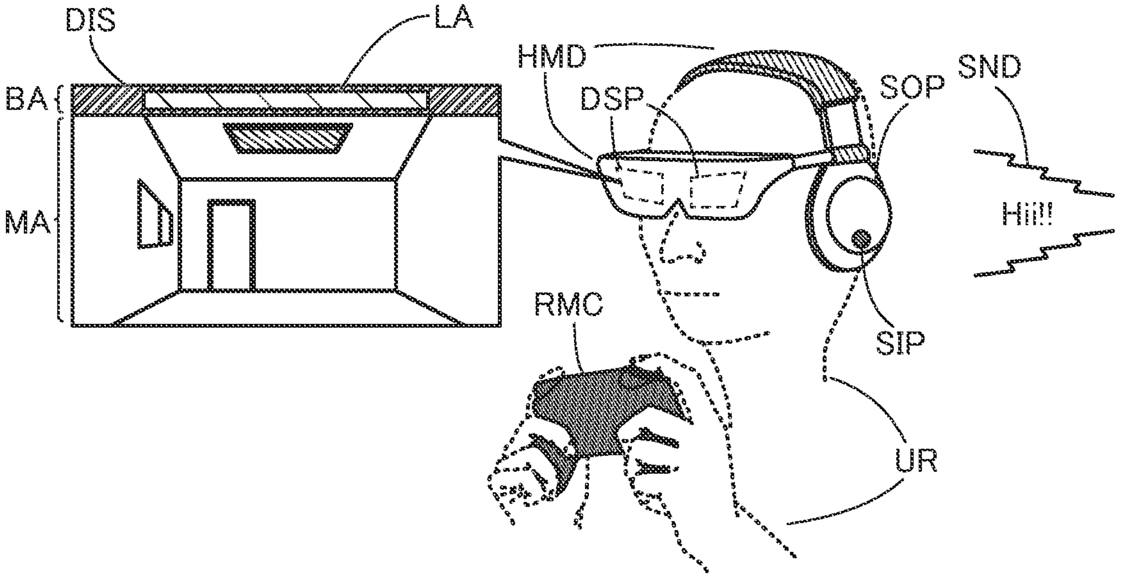
FIG. 8A and FIG. 8B are diagrams illustrating an example of an electronic device.

FIG. 8A illustrates a structure of an electronic device of one embodiment of the present invention. FIG. 8A illustrates a state where a user UR wears a head-mounted display HMD, which is an electronic device of one embodiment of the present invention. In FIG. 8A, the user UR operates the head-mounted display HMD with a controller RMC. FIG. 8A also illustrates an image displayed on the display portion DIS of the display apparatus DSP.

The head-mounted display HMD illustrated in FIG. 8A includes a display apparatus DSP, a sound output portion SOP, and a sound input portion SIP, as an example. Note that each of the display apparatus DSP, the sound output portion SOP, and the sound input portion SIP is attached to a housing of the head-mounted display HMD.

For example, the description of the display apparatus DSP described in Embodiment 1 is referred to for the display apparatus DSP.

The screen size of the display apparatus DSP can be 0.99 inches, 1.50 inches, and 2 inches, for example. The screen resolution of the display apparatus DSP can be any one of 8K UHD (8K Ultra High Definition, 8K4K) (7680×4320), UHD (Ultra High Definition, 4K2K) (3840×2160), and FHD (Full High Definition) (1920×1080).

In the display portion of the display apparatus DSP in FIG. 8A, the image region MA and the black region are provided, for example. In addition, an image generated by the application of the head-mounted display HMD is displayed in the image region MA. In FIG. 8A, the user UR operates the head-mounted display HMD with the use of the controller RMC while watching the image region MA.

The sound output portion SOP has a function of supplying sound to the user UR, for example. The sound can be a sound of application launched in the head-mounted display HMD. The sound output portion SOP can be a speaker.

The sound input portion SIP has a function of obtaining surrounding sound (outside sound) of the user UR wearing the head-mounted display HMD, for example. The sound is converted into an electric signal and processed by an internal circuit of the head-mounted display HMD. For example, the sound input portion SIP obtains sound SND generated in the outside and processes the sound SND as input data by an internal circuit of the head-mounted display HMD. The sound input portion SIP can be a microphone, for example.

Examples of the sound SND include another person's voice (call), intercom sounds, and warning sound.

When the sound SND is input to the sound input portion SIP, the internal circuit of the head-mounted display HMD generates text information on the basis of the sound SND. Next, an image including a character string LA is generated using the generated text information. Thus, the image including the character string LA can be displayed on the black region BA of the display portion DIS included in the display apparatus DSP.

For example, when the sound SND is subjected to another person's voice (call), the generated character string LA can be "A (the name of another person) is calling you" or "someone is calling you". Furthermore, for example, when the sound SND is an intercom sound, the generated string LA can be "You have a guest" or "There is someone to see you". For example, when the sound SND is an alarm sound, the generated character string LA can be "Gas leakage alarm" or "Fire warning", "Earthquake early warning".

Although the head-mounted display HMD illustrated in FIG. 8A has a structure in which information on the surrounding of the user UR is obtained by the sound input portion SIP, one embodiment of the present invention is not limited thereto. One embodiment of the present invention may include a sensor SNC, for example. For example, the head-mounted display HMD illustrated in FIG. 8B has a structure in which the sound input portion SIP is not provided and the sensor SNC is provided in the head-mounted display HMD in FIG. 8A.

The sensor SNC can be an image sensor capable of receiving at least one of visible light and infrared rays, for example.

Figure 8B:
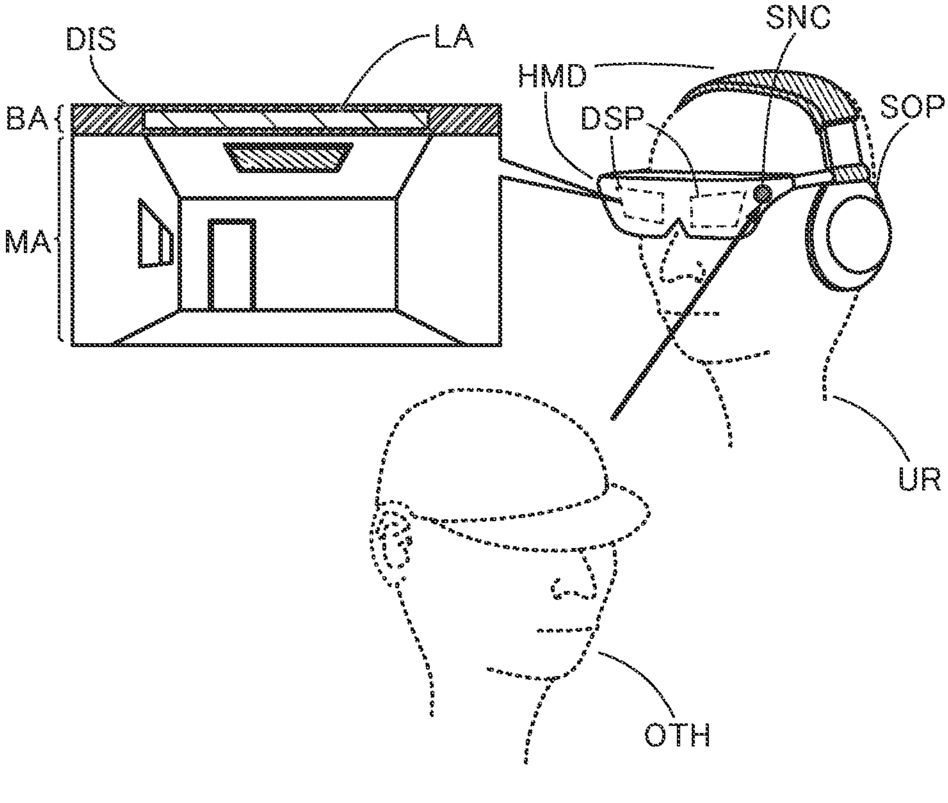

Note that FIG. 8B also illustrates another person OTH that is around the user UR.

By capturing an image of another person OTH taken by the sensor SNC, the internal circuit of the head-mounted display HMD generates text information on the basis of a content captured. Next, an image including the character string LA is generated using the generated text information. Thus, the image including the character string LA can be displayed on the black region BA of the display portion DIS included in the display apparatus DSP.

For example, when the sensor SNC detects the approach of another person OTH, the generated character string LA can be "Person approaching" or "Person nearby", so that an attention can be given to the user UR.

Although FIG. 8B illustrates another person OTH, an object may be detected as well as a person. In that case, for example, when the sensor SNC detects the approach of an object, the generated character string LA can be "Object approaching" or "Be careful".

Note that in the head-mounted display HMD in FIG. 8B, the sensor SNC is provided in a housing including the display apparatus DSP; however, the position of the sensor SNC may be one or more selected from a housing provided with the sound output portion SOP, a temple part of the head-mounted display HMD, and a head-mount portion. When the number of sensors SNC is increased in the head-mounted display HMD in FIG. 8B, information about a person or an object nearby the user UR can be easily obtained.

One embodiment of the present invention may be a structure of the head-mounted display HMD in which notification information transmitted to the information terminal is displayed on the black region BA of the display portion DIS, for example. Examples of the information terminal include a wearable terminal, a portable terminal including a smartphone, a tablet terminal, and a desktop terminal.

Figure 9:
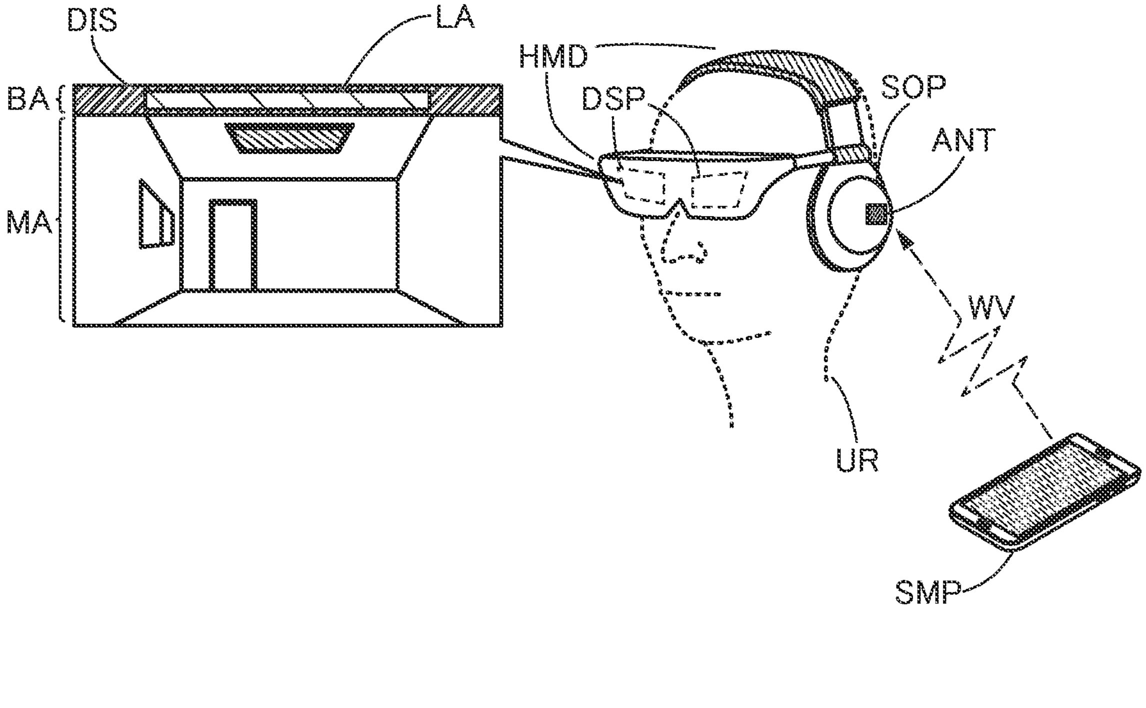
FIG. 9 is a diagram illustrating examples of electronic devices.

For example, one embodiment of the present invention may be a head-mounted display HMD including an antenna ANT as illustrated in FIG. 9. The head-mounted display HMD illustrated in FIG. 9 has a structure in which the sound input portion SIP is not provided and an antenna ANT is provided in the head-mounted display HMD in FIG. 8A.

FIG. 9 illustrates an example in which notification information is received by the information terminal SMP, which is a smartphone, and is transmitted to the head-mounted display HMD.

Examples of the notification information include notification of E-mails and SNS (Social Networking Service), news, update information of applications, and update information of an operating system.

When the information terminal SMP obtains notification information, the information terminal SMP transmits a wireless signal WV to the antenna ANT of the head-mounted display HMD. The wireless signal WV contains the notification information obtained by the information terminal SMP. When the wireless signal WV is received by the antenna ANT, the head-mounted display HMD obtains the notification information from the wireless signal WV and generates text information on the basis of the notification information. Next, an image including the character string LA is generated using the generated text information. After that, the image including the character string LA can be displayed on the black region BA of the display portion DIS included in the display apparatus DSP. Accordingly, the user UR can notice the notification information transmitted to the information terminal SMP even when wearing the head-mounted display HMD.

Figure 10:
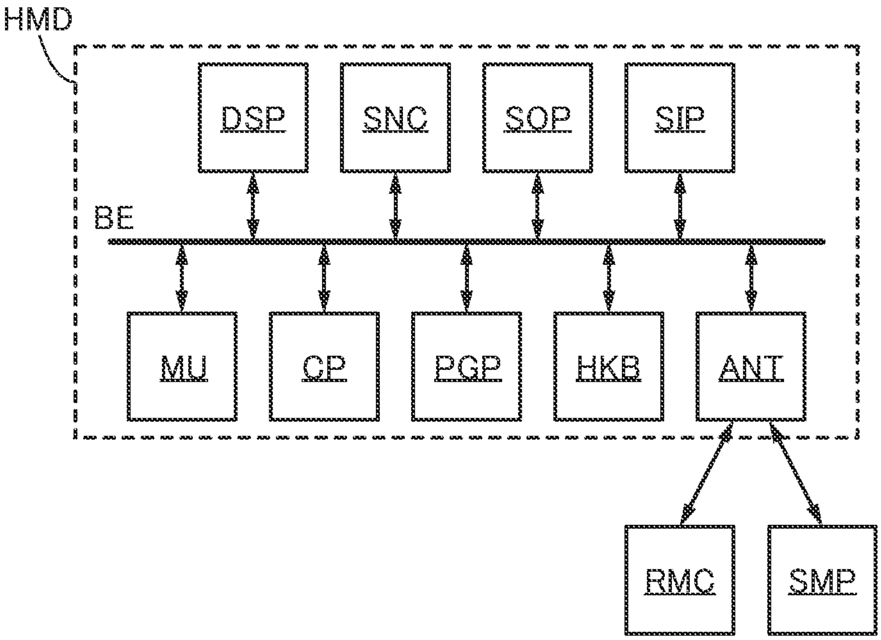
FIG. 10 is a block diagram illustrating a structure example of an electronic device.

Next, examples of components included in the head-mounted display HMD of any one of FIG. 8A to FIG. 9 are described. FIG. 10 is a block diagram illustrating an example of a head-mounted display HMD. The head-mounted display HMD illustrated in FIG. 10 includes the display apparatus DSP, the sensor SNC, the sound output portion SOP, the sound input portion SIP, the antenna ANT, an image generation portion PGP, a conversion portion HKB, a control portion CP, and a memory unit MU. Note that FIG. 10 also illustrates the controller RMC and the information terminal SMP.

The head-mounted display HMD has a structure in which the display apparatus DSP, the sensor SNC, the sound output portion SOP, the sound input portion SIP, the antenna ANT, the conversion portion HKB, the image generation portion PGP, the control portion CP, and the memory unit MU transmit and receive a variety of signals from one another through bus wirings BE.

For the display apparatus DSP illustrated in FIG. 10, the description of the display apparatus DSP described in Embodiment 1 is referred to.

For the sensor SNC, the sound output portion SOP, the sound input portion SIP, the antenna ANT, and the controller RMC illustrated in FIG. 10, the above description is referred to.

The control portion CP illustrated in FIG. 10 has a function of performing general-purpose processing such as execution of an operating system, control of data, and execution of various kinds of arithmetic operations and programs, for example. Thus, the control portion CP may include a CPU. In the head-mounted display HMD in FIG. 10, the control portion CP has a function of transmitting a control signal to each circuit included in the head-mounted display HMD, for example.

The CPU included in the control portion CP may include a circuit for temporarily backing up data (hereinafter, referred to as a backup circuit). The backup circuit is preferably capable of, for example, retaining the data even after supply of power supply voltage is stopped. For example, in the case where the display apparatus DSP displays a still image, the CPU can cease to work until an image different from the currently displayed still image is displayed. Accordingly, the data under processing by the CPU is temporarily saved in the backup circuit and then supply of power supply voltage to the CPU is stopped to stop the CPU, whereby dynamic power consumption by the CPU can be reduced. In this specification and the like, a CPU including a backup circuit is referred to as an NoffCPU (registered trademark).

The conversion portion HKB has a function of obtaining notification information of the sound SND obtained by the sound input portion SIP, captured image obtained by the sensor SNC, or the information terminal SMP received by the antenna ANT and converting the notification information into text information. For example, in the usage example of the head-mounted display HMD illustrated in FIG. 8A, the conversion portion HKB converts the sound SND into text information with sound recognition. For example, in the usage example of the head-mounted display HMD illustrated in FIG. 8B, the conversion portion HKB performs image analysis to convert information about a person or an object around the user UR into text information.

The conversion portion HKB illustrated in FIG. 10 may include an arithmetic circuit for performing an arithmetic operation of the calculation model of the artificial neural network. Examples of the arithmetic circuit include a product-sum operation circuit and an activation function circuit. That is, the conversion portion HKB may include the above-described AI accelerator.

In the case where the conversion unit HKB can perform arithmetic operation of the calculation model of an artificial neural network, for example, the sound SND can be recognized in the usage example of the head-mounted display HMD illustrated in FIG. 8A in some cases. The conversion portion HKB can determine whether the sound SND is any one of another person's call, an intercom sound, and an alarm sound with sound recognition using the artificial neural network and convert the sound SND into data containing appropriate text information, for example.

Examples of the calculation model of the artificial neural network that can be used as the sound recognition include a recurrent neural network (RNN), an LSTM (Long Short-Time Memory), a Transformer, and a BERT (Bidirectional Encoder Representations from Transformers). Moreover, for example, a dynamic time warping method or a hidden Markov model may be used.

In the case where an arithmetic operation of the calculation model of the artificial neural network can be performed with the conversion portion HKB, for example, a person or an object around the user UR can be recognized in the usage example of the head-mounted display HMD illustrated in FIG. 8B in some cases. The conversion unit HKB can identify a person or an object around the user UR by image analysis using the artificial neural network and convert the information of the person or the object around the user UR into appropriate text information (referred to as text data in some cases).

For the artificial neural network used for image analysis, deep learning is particularly preferably used. As deep learning, for example, a convolutional neural network (CNN), a recurrent neural network, an autoencoder (AE), a variational autoencoder (VAE), a generative adversarial network (GAN), or the like is preferably used. Examples of calculation models other than the artificial neural network used for image analysis include Random Forest, Support Vector Machine, and Gradient Boosting.

The image generation portion PGP has a function of generating image data containing a character string LA corresponding to text information, using the text information converted by the conversion portion HKB. The image data is transmitted to the circuit GP2 of the display apparatus DSP, for example, so that the character string LA can be displayed on the black region BA of the display portion DIS of the display apparatus DSP.

The memory unit MU illustrated in FIG. 10 has a function of retaining at least one piece of temporary data generated in firmware (sometimes an operating system) of the head-mounted display HMD, the above-described calculation model, and each circuit included in the head-mounted display HMD, for example. The memory unit MU may include at least one of an HDD and an SDD, for example.

Example 1 of Operation Method

Figure 11:
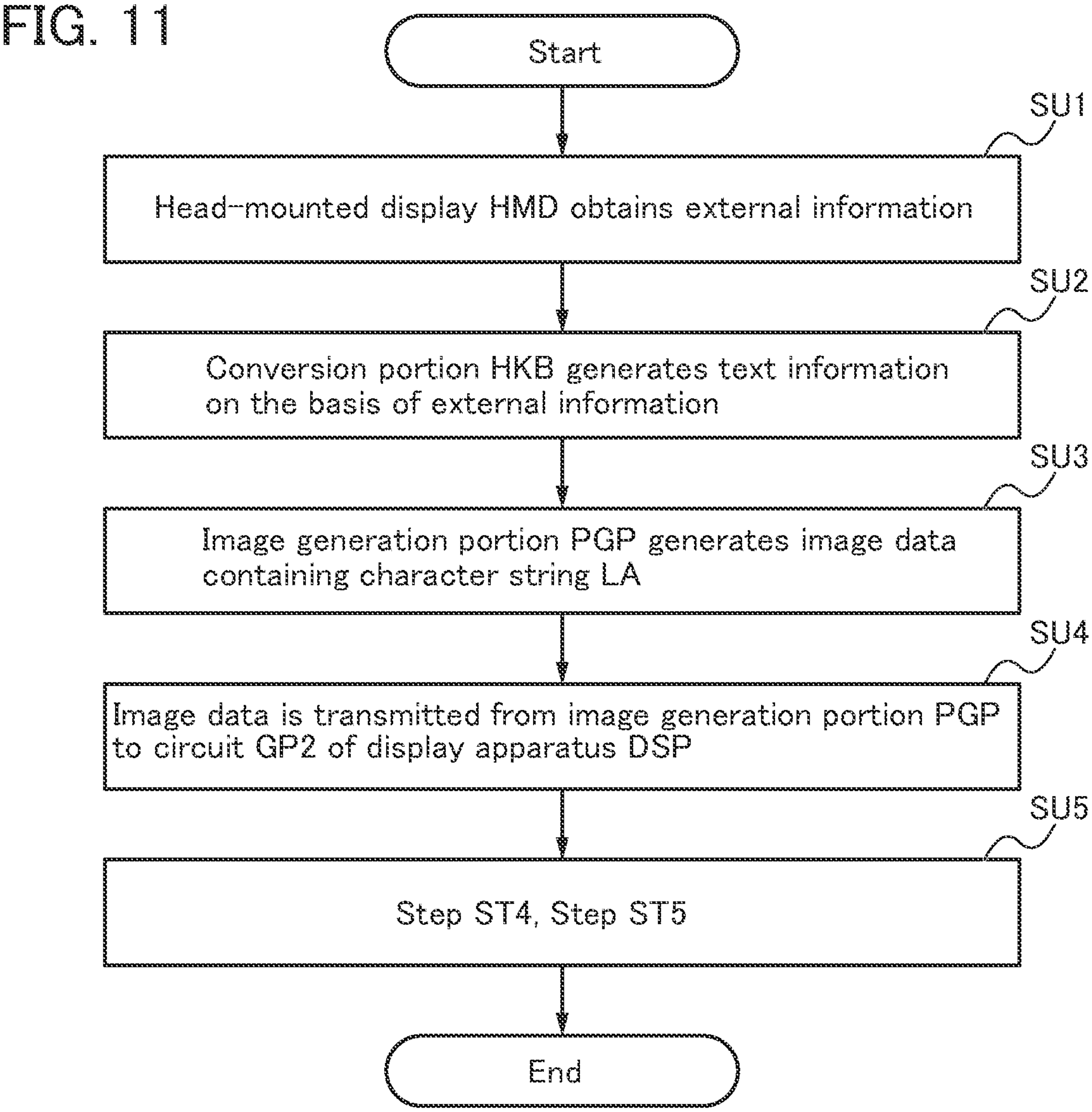
FIG. 11 is a flowchart illustrating an operation example of an electronic device.

Examples of an operation method of an electronic device of one embodiment of the present invention will be described. FIG. 11 is a flowchart illustrating an example of an operation method of the head-mounted display HMD illustrated in FIG. 8A to FIG. 10. The flowchart illustrated in FIG. 11 includes Step SU1 to Step SU5.

[Step SU1]

Step SU1 includes a step of obtaining external information with the head-mounted display HMD. Note that the external information here can be the sound SND in FIG. 8A, the surroundings of the user UR in FIG. 8B, or notification information received by the information terminal SMP in FIG. 9. In the case where the external information is the sound SND in FIG. 8A, the head-mounted display HMD obtains the sound SND with the sound input portion SIP; in the case where the external information is the surroundings of the user UR in FIG. 8B, the head-mounted display HMD obtains information on the surroundings of the user UR with the sensor SNC; or in the case where the external information is the notification information received by the information terminal SMP in FIG. 9, the head-mounted display HMD obtains the notification information from the information terminal SMP with the antenna ANT.

[Step SU2]

Step SU2 includes a step in which the conversion portion HKB generates text information on the basis of the external information obtained in Step SU1.

As generation of the text information, a calculation model of the artificial neural network described above can be used, for example. The conversion portion HKB may select a calculation model from a plurality of calculation models for performing arithmetic operation depending on the kind of external information obtained by the head-mounted display HMD.

[Step SU3]

Step SU3 includes in which the image generation portion PGP generates image data containing the character string LA using text information generated in Step SU2.

[Step SU4]

Step SU4 includes a step in which the image generation portion PGP transmits the image data generated in Step SU3 from the image generation portion PGP to the circuit GP2 of the display apparatus DSP.

[Step SU5]

Step SU5 includes, for example, a step of performing Step ST4 and Step ST5 in the flowchart illustrated in FIG. 7.

Thus, the head-mounted display HMD can display the character string LA on the black region BA of the display portion DIS so that external information around the user UR can be given to the user UR.

Structure Example 2

The head-mounted display HMD of one embodiment of the present invention may include the sound input portion SIP and the sensor SNC. Furthermore, the head-mounted display HMD may display an image captured by the sensor SNC on the image region MA of the display portion DIS. Note that the above-described head-mounted display HMD can have the structure of the block diagram illustrated in FIG. 10, for example.

Figure 12A:
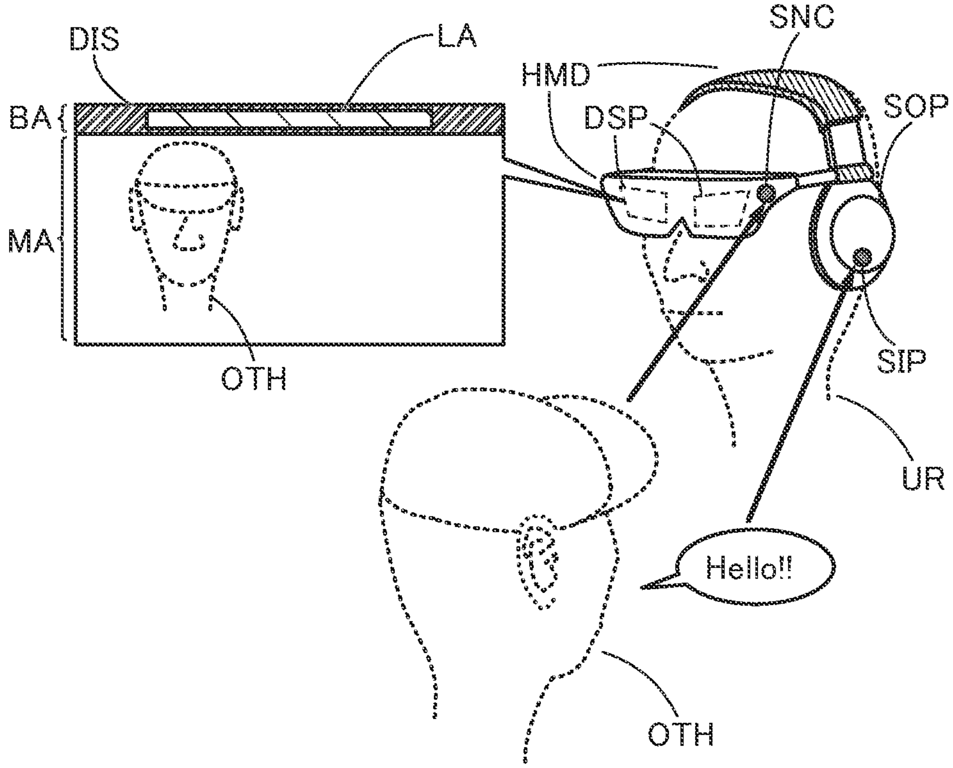
FIG. 12A and FIG. 12B are diagrams illustrating an example of an electronic device.

FIG. 12A illustrates a state where the user UR wears the head-mounted display HMD including the sound input portion SIP and the sensor SNC. FIG. 12A also illustrates a state where an image of another person OTH is captured by the sensor SNC.

The image captured by the sensor SNC may be displayed on the display portion DIS of the display apparatus DSP of the head-mounted display HMD. FIG. 12A illustrates an example in which an image captured (another person OTH) is displayed on the image region MA of the display portion DIS.

Like the head-mounted display HMD illustrated in FIG. 8A, the head-mounted display HMD in FIG. 12A may be configured to display a character string LA corresponding to a sound (e.g., "Hello!!", the voice uttered from another person OTH in FIG. 12A) input to the sound input portion SIP, on the black region BA of the display portion DIS. In particular, a voice uttered from another person OTH may be obtained by the sound input portion SIP and then subjected to sound recognition by the conversion portion HKB of the head-mounted display HMD, so that the voice is converted into text information and the text information is displayed on the black region BA as the character string LA.

Figure 12B:
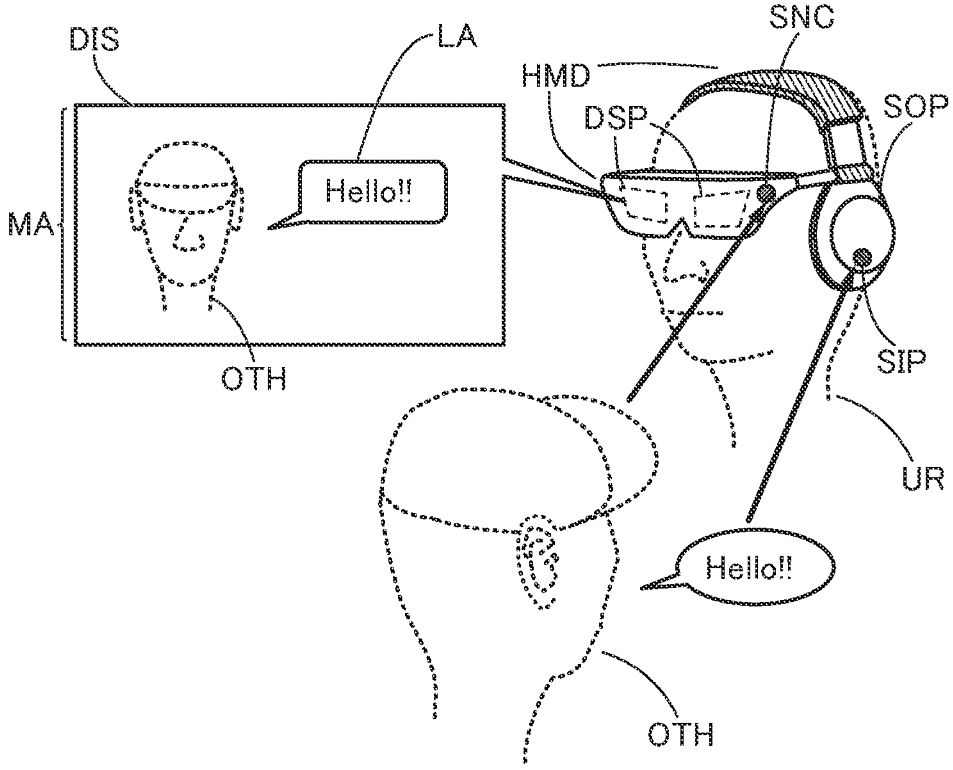

Furthermore, as illustrated in FIG. 12B, the character string LA into which the voice uttered from another person OTH (e.g., "Hello!!", the voice uttered from another person OTH in FIG. 12B) is converted may be displayed on the image region MA instead of the black region BA. In that case, for example, when the image generation portion PGP of the head-mounted display HMD performs image processing so that the character string LA can be displayed on the image captured by the sensor SNC, a captured image containing the character string LA can be displayed on the display portion DIS as illustrated in FIG. 12B.

With the electronic device of one embodiment of the present invention, the surrounding sound can be displayed on the display portion DIS as a character string. Accordingly, the surrounding sound can be caught visually, which will lead to the support for those who are deaf (hard of hearing).

Example 2 of Operation Method

Figure 13:
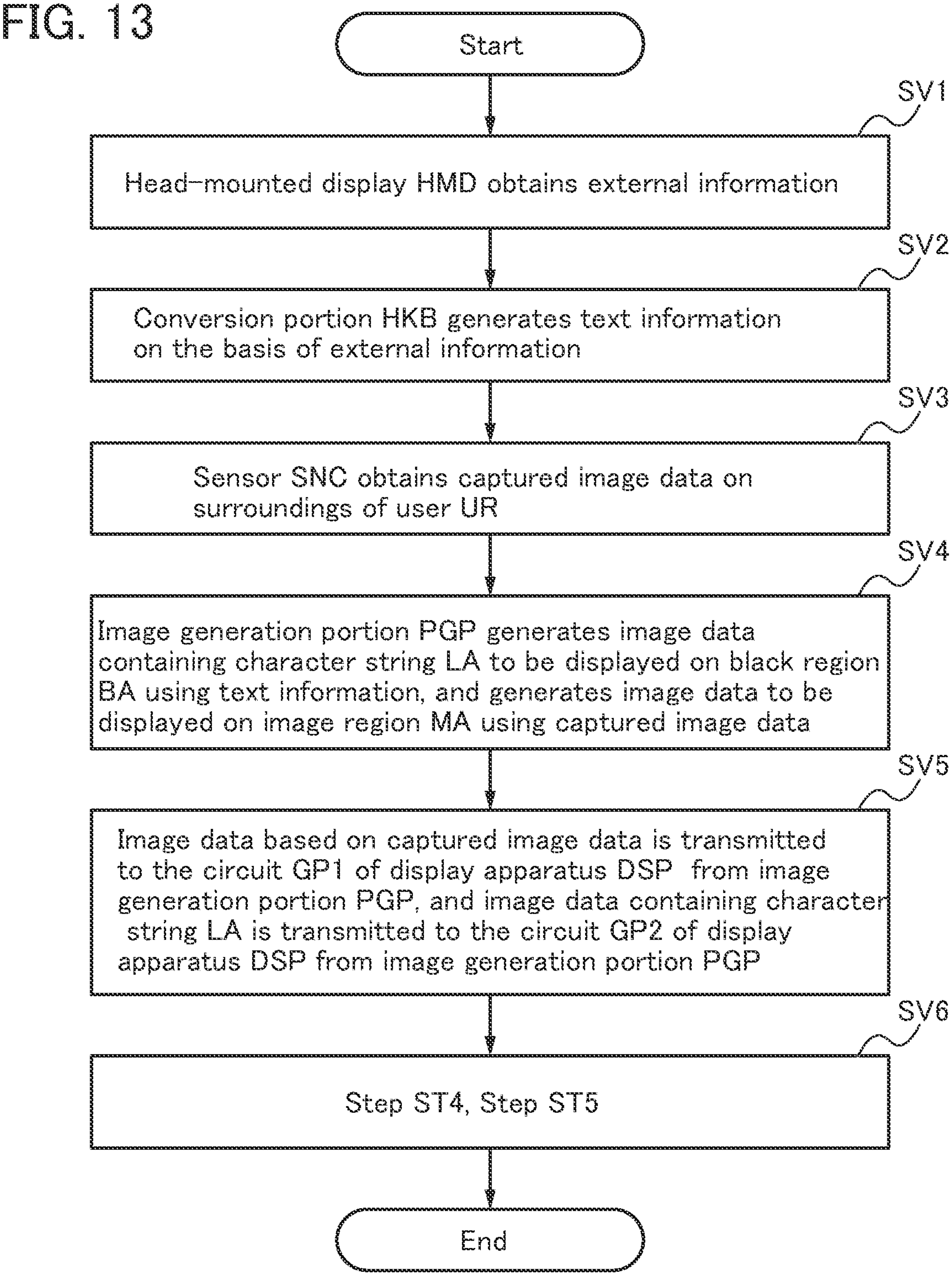
FIG. 13 is a flowchart illustrating an operation example of an electronic device.

Examples of an operation method of an electronic device of one embodiment of the present invention will be described. FIG. 13 is a flowchart illustrating an example of an operation method of the head-mounted display HMD illustrated in FIG. 12A. The flowchart illustrated in FIG. 13 includes Step SV1 to Step SV6.

[Step SV1]

Step SV1 includes a step of obtaining external information with the head-mounted display HMD. Note that the external information here can be the voice uttered from another person OTH in FIG. 12A. Specifically, for example, the sound input portion SIP of the head-mounted display HMD receives the voice uttered from another person OTH.

[Step SV2]

Step SV2 includes a step in which the conversion portion HKB generates text information on the basis of the external information obtained in Step SV1.

In this step, for example, the conversion portion HKB generates text information on the basis of the voice uttered from another person OTH by sound recognition. Note that a calculation model of the artificial neural network described above can be used for the generation of the text information, for example.

[Step SV3]

Step SV3 includes a step of capturing an image of the surroundings of the user UR with the sensor SNC of the head-mounted display HMD. Accordingly, the head-mounted display HMD can obtain captured image data of the surroundings of the user UR.

In Step SV3, the conversion portion HKB may identify a person or an object around the user UR from the captured image data by image analysis.

Note that Step SV1 and Step SV2 may be performed earlier than Step SV3 or at the same time as Step SV3.

[Step SV4]

Step SV4 includes a step in which the image generation portion PGP generates image data displayed on the display portion DIS of the display apparatus DSP by using the text information generated in Step SV2 and the captured image data in Step SV3. Specifically, for example, the step SV4 includes a step in which the image generation portion PGP generates image data containing the character string LA to be displayed on the black region BA of the display portion DIS from the text information generated in Step SV2, and a step in which the image generation portion PGP generates image data to be displayed on the image region MA of the display portion DIS from the captured image data generated in Step SV3.

[Step SV5]

Step SV5 includes a step in which the image generation portion PGP transmits image data generated in Step SV4 to the image processing unit GPS of the display apparatus DSP from the image generation portion PGP. Specifically, for example, Step SV5 includes a step in which the image generation portion PGP transmits the image data on the basis of the captured image data generated in Step SV4 to the circuit GP1, and a step in which the image generation portion PGP transmits the image data containing the character string LA generated in Step SV4 to the circuit GP2.

[Step SV6]

The step SV6 includes, for example, a step of performing Step ST4 and Step ST5 in the flowchart illustrated in FIG. 7.

Through the above operation, the display apparatus DSP can display the captured image on the image region MA and display the character string LA on the black region BA as illustrated in FIG. 12A.

Example 3 of Operation Method

Figure 14:
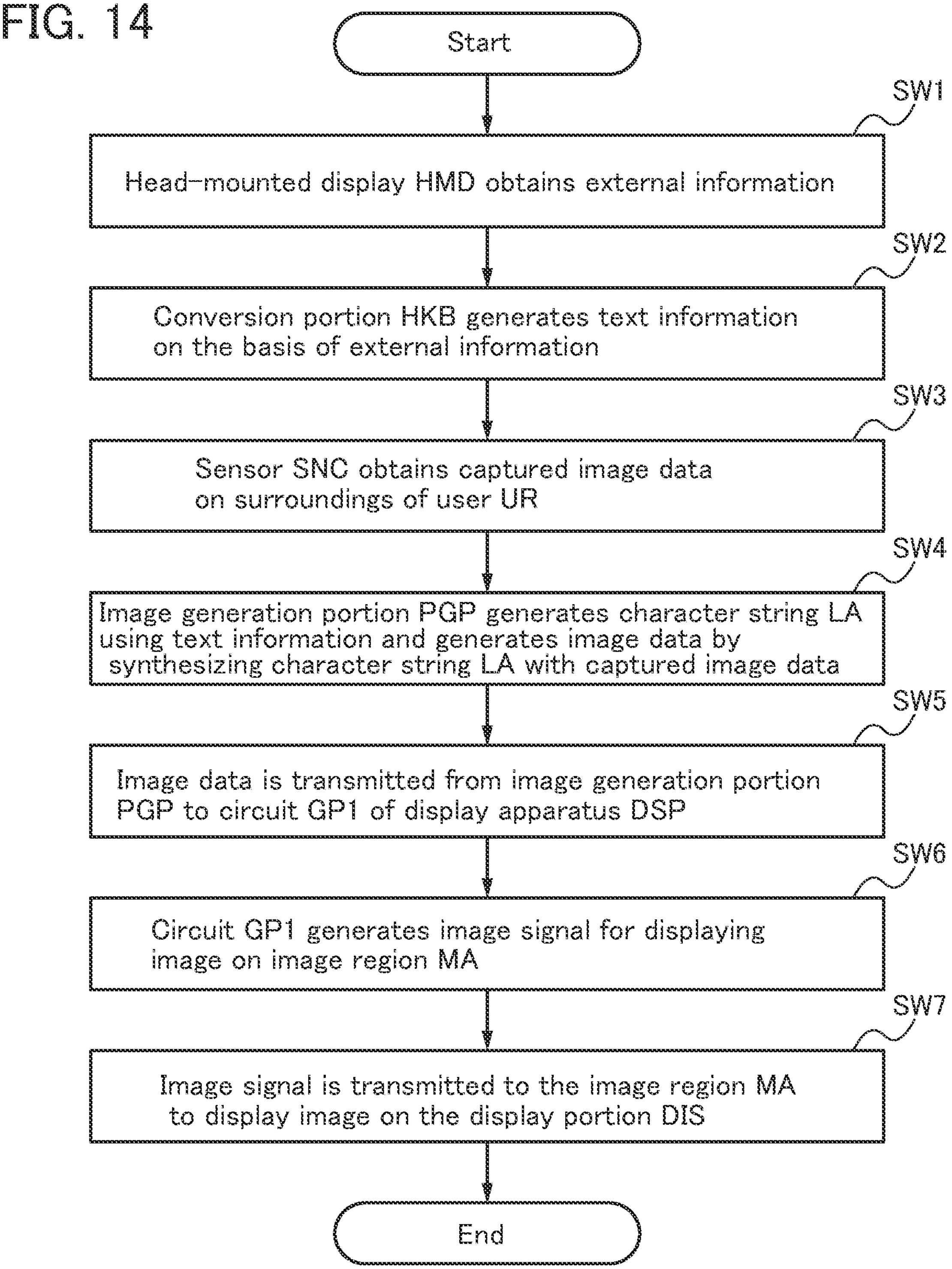
FIG. 14 is a flowchart illustrating an operation example of an electronic device.

Next, an example of a method for operating the head-mounted display HMD illustrated in FIG. 12B is described. FIG. 14 is a flowchart illustrating an example of an operation method of the head-mounted display HMD illustrated in FIG. 12B. The flowchart illustrated in FIG. 14 includes Step SW1 to Step SW5.

[Step SW1 to Step SW3]

The operations in Step SW1 to Step SW3 are similar to those in Step SV1 to Step SV3 described above. Therefore, for the operations of Step SW1 to Step SW3, the description of Step SV1 to Step SV3 is referred to.

[Step SW4]

Step SW4 includes a step in which the image generation portion PGP generates image data to be displayed on the display portion DIS of the display apparatus DSP by using the text information generated in Step SW2 and the image data captured in Step SW3. Specifically, for example, Step SW4 includes a step in which the image generation portion PGP generates the character string LA from the text information generated in Step SV2 and a step in which the image generation portion PGP generates image data by synthesizing the character string LA with the captured image data generated in Step SV3. Note that in Step SW3, the person that has uttered voice is identified by performing image analysis by the conversion portion HKB, and the position of the character string LA can be optimized in some cases.

[Step SW5]

Step SW5 includes a step in which the image generation portion PGP transmits the image data generated in Step SW4 to the image processing unit GPS of the display apparatus DSP from the image generation portion PGP. Specifically, for example, Step SW5 includes a step in which the image generation portion PGP transmits, to the circuit GP1, image data obtained by synthesizing the captured image data generated in Step SV4 with the character string LA.

[Step SW6]

Step SW6 includes a step in which the circuit GP1 generates an image signal for displaying an image on the image region MA.

[Step SW7]

Step SW7 includes a step of transmitting the image signal generated by the circuit GP1 in Step SW6 to the display region ARA of the image region MA in the display portion DIS.

By the above operation, the display apparatus DSP can display the captured image and the character string LA on the image region MA as illustrated in FIG. 12B.

This embodiment has described a goggles-type head-mounted display; however, the electronic device of one embodiment of the present invention may be a glasses-type head-mounted display.

As described above, when the display apparatus DSP described in Embodiment 1 is used in the head-mounted display HMD, the user UR can recognize a voice, a person, or an object in the surroundings of the user UR as text information while the user UR is wearing and operating the head-mounted display HMD. In addition, notification information transmitted to an electronic device different from the head-mounted display HMD can be displayed on the display apparatus DSP of the head-mounted display HMD.

Note that this embodiment can be combined with any of the other embodiments in this specification as appropriate.

Embodiment 3

In this embodiment, a display apparatus that can be provided in an electronic device of one embodiment of the present invention will be described. Note that the display apparatus described in this embodiment can be used in the display portion DIS described in the above embodiment.

Structure Example of Display Apparatus

Figure 15:
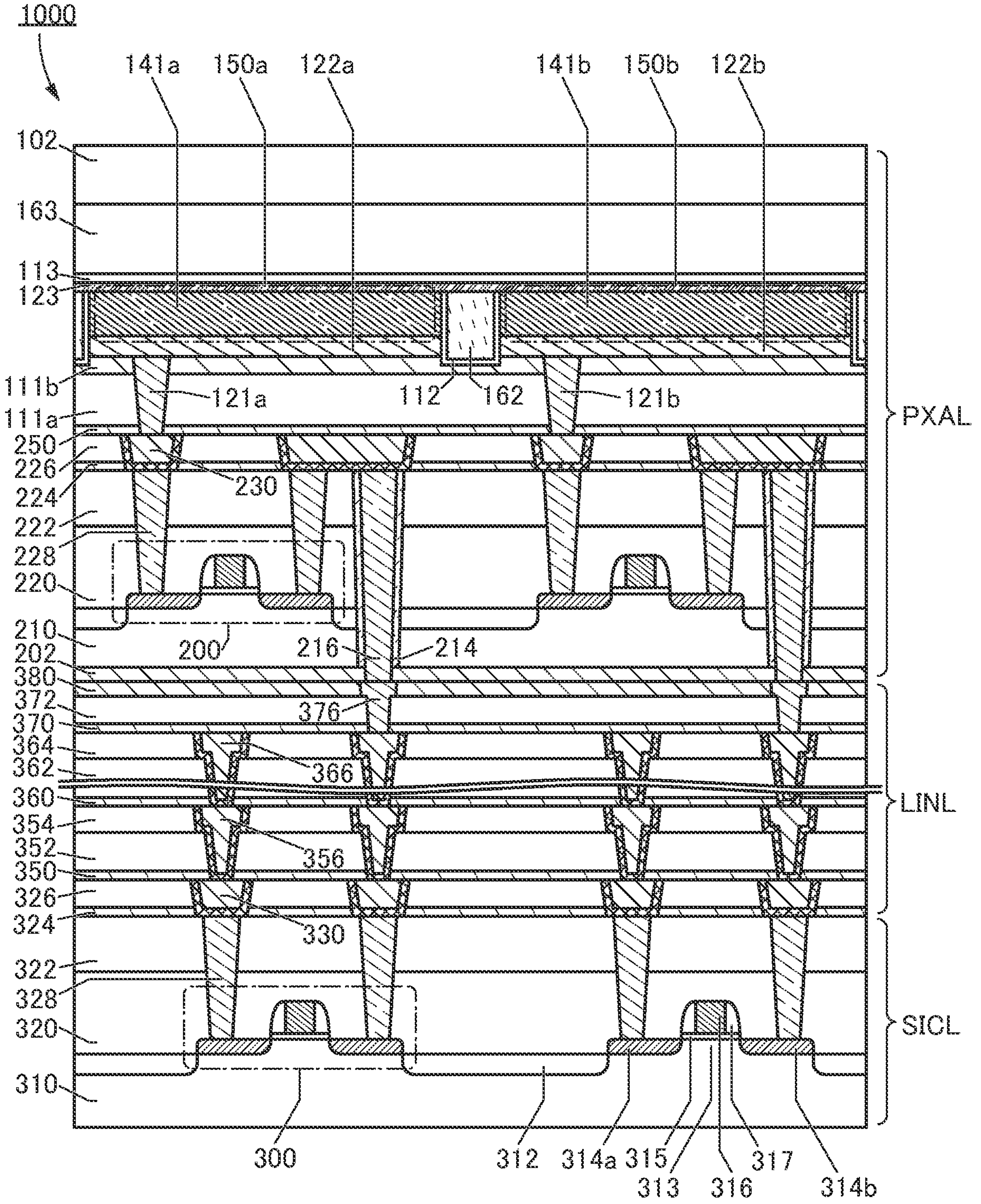
FIG. 15 is a schematic cross-sectional view illustrating a structure example of a display apparatus.

FIG. 15 is a cross-sectional view illustrating an example of a display apparatus of one embodiment of the present invention. A display apparatus 1000 illustrated in FIG. 15 has a structure in which a pixel circuit, a driver circuit, and the like are provided over a substrate 310, for example. Note that the display apparatus DSP described in the above embodiment can have a structure of the display apparatus 1000 in FIG. 15.

Specifically, for example, the circuit layer SICL, the wiring layer LINL, and the pixel layer PXAL illustrated in the display apparatus DSP in FIG. 2 can be those in the display apparatus 1000 in FIG. 15. The circuit layer SICL includes the substrate 310, for example, and a transistor 300 is formed over the substrate 310. The wiring layer LINL is provided above the transistor 300, and the wiring layer LINL includes wirings that electrically connect the transistor 300, a transistor 200 to be described later, a light-emitting device 150*a* and a light-emitting device 150*b* to be described later, and the like. The pixel layer PXAL is provided above the wiring layer LINL, and the pixel layer PXAL includes, for example, the transistor 200 and a light-emitting device 150 (the light-emitting device 150*a* and the light-emitting device 150*b* in FIG. 15).

As the substrate 310, a semiconductor substrate (e.g., a single crystal substrate containing silicon or germanium as a material) can be used, for example. Besides the semiconductor substrate, for example, an SOI (Silicon On Insulator) substrate, a glass substrate, a quartz substrate, a plastic substrate, a sapphire glass substrate, a metal substrate, a stainless steel substrate, a substrate including stainless steel foil, a tungsten substrate, a substrate including tungsten foil, a flexible substrate, an attachment film, or paper or a base material film containing a fibrous material can be used as the substrate 310. Examples of the glass substrate include barium borosilicate glass, aluminoborosilicate glass, and soda lime glass. Examples of the flexible substrate, the attachment film, the base material film, and the like, include plastics typified by polyethylene terephthalate (PET), polyethylene naphthalate (PEN), polyether sulfone (PES), and polytetrafluoroethylene (PTFE). Another example is a synthetic resin such as an acrylic resin. Other examples include polypropylene, polyester, polyvinyl fluoride, and polyvinyl chloride. Other examples include polyamide, polyimide, aramid, an epoxy resin, an inorganic vapor deposition film, and paper. Note that in the case where the fabrication process of the display apparatus 1000 includes heat treatment, a highly heat-resistant material is preferably selected for the substrate 310.

In the description of this embodiment, the substrate 310 is a semiconductor substrate, specifically, a single crystal substrate containing silicon.

The transistor 300 is provided on the substrate 310 and includes an element isolation layer 312, a conductor 316, an insulator 315, an insulator 317, a semiconductor region 313 that is part of the substrate 310, and a low-resistance region 314*a* and a low-resistance region 314*b* that function as a source region and a drain region. Thus, the transistor 300 is a Si transistor. Although FIG. 15 illustrates a structure in which one of the source and the drain of the transistor 300 is electrically connected to a conductor 330, a conductor 356, and a conductor 366, which are described later, through a conductor 328 described later, the electrical connection in the display apparatus of one embodiment of the present invention is not limited thereto. The display apparatus of one embodiment of the present invention may have a structure in which, for example, a gate of the transistor 300 is electrically connected to the conductor 330, the conductor 356, and the conductor 366 through the conductor 328.

The transistor 300 can be, for example, a Fin type in which the top surface of the semiconductor region 313 and the side surface thereof in the channel width direction are covered with the conductor 316 with the insulator 315 functioning as a gate insulating film therebetween. The effective channel width can be increased in the Fin-type transistor 300, so that the on-state characteristics of the transistor 300 can be improved. In addition, contribution of the electric field of the gate electrode can be increased, so that the off-state characteristics of the transistor 300 can be improved.

Note that the transistor 300 may be either a p-channel transistor or an n-channel transistor. Alternatively, a plurality of the transistors 300 may be provided and both the p-channel transistor and the n-channel transistor may be used.

A region of the semiconductor region 313 where a channel is formed, a region in the vicinity thereof, and the low-resistance region 314*a* and the low-resistance region 314*b* that function as the source region and the drain region preferably contain a silicon-based semiconductor, specifically, preferably contain single crystal silicon. Alternatively, the regions may each be formed using a material containing germanium (Ge), silicon germanium (SiGe), gallium arsenide (GaAs), or aluminum gallium arsenide (GaAlAs) or gallium nitride (GaN), for example. A structure using silicon whose effective mass is controlled by applying stress to the crystal lattice and changing the lattice spacing may be employed. Alternatively, the transistor 300 may be a HEMT (High Electron Mobility Transistor) using gallium arsenide and aluminum gallium arsenide.

For the conductor 316 functioning as a gate electrode, a semiconductor material such as silicon containing an element that imparts n-type conductivity, such as arsenic or phosphorus or an element that imparts p-type conductivity, such as boron or aluminum, can be used. Alternatively, for the conductor 316, a conductive material such as a metal material, an alloy material, or a metal oxide material can be used, for example.

Note that since the work function of a conductor depends on the material of the conductor, the threshold voltage of the transistor can be adjusted by selecting the material of the conductor. Specifically, it is preferable to use one or both of titanium nitride and tantalum nitride as the material of the conductor. Moreover, in order to ensure both conductivity and embeddability, it is preferable to use stacked layers of metal materials of one or both of tungsten and aluminum for the conductor, and it is particularly preferable to use tungsten in terms of heat resistance.

The element isolation layer 312 is provided to separate a plurality of transistors formed on the substrate 310 from each other. The element isolation layer can be formed by, for example, a LOCOS (Local Oxidation of Silicon) method, an ST1 (Shallow Trench Isolation) method, or a mesa isolation method.

Note that the transistor 300 illustrated in FIG. 15 is an example and the structure is not limited thereto; an appropriate transistor is used in accordance with a circuit structure, a driving method, or the like. For example, the transistor 300 may have a planar structure instead of a Fin-type structure.

Over the transistor 300 illustrated in FIG. 15, an insulator 320, an insulator 322, an insulator 324, and an insulator 326 are stacked in this order from the substrate 310 side.

For the insulator 320, the insulator 322, the insulator 324, and the insulator 326, silicon oxide, silicon oxynitride, silicon nitride oxide, silicon nitride, aluminum oxide, aluminum oxynitride, aluminum nitride oxide, or aluminum nitride can be used, for example.

The insulator 322 may have a function of a planarization film for eliminating a level difference caused by the transistor 300 or the like covered with the insulator 320 and the insulator 322. For example, the top surface of the insulator 322 may be planarized by planarization treatment using a chemical mechanical polishing (CMP) method to improve planarity.

For the insulator 324, it is preferable to use a barrier insulating film preventing diffusion of impurities such as water and hydrogen from the substrate 310, the transistor 300, or the like to a region above the insulator 324 (e.g., the region where the transistor 200, the light-emitting device 150*a*, the light-emitting device 150*b*, and the like are provided). Accordingly, for the insulator 324, it is preferable to use an insulating material that has a function of suppressing diffusion of impurities such as a hydrogen atom, a hydrogen molecule, and a water molecule (through which the above impurities are less likely to pass). Furthermore, depending on the situation, for the insulator 324, it is preferable to use an insulating material that has a function of reducing diffusion of impurities such as a nitrogen atom, a nitrogen molecule, a nitrogen oxide molecule (e.g., $N_2O$, NO, and $NO_2$), and a copper atom (through which oxygen less likely to pass). In addition, it is preferable that the insulator 324 have a function of reducing diffusion of oxygen (e.g., one or both of an oxygen atom and an oxygen molecule).

For the film having a barrier property against hydrogen, silicon nitride deposited by a CVD (Chemical Vapor Deposition) method can be used, for example.

The amount of released hydrogen can be analyzed by thermal desorption spectroscopy (TDS), for example. The amount of hydrogen released from the insulator 324 that is converted into hydrogen atoms per area of the insulator 324 is less than or equal to $10\times10^{15}$ atoms/cm$^2$, preferably less than or equal to $5\times10^{15}$ atoms/cm$^2$ in TDS analysis in a film-surface temperature range of 50° C. to 500° C., for example.

Note that the permittivity of the insulator 326 is preferably lower than that of the insulator 324. For example, the dielectric constant of the insulator 326 is preferably lower than 4, further preferably lower than 3. The dielectric constant of the insulator 326 is, for example, preferably 0.7 times or less, further preferably 0.6 times or less the dielectric constant of the insulator 324. When a material with a low permittivity is used for an interlayer film, the parasitic capacitance generated between wirings can be reduced.

In addition, the conductor 328 and the conductor 330 that are connected to the light-emitting devices and the like provided above the insulator 326 are embedded in the insulator 320, the insulator 322, the insulator 324, and the insulator 326. Note that the conductor 328 and the conductor 330 each function as a plug or a wiring. A plurality of conductors functioning as plugs or wirings are collectively denoted by the same reference numeral in some cases. Moreover, in this specification and the like, a wiring and a plug connected to the wiring may be a single component. That is, part of a conductor functions as a wiring in some cases and part of a conductor functions as a plug in other cases.

As a material of each of plugs and wirings (e.g., the conductor 328 and the conductor 330), a single layer or a stacked layer of a conductive material such as a metal material, an alloy material, a metal nitride material, or a metal oxide material can be used. It is preferable to use a high-melting-point material that has both heat resistance and conductivity, such as tungsten or molybdenum, and it is preferable to use tungsten. Alternatively, a low-resistance conductive material such as aluminum or copper is preferably used. The use of a low-resistance conductive material can reduce wiring resistance.

A wiring layer may be provided over the insulator 326 and the conductor 330. For example, in FIG. 15, an insulator 350, an insulator 352, and an insulator 354 are stacked in this order above the insulator 326 and the conductor 330. Furthermore, the conductor 356 is formed in the insulator 350, the insulator 352, and the insulator 354. The conductor 356 has a function of a plug or a wiring that is connected to the transistor 300. Note that the conductor 356 can be provided using a material similar to those for the conductor 328 and the conductor 330.

Note that like the insulator 324, for example, the insulator 350 is preferably formed using an insulator having a barrier property against hydrogen, oxygen, and water. Like the insulator 326, the insulator 352 and the insulator 354 are preferably formed using an insulator having a relatively low dielectric constant to reduce parasitic capacitance generated between wirings. The insulator 352 and the insulator 354 each have functions of an interlayer insulating film and a planarization film. Furthermore, the conductor 356 preferably includes a conductor having a barrier property against hydrogen, oxygen, and water.

For the conductor having a barrier property against hydrogen, tantalum nitride is preferably used, for example. The use of a stack including tantalum nitride and tungsten that has high conductivity can suppress diffusion of hydrogen from the transistor 300 while the conductivity of a wiring is kept. In that case, a tantalum nitride layer having a barrier property against hydrogen is preferably in contact with the insulator 350 having a barrier property against hydrogen.

An insulator 360, the insulator 362, and the insulator 364 are stacked in this order over the insulator 354 and the conductor 356.

Like the insulator 324 or the like, the insulator 360 is preferably formed using an insulator having a barrier property against impurities such as water and hydrogen. Thus, the insulator 360 can be formed using any of the materials that can be used for the insulator 324, for example.

The insulator 362 and the insulator 364 each have functions of an interlayer insulating film and a planarization film. Like the insulator 324, the insulator 362 and the insulator 364 are preferably formed using an insulator having a barrier property against impurities such as water and hydrogen. Thus, one or both of the insulator 362 and the insulator 364 can be formed using any of the materials that can be used for the insulator 324.

An opening portion is provided in regions of the insulator 360, the insulator 362, and the insulator 364 that overlap with part of the conductor 356, and the conductor 366 is provided to fill the opening portion. The conductor 366 is also formed over the insulator 362. The conductor 366 has a function of a plug or a wiring connected to the transistor 300, for example. Note that the conductor 366 can be provided using a material similar to those for the conductor 328 and the conductor 330.

An insulator 370 and an insulator 372 are stacked in this order over the insulator 364 and the conductor 366.

Like the insulator 324 or the like, the insulator 370 is preferably formed using an insulator having a barrier property against impurities such as water and hydrogen. Thus, the insulator 370 can be formed using any of the materials that can be used for the insulator 324 or the like, for example.

The insulator 372 has functions of an interlayer insulating film and a planarization film. Like the insulator 324, the insulator 372 is preferably formed using an insulator having a barrier property against impurities such as water and hydrogen. Thus, the insulator 372 can be formed using any of the materials that can be used for the insulator 324.

An opening portion is formed in regions of the insulator 370 and the insulator 372 that overlap with part of the conductor 366, and a conductor 376 is provided to fill the opening portion. The conductor 376 is also formed over the insulator 372. After that, the conductor 376 is patterned into a form of a wiring, a terminal, or a pad by etching treatment or the like.

For example, copper, aluminum, tin, zinc, tungsten, silver, platinum, or gold can be used for the conductor 376. The material used for the conductor 376 preferably contains the same component as the material used for a later-described conductor 216 included in the pixel layer PXAL.

Then, an insulator 380 is deposited to cover the insulator 372 and the conductor 376 and is subsequently subjected to planarization treatment by, for example, a chemical mechanical polishing (CMP) method until the conductor 376 is exposed. In this manner, the conductor 376 serving as a wiring, a terminal, or a pad can be formed over the substrate 310.

Like the insulator 324, the insulator 380 is preferably formed using a film having a barrier property that can prevent diffusion of impurities such as water and hydrogen, for example. That is, the insulator 380 is preferably formed using any of the materials that can be used for the insulator 324. Like the insulator 326, the insulator 380 may be formed using an insulator having a relatively low dielectric constant to reduce parasitic capacitance generated between wirings, for example. That is, the insulator 380 may be formed using any of the materials that can be used for the insulator 326.

The pixel layer PXAL is provided with, for example, a substrate 210, the transistor 200, the light-emitting device 150 (the light-emitting device 150*a* and the light-emitting device 150*b* in FIG. 15), and a substrate 102. Moreover, the pixel layer PXAL is provided with, for example, an insulator 220, an insulator 222, an insulator 226, an insulator 250, an insulator 111*a*, an insulator 111*b*, an insulator 112, an insulator 113, an insulator 162, and a resin layer 163. Furthermore, the pixel layer PXAL is provided with, for example, the conductor 216, a conductor 228, a conductor 230, a conductor 121 (a conductor 121*a* and a conductor 121*b* in FIG. 15), a conductor 122 (a conductor 122*a* and a conductor 122*b* in FIG. 15), and a conductor 123.

An insulator 202 in FIG. 15 functions as a bonding layer together with the insulator 380, for example. The insulator 202 preferably contains, for example, the same component as the material used for the insulator 380.

The substrate 210 is provided above the insulator 202. In other words, the insulator 202 is formed on the bottom surface of the substrate 210. The substrate 210 is preferably a substrate that can be used as the substrate 310, for example. Note that in the description of the display apparatus 1000 in FIG. 15, the substrate 310 is a semiconductor substrate containing silicon as a material.

On the substrate 210, the transistor 200 is formed, for example. Being formed on the substrate 210 that is a semiconductor substrate containing silicon as a material, the transistor 200 functions as a Si transistor. Note that refer to the description of the transistor 300 for the structure of the transistor 200.

Above the transistor 200, the insulator 220 and the insulator 222 are provided. Like the insulator 320, the insulator 220 has functions of an interlayer insulating film and a planarization film, for example. Like the insulator 322, the insulator 222 has functions of an interlayer insulating film and a planarization film, for example.

A plurality of opening portions are provided in the insulator 220 and the insulator 222. The plurality of opening portions are formed in regions overlapping with a source and a drain of the transistor 200, a region overlapping with the conductor 376, and the like. The conductor 228 is formed in each of the opening portions formed in the regions overlapping with the source and the drain of the transistor 200, among the plurality of opening portions. An insulator 214 is formed on the side surface of the opening portion formed in the region overlapping with the conductor 376, among the other opening portions, and the conductor 216 is formed in the remaining space of the opening portion. The conductor 216 is sometimes particularly referred to as a TSV (Through Silicon Via).

For the conductor 216 or the conductor 228, any of the materials that can be used for the conductor 328 can be used, for example. In particular, the conductor 216 is preferably formed using the same material as the conductor 376.

The insulator 214 has a function of insulating the conductor 216 from the substrate 210, for example. Note that the insulator 214 is preferably formed using, for example, any of the materials that can be used for the insulator 320 or the insulator 324.

The insulator 380 and the conductor 376 that are formed over the substrate 310 are bonded to the insulator 202 and the conductor 216 that are formed on the substrate 210 by a bonding step, for example.

Before the bonding step, for example, planarization treatment is performed to make the surfaces of the insulator 380 and the conductor 376 level with each other on the substrate 310 side. In a similar manner, planarization treatment is performed to make the surfaces of the insulator 202 and the conductor 216 level with each other on the substrate 210 side.

In the case where bonding of the insulator 380 and the insulator 202, i.e., bonding of insulating layers, is performed in the bonding step, a hydrophilic bonding method can be employed in which, after high planarity is obtained by polishing, the surfaces subjected to hydrophilicity treatment with oxygen plasma are brought into contact to be bonded to each other temporarily, and then dehydrated by heat treatment to perform final bonding, for example. The hydrophilic bonding method can also cause bonding at an atomic level; thus, mechanically excellent bonding can be obtained.

When bonding of the conductor 376 and the conductor 216, i.e., bonding of the conductors, is performed, a surface activated bonding method can be employed in which an oxide film, a layer adsorbing impurities, and the like on the surface are removed by sputtering treatment or the like and the cleaned and activated surfaces are brought into contact to be bonded to each other. Alternatively, a diffusion bonding method in which the surfaces are bonded to each other by using temperature and pressure together can be employed, for example. Both methods cause bonding at an atomic level; thus, not only electrically but also mechanically excellent bonding can be obtained.

Through the above-described bonding step, the conductor 376 on the substrate 310 side can be electrically connected to the conductor 216 on the substrate 210 side. In addition, mechanically strong connection can be established between the insulator 380 on the substrate 310 side and the insulator 202 on the substrate 210 side.

In the case where the substrate 310 and the substrate 210 are bonded to each other, the insulating layers and the metal layers coexist on their bonding surfaces; thus, the surface activated bonding method and the hydrophilic bonding method are performed in combination, for example. For example, it is possible to employ a method in which the surfaces are made clean after polishing, the surfaces of the metal layers are subjected to antioxidant treatment and hydrophilicity treatment, and then bonding is performed. Furthermore, hydrophilicity treatment may be performed on the surfaces of the metal layers being hardly oxidizable metal such as gold.

Note that the substrate 310 and the substrate 210 may be bonded to each other by a bonding method other than the above-described methods. For example, as the bonding method of the substrate 310 and the substrate 210, flip-chip bonding may be employed. In the case of employing flip-chip bonding, a connection terminal such as a bump may be provided above the conductor 376 on the substrate 310 side or below the conductor 216 on the substrate 210 side. Flip-chip bonding can be performed by, for example, injecting a resin containing anisotropic conductive particles between the insulator 380 and the insulator 202 and between the conductor 376 and the conductor 216, or by using a Sn—Ag solder. Alternatively, ultrasonic wave bonding can be employed in the case where the bump and a conductor connected to the bump are each gold. For example, to reduce physical stress such as an impact or thermal stress, the above-described flip-chip bonding may be combined with injection of an underfill agent between the insulator 380 and the insulator 202 and between the conductor 376 and the conductor 216. Furthermore, a die bonding film may be used in bonding of the substrate 310 and the substrate 210, for example.

An insulator 224 and the insulator 226 are stacked in this order over the insulator 222, the insulator 214, the conductor 216, and the conductor 228.

Like the insulator 324, the insulator 224 is preferably a barrier insulating film that can prevent diffusion of impurities such as water and hydrogen to a region above the insulator 224. Thus, the insulator 224 is preferably formed using any of the materials that can be used for the insulator 324, for example.

Like the insulator 326, the insulator 226 is preferably an interlayer film with a low permittivity. Thus, the insulator 226 is preferably formed using any of the materials that can be used for the insulator 326, for example.

In the insulator 224 and the insulator 226, the conductor 230 electrically connected to the transistor 200, the light-emitting device 150, and the like is embedded. Note that the conductor 230 or the like has a function of a plug or a wiring. Note that the conductor 230 can be formed using any of the materials that can be used for the conductor 328 and the conductor 330 or the like, for example.

Over the insulator 224 and the insulator 226, the insulator 250, the insulator 111*a*, and the insulator 111*b* are stacked in this order.

Like the insulator 324 or the like, the insulator 250 is preferably formed using an insulator having a barrier property against impurities such as water and hydrogen. Thus, the insulator 250 can be formed using any of the materials that can be used for the insulator 324 or the like, for example.

As each of the insulator 111*a* and the insulator 111*b*, a variety of inorganic insulating films such as an oxide insulating film, a nitride insulating film, an oxynitride insulating film, and a nitride oxide insulating film can be suitably used. As the insulator 111*a*, an oxide insulating film or an oxynitride insulating film, such as a silicon oxide film, a silicon oxynitride film, or an aluminum oxide film, is preferably used. As the insulator 111*b*, a nitride insulating film or a nitride oxide insulating film, such as a silicon nitride film or a silicon nitride oxide film, is preferably used. More specifically, it is preferable that a silicon oxide film be used as the insulator 111*a* and a silicon nitride film be used as the insulator 111*b*. The insulator 111*b* preferably functions as an etching protective film. Alternatively, a nitride insulating film or a nitride oxide insulating film may be used as the insulator 111*a*, and an oxide insulating film or an oxynitride insulating film may be used as the insulator 111*b*. Although this embodiment describes an example in which a depressed portion is provided in the insulator 111*b*, a depressed portion is not necessarily provided in the insulator 111*b*.

An opening portion is formed in regions of the insulator 250, the insulator 111*a*, and the insulator 111*b* that overlap with part of the conductor 230, and the conductor 121 is provided to fill the opening portion. Note that in this specification and the like, the conductor 121*a* and the conductor 121*b* illustrated in FIG. 15 are collectively referred to as the conductor 121. Note that the conductor 121 can be provided using a material similar to those for the conductor 328 and the conductor 330.

A pixel electrode described in this embodiment contains a material that reflects visible light, and a counter electrode contains a material that transmits visible light, for example. The display apparatus 1000 has a top-emission structure. Light from the light-emitting device is emitted toward the substrate 102. For the substrate 102, a material having a high visible-light-transmitting property is preferably used.

The light-emitting device 150*a* and the light-emitting device 150*b* are provided above the conductor 121.

Here, the light-emitting device 150*a* and the light-emitting device 150*b* will be described.

The light-emitting device described in this embodiment refers to a self-luminous light-emitting device such as an organic EL element (also referred to as an OLED (Organic Light Emitting Diode)), for example. The light-emitting device electrically connected to the pixel circuit can be a self-luminous light-emitting device such as an LED (Light Emitting Diode), a micro LED, a QLED (Quantum-dot Light Emitting Diode), or a semiconductor laser.

A conductor 122*a* and a conductor 122*b* can be formed in the following manner, for example: a conductive film is formed over the insulator 111*b*, the conductor 121*a*, the conductor 121*b*, and the like and the conductive film is subjected to a patterning step and an etching step.

The conductor 122*a* and the conductor 122*b* function respectively as anodes of the light-emitting device 150*a* and the light-emitting device 150*b* included in the display apparatus 1000, for example.

Indium tin oxide (sometimes referred to as ITO) or the like can be used for the conductor 122*a* and the conductor 122*b*, for example.

Each of the conductor 122*a* and the conductor 122*b* may have a stacked-layer structure of two or more layers instead of a single-layer structure. For example, a conductor having a high visible-light reflectance can be used for the first-layer conductor and a conductor having a high light-transmitting property can be used for the uppermost-layer conductor. Examples of a conductor having a high visible-light reflectance include silver, aluminum, and an alloy film of silver (Ag), palladium (Pd), and copper (Cu) (Ag—Pd—Cu (APC) film). Examples of a conductor having a high light-transmitting property include indium tin oxide described above. The conductor 122*a* and the conductor 122*b* can each be, for example, a stacked-layer film in which a pair of titanium films sandwich aluminum (a film in which Ti, Al, and Ti are stacked in this order), a stacked-layer film in which a pair of indium tin oxide films sandwich silver (a film in which ITO, Ag, and ITO are stacked in this order), or the like.

An EL layer 141*a* is provided over the conductor 122*a*. An EL layer 141*b* is provided over the conductor 122*b*.

The EL layer 141*a* and the EL layer 141*b* preferably include light-emitting layers emitting light of different colors. For example, the EL layer 141*a* can include a light-emitting layer emitting light of any one of red (R), green (G), and blue (B), and the EL layer 141*b* can include a light-emitting layer emitting light of one of the other two colors. Although not illustrated in FIG. 15, in the case where an EL layer different from the EL layer 141*a* and the EL layer 141*b* is provided, the EL layer can include a light-emitting layer emitting light of the remaining one color. Thus, the display apparatus 1000 may have a structure (an SBS structure) in which light-emitting layers of different colors are formed over a plurality of pixel electrodes (the conductor 121*a*, the conductor 121*b*, and the like).

Note that the combination of colors of light emitted from the light-emitting layers included in the EL layer 141*a* and the EL layer 141*b* is not limited to the above, and a color such as cyan, magenta, or yellow may also be used, for example. The number of colors of light emitted from the light-emitting devices 150 included in the display apparatus 1000, which is three in the above example, may be two, three, or four or more.

The EL layer 141*a* and the EL layer 141*b* may each include one or more of an electron-injection layer, an electron-transport layer, a hole-injection layer, and a hole-transport layer in addition to the layer containing a light-emitting organic compound (the light-emitting layer).

The EL layer 141*a* and the EL layer 141*b* can be formed, for example, by an evaporation method (a vacuum evaporation method or the like), a coating method (e.g., a dip coating method, a die coating method, a bar coating method, a spin coating method, or a spray coating method), or a printing method (e.g., an inkjet method, a screen printing (stencil) method, an offset printing (planography) method, a flexography (relief printing) method, a gravure printing method, or a micro-contact printing method).

In the case where a deposition method such as the coating method or the printing method is employed, a high-molecular compound (e.g., an oligomer, a dendrimer, or a polymer), a middle-molecular compound (a compound between a low-molecular compound and a high-molecular compound with a molecular weight of 400 to 4000), or an inorganic compound (a quantum dot material or the like) can be used. As the quantum dot material, a colloidal quantum dot material, an alloyed quantum dot material, a core-shell quantum dot material, or a core quantum dot material can be used.

Figure 16A:
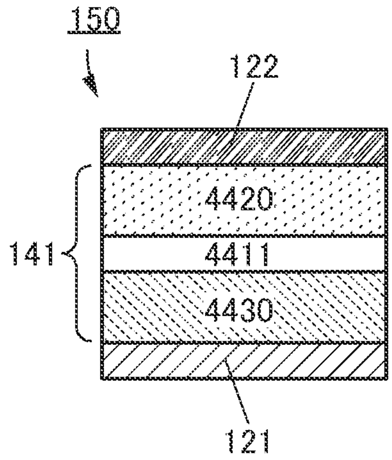
FIG. 16A to FIG. 16D are schematic views each illustrating a structure example of a light-emitting device.

Like the light-emitting device 150 illustrated in FIG. 16A, for example, the light-emitting device 150*a* and the light-emitting device 150*b* in FIG. 15 can each be formed of a plurality of layers such as a light-emitting layer 4411 and a layer 4430.

A layer 4420 can include, for example, a layer containing a substance with a high electron-injection property (an electron-injection layer) and a layer containing a substance with a high electron-transport property (an electron-transport layer). The light-emitting layer 4411 contains a light-emitting compound, for example. The layer 4430 can include, for example, a layer containing a substance with a high hole-injection property (a hole-injection layer) and a layer containing a substance with a high hole-transport property (a hole-transport layer).

The structure including the layer 4420, the light-emitting layer 4411, and the layer 4430, which is provided between a pair of electrodes (the conductor 121 and the conductor 122 described later), can function as a single light-emitting unit, and the structure in FIG. 16A is referred to as a single structure in this specification and the like.

Figure 16B:
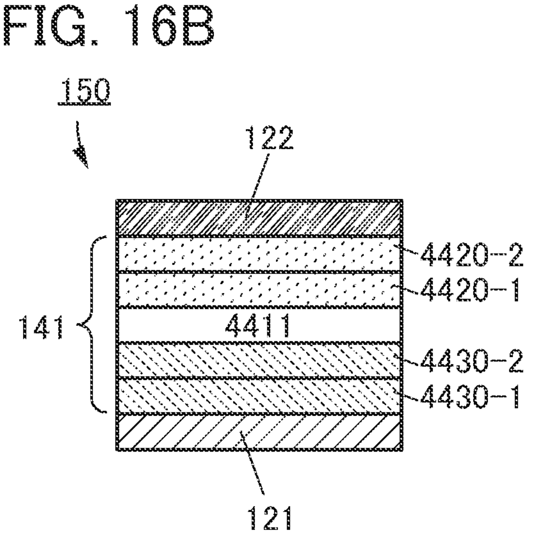

FIG. 16B is a modification example of the EL layer 141 (the EL layer 141*a* and the EL layer 141*b* in FIG. 15) included in the light-emitting device 150 illustrated in FIG. 16A. Specifically, the light-emitting device 150 illustrated in FIG. 16B includes a layer 4430-1 over the conductor 121, a layer 4430-2 over the layer 4430-1, the light-emitting layer 4411 over the layer 4430-2, a layer 4420-1 over the light-emitting layer 4411, a layer 4420-2 over the layer 4420-1, and the conductor 122 over the layer 4420-2. For example, when the conductor 121 functions as an anode and the conductor 122 functions as a cathode, the layer 4430-1 functions as a hole-injection layer, the layer 4430-2 functions as a hole-transport layer, the layer 4420-1 functions as an electron-transport layer, and the layer 4420-2 functions as an electron-injection layer. Alternatively, when the conductor 121 functions as a cathode and the conductor 122 functions as an anode, the layer 4430-1 functions as an electron-injection layer, the layer 4430-2 functions as an electron-transport layer, the layer 4420-1 functions as a hole-transport layer, and the layer 4420-2 functions as a hole-injection layer. With such a layer structure, carriers can be efficiently injected to the light-emitting layer 4411, and the efficiency of the recombination of carriers in the light-emitting layer 4411 can be enhanced.

Figure 16C:
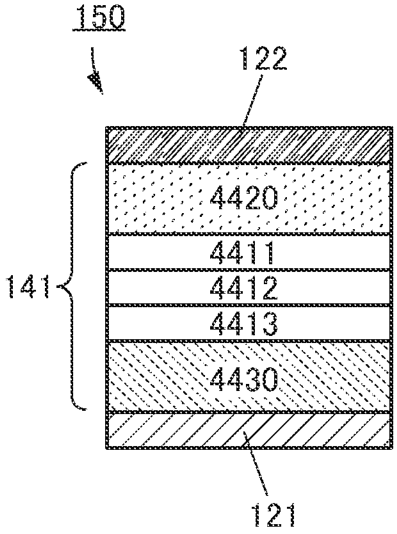

Note that the structure in which a plurality of light-emitting layers (the light-emitting layer 4411, a light-emitting layer 4412, and a light-emitting layer 4413) are provided between the layer 4420 and the layer 4430 as illustrated in FIG. 16C is also a variation of the single structure.

Figure 16D:
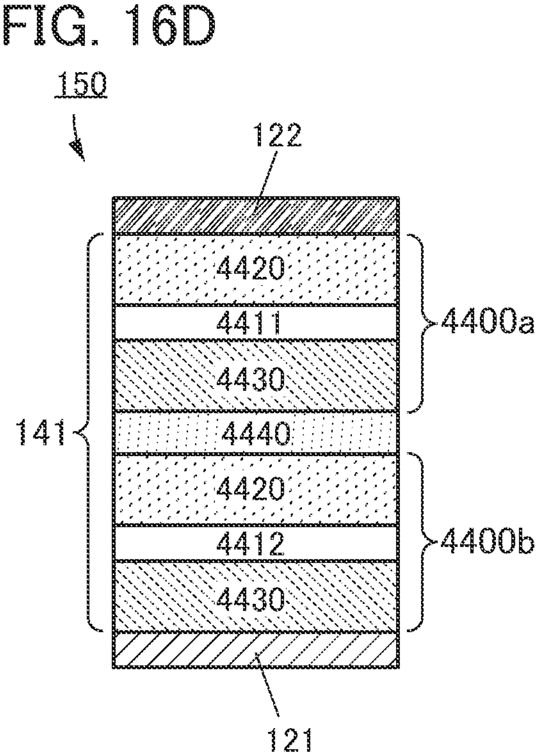

A stack including a plurality of layers such as the layer 4420, the light-emitting layer 4411, and the layer 4430 is sometimes referred to as a light-emitting unit. A plurality of light-emitting units can be connected in series with an intermediate layer (a charge-generation layer) therebetween. Specifically, a light-emitting unit 4400*a* and a light-emitting unit 4400*b*, which are a plurality of light-emitting units, can be connected in series with an intermediate layer (a charge-generation layer) 4440 therebetween as illustrated in FIG. 16D. Note that such a structure is referred to as a tandem structure in this specification. A tandem structure may be rephrased as, for example, a stack structure in this specification and the like. Note that a light-emitting device capable of high-luminance light emission can be obtained when the light-emitting device has a tandem structure. By having a tandem structure, a light-emitting device presumably has increased emission efficiency and an extended lifetime. In the case where the light-emitting device 150 of the display apparatus 1000 in FIG. 15 has a tandem structure, the EL layer 141 can include, for example, the layer 4420, the light-emitting layer 4411, and the layer 4430 that are included in the light-emitting unit 4400*a*, the intermediate layer 4440, and the layer 4420, the light-emitting layer 4412, and the layer 4430 that are included in the light-emitting unit 4400*b*.

In displaying white, the aforementioned SBS structure consumes lower power than the aforementioned single structure and tandem structure. To reduce power consumption, the SBS structure is thus suitably used. Meanwhile, the single structure and the tandem structure are suitable in terms of lower manufacturing cost or higher manufacturing yield because the manufacturing processes of the single structure and the tandem structure are simpler than that of the SBS structure.

The emission color of the light-emitting device 150 can be red, green, blue, cyan, magenta, yellow; or white depending on the material that constitutes the EL layer 141. Furthermore, the color purity can be further increased when the light-emitting device 150 has a microcavity structure.

The light-emitting device that emits white light preferably contains two or more kinds of light-emitting substances in the light-emitting layer. For example, in the case where white light is obtained with use of two light-emitting layers, the emission colors of the two light-emitting layers are complementary, so that the light-emitting device can emit white light as a whole. When white light emission is obtained using three or more light-emitting layers, a light-emitting device is preferably configured to emit white light as a whole by combining emission colors of the three or more light-emitting layers.

The light-emitting layer preferably contains two or more selected from light-emitting substances that emit light of R (red), G (green), B (blue), Y (yellow), and O (orange). Alternatively, the light-emitting layer preferably contains two or more light-emitting substances that emit light containing two or more selected from spectral components of R, G, and B.

As illustrated in FIG. 15, there is a gap between two EL layers of adjacent light-emitting devices. Specifically, in FIG. 15, a depressed portion is formed between the adjacent light-emitting devices, and the insulator 112 is provided to cover the side surfaces (the side surfaces of the conductor 121*a*, the conductor 122*a*, and the EL layer 141*a* and the side surfaces of the conductor 121*b*, the conductor 122*b*, and the EL layer 141*b*) and the bottom surface (a region in part of the insulator 111*b*) of the depressed portion. The insulator 162 is formed over the insulator 112 to fill the depressed portion. In this manner, the EL layer 141*a* and the EL layer 141*b* are preferably provided so as not to be in contact with each other. Thus, it is possible to suitably prevent unintentional light emission (also referred to as crosstalk) from being caused by current flowing through two adjacent EL layers (also referred to as lateral leakage current or side leakage current). As a result, the contrast can be increased to achieve a display apparatus with high display quality. Furthermore, with the structure with an extremely low lateral leakage current between light-emitting devices, for example, the display apparatus can perform black display with as little light leakage or the like as possible (such display is also referred to as completely black display).

As an example of the formation method of the EL layer 141*a* and the EL layer 141*b*, a method with photolithography can be given. For example, the EL layer 141*a* and the EL layer 141*b* can be formed in the following manner: an EL film to be the EL layer 141*a* and the EL layer 141*b* is deposited over the conductor 122 and then subjected to patterning by a photolithography method. Accordingly, a gap can be provided between two EL layers of adjacent light-emitting devices.

The insulator 112 can be an insulating layer containing an inorganic material. As the insulator 112, an inorganic insulating film such as an oxide insulating film, a nitride insulating film, an oxynitride insulating film, or a nitride oxide insulating film can be used, for example. The insulator 112 may have a single-layer structure or a stacked-layer structure. Examples of the oxide insulating film include a silicon oxide film, an aluminum oxide film, a magnesium oxide film, an indium gallium zinc oxide film, a gallium oxide film, a germanium oxide film, an yttrium oxide film, a zirconium oxide film, a lanthanum oxide film, a neodymium oxide film, a hafnium oxide film, and a tantalum oxide film. Examples of the nitride insulating film include a silicon nitride film and an aluminum nitride film. Examples of the oxynitride insulating film include a silicon oxynitride film and an aluminum oxynitride film. Examples of the nitride oxide insulating film include a silicon nitride oxide film and an aluminum nitride oxide film. An aluminum oxide film is particularly preferable because it has high selectivity with respect to the EL layer in etching and has a function of protecting the EL layer during formation of the insulator 162 described later. In particular, when an inorganic insulating film such as an aluminum oxide film, a hafnium oxide film, or a silicon oxide film formed by an ALD (Atomic Layer Deposition) method is used as the insulator 112, the insulator 112 having a small number of pinholes and an excellent function of protecting the EL layer can be formed.

Note that in this specification and the like, oxynitride refers to a material that contains more oxygen than nitrogen in its composition, and nitride oxide refers to a material that contains more nitrogen than oxygen in its composition. For example, in the case where silicon oxynitride is described, it refers to a material that contains more oxygen than nitrogen in its composition. In the case where silicon nitride oxide is described, it refers to a material that contains more nitrogen than oxygen in its composition.

The insulator 112 can be formed by a sputtering method, a CVD method, a PLD (Pulsed Laser Deposition) method, or an ALD method. The insulator 112 is preferably formed by an ALD method achieving good coverage.

The insulator 162 provided over the insulator 112 has a planarization function for the depressed portion of the insulator 112, which is formed between the adjacent light-emitting devices. In other words, the insulator 162 has an effect of improving the planarity of the formation surface of the conductor 123 to be described later. As the insulator 162, an insulating layer containing an organic material can be suitably used. For example, as the insulator 162, an acrylic resin, a polyimide resin, an epoxy resin, an imide resin, a polyamide resin, a polyimide-amide resin, a silicone resin, a siloxane resin, a benzocyclobutene-based resin, a phenol resin, or precursors of these resins can be used. For the insulator 162, an organic material such as polyvinyl alcohol (PVA), polyvinyl butyral, polyvinylpyrrolidone, polyethylene glycol, polyglycerin, pullulan, water-soluble cellulose, or an alcohol-soluble polyamide resin may be used. Moreover, for the insulator 162, a photosensitive resin can be used. A photoresist may be used as the photosensitive resin, for example. Note that as the photosensitive resin, a positive photosensitive material or a negative photosensitive material can be used.

A difference between the top surface level of the insulator 162 and the top surface level of the EL layer 141*a* or the EL layer 141*b* is preferably less than or equal to 0.5 times, further preferably less than or equal to 0.3 times the thickness of the insulator 162, for example. The insulator 162 may be provided, for example, such that the top surface of the EL layer 141*a* or the EL layer 141*b* is at a higher level than the top surface of the insulator 162. Alternatively, the insulator 162 may be provided, for example, such that the top surface of the insulator 162 is at a higher level than the top surface of the light-emitting layer included in the EL layer 141*a* or the EL layer 141*b*.

The conductor 123 is provided over the EL layer 141*a*, the EL layer 141*b*, the insulator 112, and the insulator 162. The insulator 113 is provided over the light-emitting device 150*a* and the light-emitting device 150*b*.

The conductor 123 functions as, for example, a common electrode for the light-emitting device 150*a* and the light-emitting device 150*b*. The conductor 122 preferably contains a conductive material having a light-transmitting property so that light emitted from the light-emitting device 150 can be extracted to above the display apparatus 1000.

The conductor 123 is preferably a light-transmitting and light-reflective material having high conductivity (sometimes referred to as a transflective electrode). For example, an alloy of silver and magnesium, or indium tin oxide can be used as the conductor 122.

The insulator 113 is referred to as a protective layer in some cases, and the insulator 113 provided above the light-emitting device 150*a* and the light-emitting device 150*b* can increase the reliability of the light-emitting devices. That is, the insulator 113 functions as a passivation film that protects the light-emitting device 150*a* and the light-emitting device 150*b*. Thus, the insulator 113 is preferably formed using a material that prevents entry of water or the like. Any of the materials that can be used for the insulator 111*a* and the insulator 111*b* can be used for the insulator 113, for example. Specifically, aluminum oxide, silicon nitride, or silicon nitride oxide can be used.

The resin layer 163 is provided over the insulator 113. The substrate 102 is provided over the resin layer 163.

A substrate having a light-transmitting property is preferably used as the substrate 102, for example. Using a substrate having a light-transmitting property as the substrate 102 enables extraction of light emitted from the light-emitting device 150*a* and the light-emitting device 150*b* to above the substrate 102.

Note that the structure of the display apparatus of one embodiment of the present invention is not limited to that of the display apparatus 1000 illustrated in FIG. 15. The structure of the display apparatus of one embodiment of the present invention may be changed as appropriate.

For example, the transistor 200 included in the pixel layer PXAL in the display apparatus 1000 in FIG. 15 may be a transistor including a metal oxide in a channel formation region (hereinafter, referred to as an OS transistor). The display apparatus 1000 illustrated in FIG. 17 has a structure in which the light-emitting device 150 and a transistor 500 (an OS transistor), instead of the transistor 200 in the display apparatus 1000 in FIG. 15, are provided above the circuit layer SICL and the wiring layer LINL.

Figure 17:
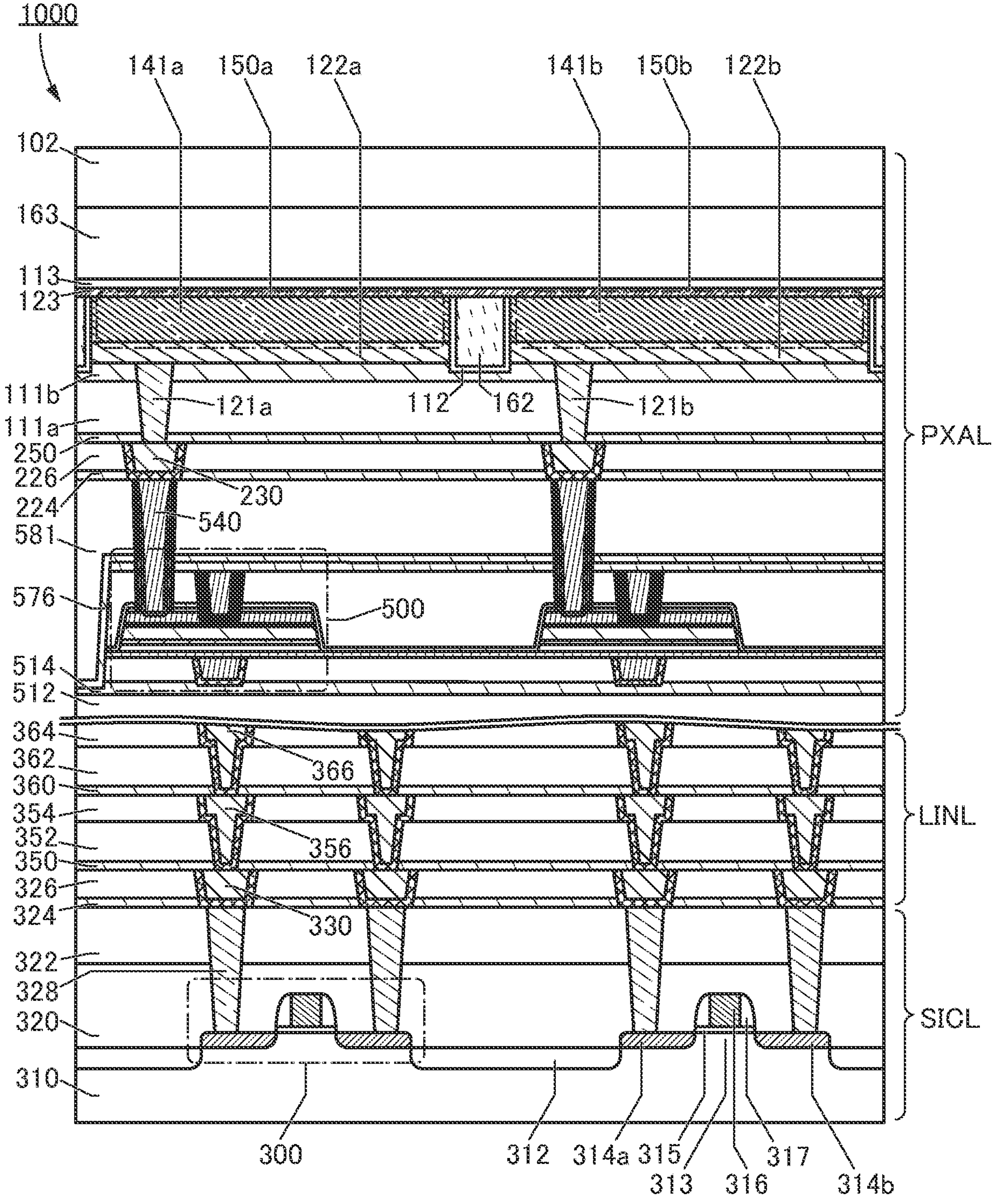
FIG. 17 is a schematic cross-sectional view illustrating a structure example of a display apparatus.

In FIG. 17, the transistor 500 is provided over an insulator 512. The insulator 512 is provided above the insulator 364 and the conductor 366, and the insulator 512 is preferably formed using a substance having a barrier property against oxygen and hydrogen. Specifically, for example, silicon oxide, silicon oxynitride, silicon nitride oxide, silicon nitride, aluminum oxide, aluminum oxynitride, aluminum nitride oxide, or aluminum nitride may be used.

For the film having a barrier property against hydrogen, silicon nitride deposited by a CVD method can be used, for example. Here, diffusion of hydrogen into a semiconductor element including an oxide semiconductor (e.g., the transistor 500) degrades the characteristics of the semiconductor element in some cases. Therefore, a film to suppress hydrogen diffusion is preferably used between the transistor 500 and the transistor 300. The film to suppress hydrogen diffusion is specifically a film from which a small amount of hydrogen is released.

A material similar to that for the insulator 320 can be used for the insulator 512, for example. When a material with a relatively low permittivity is used for these insulators, parasitic capacitance generated between wirings can be reduced. A silicon oxide film or a silicon oxynitride film can be used as the insulator 512, for example.

An insulator 514 is provided over the insulator 512, and the transistor 500 is provided over the insulator 514. An insulator 576 is formed over the insulator 512 to cover the transistor 500. An insulator 581 is formed over the insulator 576.

As the insulator 514, it is preferable to use a film having a barrier property that prevents diffusion of impurities such as hydrogen from the substrate 310, a region where the circuit element or the like below the insulator 512 is provided, or the like into a region where the transistor 500 is provided. Thus, silicon nitride deposited by a CVD method can be used for the insulator 514, for example.

The transistor 500 illustrated in FIG. 17 is an OS transistor that includes a metal oxide in a channel formation region, as described above. As the metal oxide, for example, a metal oxide such as an In-M-Zn oxide containing indium, the element M, and zinc (the element M is one or more kinds selected from aluminum, gallium, yttrium, tin, copper, vanadium, beryllium, boron, titanium, iron, nickel, germanium, zirconium, molybdenum, lanthanum, cerium, neodymium, hafnium, tantalum, tungsten, magnesium, and the like) can be used. Specifically, an oxide containing indium, gallium, and zinc (sometimes referred to as IGZO) may be used as the metal oxide, for example. Alternatively, an oxide containing indium, aluminum, and zinc (sometimes referred to as IAZO) may be used as the metal oxide, for example. Alternatively, an oxide containing indium, aluminum, gallium, and zinc (sometimes referred to as IAGZO) may be used as the metal oxide, for example. Alternatively, besides the above, an In—Ga oxide, an In—Zn oxide, or an indium oxide may be used as the metal oxide.

In particular, the metal oxide functioning as a semiconductor preferably has a band gap of 2 eV or more, preferably 2.5 eV or more. With the use of a metal oxide having such a wide band gap, the off-state current (sometimes referred to as leakage current) of the transistor can be reduced.

In particular, as a driving transistor included in a pixel circuit, a transistor having a sufficiently low off-state current even when the source-drain voltage is high, for example, an OS transistor, is preferably used. With the use of an OS transistor as the driving transistor, the amount of off-state current flowing through the light-emitting device when the driving transistor is in an off state can be reduced, whereby the luminance of light emitted from the light-emitting device through which an off-state current flows can be sufficiently reduced. Thus, in the case where a driving transistor having a high off-state current and a driving transistor having a low off-state current are compared, a pixel circuit including the driving transistor having a low off-state current can have lower emission luminance than a pixel circuit including the driving transistor having a high off-state current when black display is performed by the pixel circuits. That is, the use of an OS transistor can reduce black blurring when black display is performed by the pixel circuit.

The off-state current value per micrometer of channel width of an OS transistor at room temperature can be lower than or equal to 1 aA ($1\times10^{-18}$ A), lower than or equal to 1 zA ($1\times10^{-21}$ A), or lower than or equal to 1 yA ($1\times10^{-24}$ A). Note that the off-state current value per micrometer of channel width of a Si transistor at room temperature is higher than or equal to 1 fA ($1\times10^{-15}$ A) and lower than or equal to 1 pA ($1\times10^{-12}$ A). In other words, the off-state current of an OS transistor is lower than the off-state current of a Si transistor by approximately ten orders of magnitude.

To increase the emission luminance of the light-emitting device included in the pixel circuit, the amount of current fed through the light-emitting device needs to be increased. For this, it is necessary to increase the source-drain voltage of a driving transistor included in the pixel circuit. Since an OS transistor has a higher withstand voltage between a source and a drain than a Si transistor, a high voltage can be applied between a source and a drain of an OS transistor. Accordingly, when an OS transistor is used as the driving transistor included in the pixel circuit, a high voltage can be applied between a source and a drain of the OS transistor, so that the amount of current flowing through the light-emitting device can be increased and the emission luminance of the light-emitting device can be increased.

When transistors operate in a saturation region, a change in source-drain current relative to a change in gate-source voltage can be smaller in an OS transistor than in a Si transistor. Accordingly, when an OS transistor is used as the driving transistor included in the pixel circuit, the amount of current flowing between the source and the drain can be set minutely by a change in gate-source voltage; hence, the amount of current flowing through the light-emitting device can be controlled. Therefore, the emission luminance of the light-emitting device can be controlled minutely (the number of gray levels in the pixel circuit can be increased).

Regarding saturation characteristics of current flowing when transistors operate in a saturation region, an OS transistor can feed constant current (saturation current) more stably than a Si transistor even when the source-drain voltage gradually increases. Thus, by using an OS transistor as the driving transistor, a stable constant current can be fed through a light-emitting device that contains an organic EL material even when the current-voltage characteristics of the light-emitting device vary, for example. In other words, when an OS transistor operates in the 20) saturation region, the source-drain current hardly changes with an increase in the source-drain voltage; hence, the emission luminance of the light-emitting device can be stable.

As described above, with the use of an OS transistor as the driving transistor included in the pixel circuit, it is possible to achieve "reduction of black blurring", "increase in emission luminance", "increase in gray levels", "reduction of variation in light-emitting devices", or the like. Therefore, a display apparatus including the pixel circuit can display a clear and smooth image; as a result, any one or more of the image clearness (image sharpness) and a high contrast ratio can be observed. Note that image clearness (image sharpness) sometimes refers to one or both of the state where motion blur is reduced and the state where black blurring is reduced. When the off-state current that can flow through the driving transistor included in the pixel circuit is extremely low; black display performed by the display apparatus can be display with as little light leakage or the like as possible (completely black display).

At least one of the insulator 576 and the insulator 581 preferably functions as a barrier insulating film to suppress diffusion of impurities such as water and hydrogen from above the transistor 500 into the transistor 500. Thus, for at least one of the insulator 576 and the insulator 581, it is preferable to use an insulating material having a function of suppressing diffusion of impurities such as hydrogen atoms, hydrogen molecules, water molecules, nitrogen atoms, nitrogen molecules, nitrogen oxide molecules (e.g., $N_2O$, NO, and $NO_2$), and copper atoms (an insulating material through which the impurities are less likely to pass). Alternatively, it is preferable to use an insulating material having a function of suppressing diffusion of oxygen (e.g., one or both of oxygen atoms, oxygen molecules, and the like) (an insulating material through which the oxygen is less likely to pass).

One or both of the insulator 576 and the insulator 581 is preferably an insulator having a function of suppressing diffusion of oxygen and impurities such as water and hydrogen; for example, aluminum oxide, magnesium oxide, hafnium oxide, gallium oxide, indium-gallium-zinc oxide, silicon nitride, silicon nitride oxide, or the like can be used for one or both of the insulator 576 and the insulator 581.

An opening portion for forming a plug, a wiring, or the like is provided in the insulator 581, the insulator 576, and one of the source and drain electrodes of the transistor 500. A conductor 540 functioning as a plug, a wiring, or the like is formed in the opening portion.

The insulator 581 is preferably an insulator functioning as one or both of an interlayer film and a planarization film, for example.

The insulator 224 and the insulator 226 are formed above the insulator 581 and the conductor 540. Note that for the description of the insulator 224 and an insulator, a conductor, a circuit element, and the like that are positioned above the insulator 224, refer to the description of the display apparatus 1000 in FIG. 15.

Note that FIG. 15 illustrates a display apparatus formed by bonding the semiconductor substrate provided with the light-emitting device 150, the pixel circuit, and the like and the semiconductor substrate provided with a driver circuit and the like; FIG. 17 illustrates the display apparatus in which the light-emitting device 150, the pixel circuit, and the like are formed over a semiconductor substrate provided with a driver circuit; however, the display apparatus for the electronic device of one embodiment of the present invention is not limited to the those in FIG. 15 and FIG. 17. The display apparatus for the electronic device of one embodiment of the present invention may have a structure in which transistors are formed in only one layer, not a layer structure in which transistors are stacked in two or more layers.

Figure 18A:
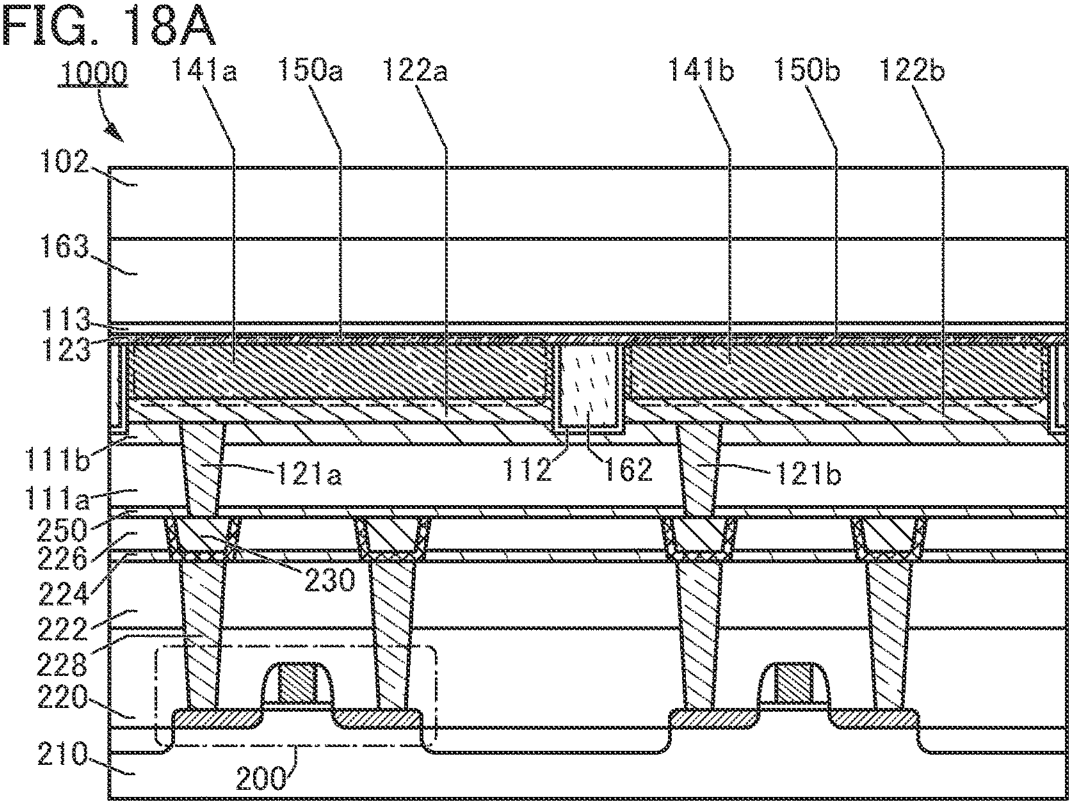
FIG. 18A and FIG. 18B are schematic cross-sectional views illustrating structure examples of a display apparatus.

Specifically, for example, the display apparatus for the electronic device of one embodiment of the present invention may include a circuit including the transistor 200 formed over the substrate 210 and the light-emitting device 150 provided above the transistor 200, like the display apparatus 1000 illustrated in FIG. 18A. For another example, a structure may be employed in which the insulator 512 is formed over a substrate 501, the transistor 500 is provided over the insulator 512, and the light-emitting device 150 is provided above the transistor 500, as in the display apparatus 1000 illustrated in FIG. 18B. Note that as the substrate 501, a substrate that can be used as the substrate 310 can be used, for example, and in particular, a glass substrate is preferably used.

Figure 18B:
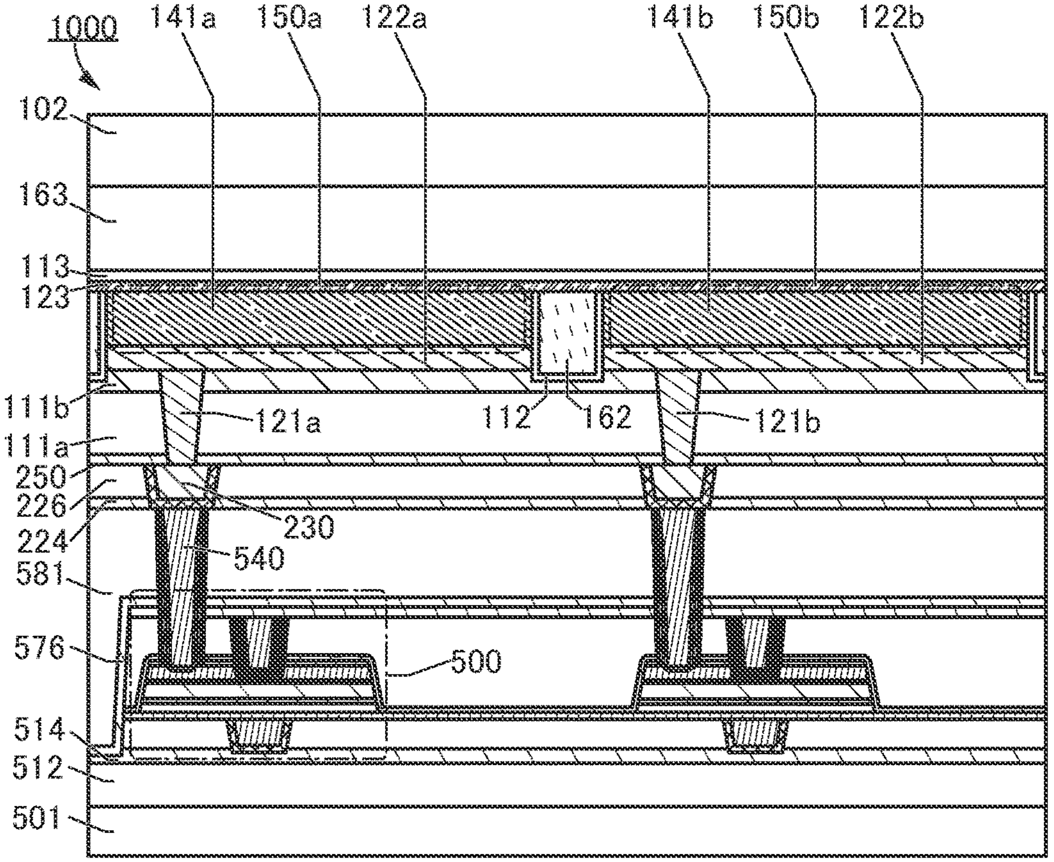

The display apparatus for the electronic device of one embodiment of the present invention may have a structure in which transistors are formed in only one layer and the light-emitting device 150 is provided above the transistors, like the display apparatus 1000 illustrated in each of FIG. 18A and FIG. 18B. Although not illustrated, the display apparatus for the electronic device of one embodiment of the present invention may have a layer structure in which transistors are formed in three or more layers.

Sealing Structure Example of Display Apparatus

Next, a sealing structure of the light-emitting device 150 that can be employed for the display apparatus 1000 in FIG. 15 will be described.

Figure 19A:
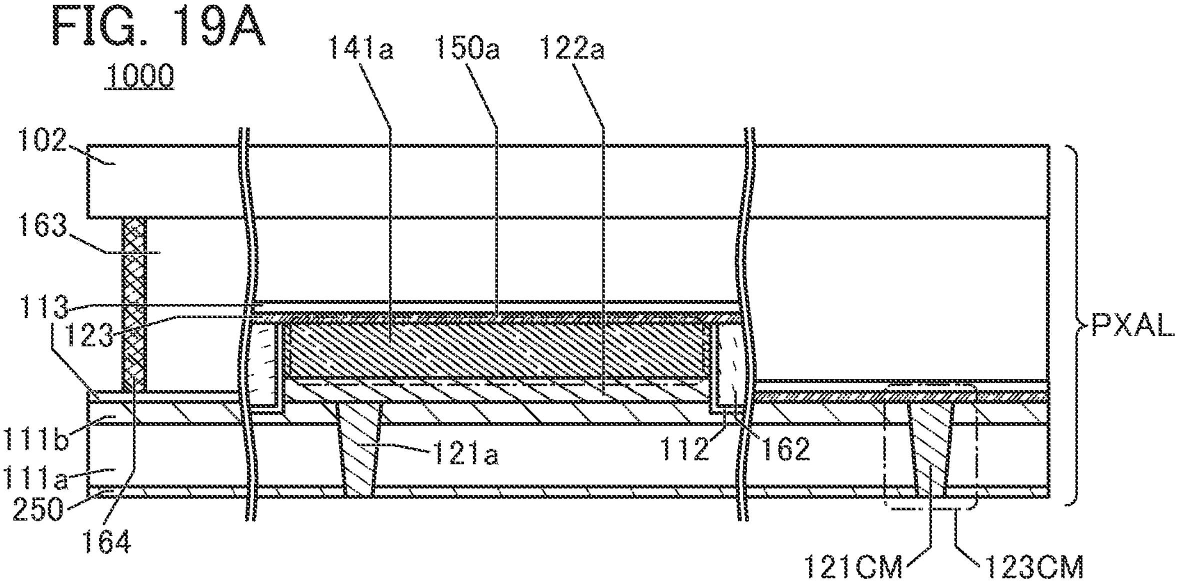
FIG. 19A and FIG. 19B are schematic cross-sectional views illustrating structure examples of a display apparatus.

FIG. 19A is a cross-sectional view illustrating an example of a sealing structure that can be employed for the display apparatus 1000 in FIG. 15. Specifically, FIG. 19A illustrates an end portion of the display apparatus 1000 in FIG. 15 and components provided around the end portion. FIG. 19A selectively illustrates only part of the pixel layer PXAL of the display apparatus 1000. Specifically, FIG. 19A illustrates the insulator 250, and insulators, conductors, and the light-emitting device 150*a* that are positioned above the insulator 250.

In a region 123CM illustrated in FIG. 19A, for example, an opening portion is provided. In the opening portion, a conductor 121CM is provided, for example. The conductor 123 is electrically connected to a wiring provided below the insulator 250 through the conductor 121CM. Thus, a potential (e.g., an anode potential or a cathode potential of the light-emitting device 150*a* or the like) can be supplied to the conductor 123 functioning as the common electrode. Note that one or more of a conductor included in the region 123CM and a conductor around the region 123CM are referred to as a connection electrode in some cases.

For the conductor 121CM, any of the materials that can be used for the conductor 121 can be used, for example.

In the display apparatus 1000 in FIG. 19A, an adhesive layer 164 is provided at or around the end portion of the resin layer 163. Specifically, the display apparatus 1000 is configured to include the adhesive layer 164 between the insulator 113 and the substrate 102.

The adhesive layer 164 is preferably formed using, for example, a material reducing transmission of impurities such as moisture. Using the material for the adhesive layer 164 can increase the reliability of the display apparatus 1000.

A structure in which the insulator 113 and the substrate 102 are bonded to each other with the resin layer 163 therebetween using the adhesive layer 164 is sometimes referred to as a solid sealing structure. In the case where the resin layer 163 in the solid sealing structure has a function of bonding the insulator 113 and the substrate 102 like the adhesive layer 164, the adhesive layer 164 is not necessarily provided.

Meanwhile, a structure in which the insulator 113 and the substrate 102 are bonded to each other with an inert gas filled therebetween, instead of the resin layer 163, by using the adhesive layer 164 is sometimes referred to as a hollow sealing structure (not illustrated). Examples of an inert gas include nitrogen and argon.

Figure 19B:
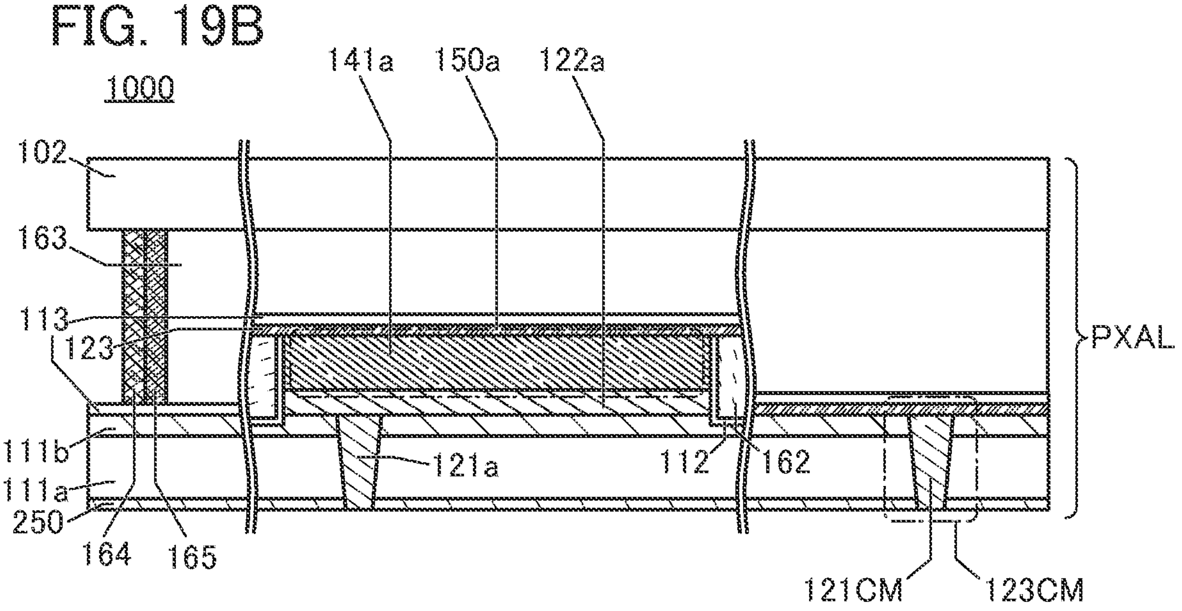

In the sealing structure of the display apparatus 1000 illustrated in FIG. 19A, two or more overlapping adhesive layers may be used. For example, as illustrated in FIG. 19B, an adhesive layer 165 may be further provided on the inner side of the adhesive layer 164 (between the adhesive layer 164 and the resin layer 163). Two or more overlapping adhesive layers can reduce transmission of impurities such as moisture more, further increasing the reliability of the display apparatus 1000.

A desiccant may be mixed into the adhesive layer 165. In that case, the desiccant adsorbs moisture contained in the resin layer 163, insulators, conductors, and EL layers that are provided on the inner side of the adhesive layer 164 and the adhesive layer 165, increasing the reliability of the display apparatus 1000.

Although the solid sealing structure is illustrated in the display apparatus 1000 in FIG. 19B, a hollow sealing structure may be employed.

Furthermore, an inert liquid may be used instead of the resin layer 163 to fill the space in each of the sealing structures of the display apparatus 1000 in FIG. 19A and FIG. 19B. An example of an inert liquid is a fluorine-based inert liquid.

Modification Example of Display Apparatus

One embodiment of the present invention is not limited to the above-described structures, and the above-described structures can be changed as appropriate in accordance with circumstances. Modification examples of the display apparatus 1000 in FIG. 15 will be described below with reference to FIG. 20A to FIG. 21B. Note that FIG. 20A to FIG. 21B selectively illustrate only part of the pixel layer PXAL of the display apparatus 1000. Specifically, each of FIG. 20A to FIG. 21B illustrates the insulator 250, the insulator 111*a*, and insulators, conductors, the light-emitting device 150*a*, the light-emitting device 150*b*, and the like that are positioned above the insulator 111*a*. In particular, each of FIG. 20A to FIG. 21B also illustrates a light-emitting device 150*c*, a conductor 121*c*, a conductor 122*c*, and an EL layer 141*c*.

Note that, for example, the color of light emitted from the EL layer 141*c* may be different from the colors of light emitted from the EL layer 141*a* and the EL layer 141*b*. The display apparatus 1000 may have a structure in which the number of colors of light emitted from the light-emitting device 150*a* to the light-emitting device 150*c* is two, for example. Alternatively, for example, the display apparatus 1000 may have a structure in which the number of light-emitting devices 150 is increased so that the number of colors of light emitted from the light-emitting devices is four or more (not illustrated).

Figure 20A:
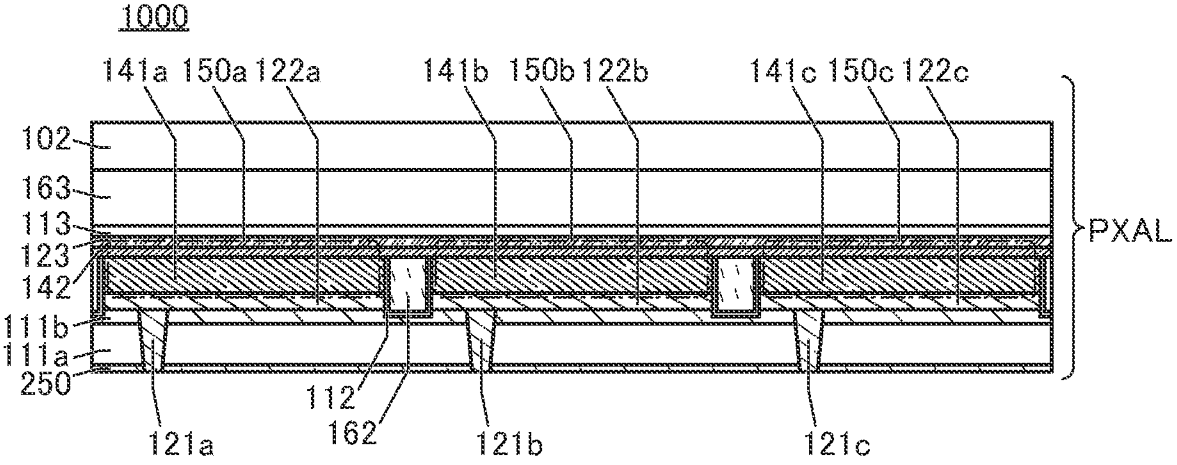
FIG. 20A and FIG. 20B are schematic cross-sectional views illustrating structure examples of a display apparatus.
Figure 20B:
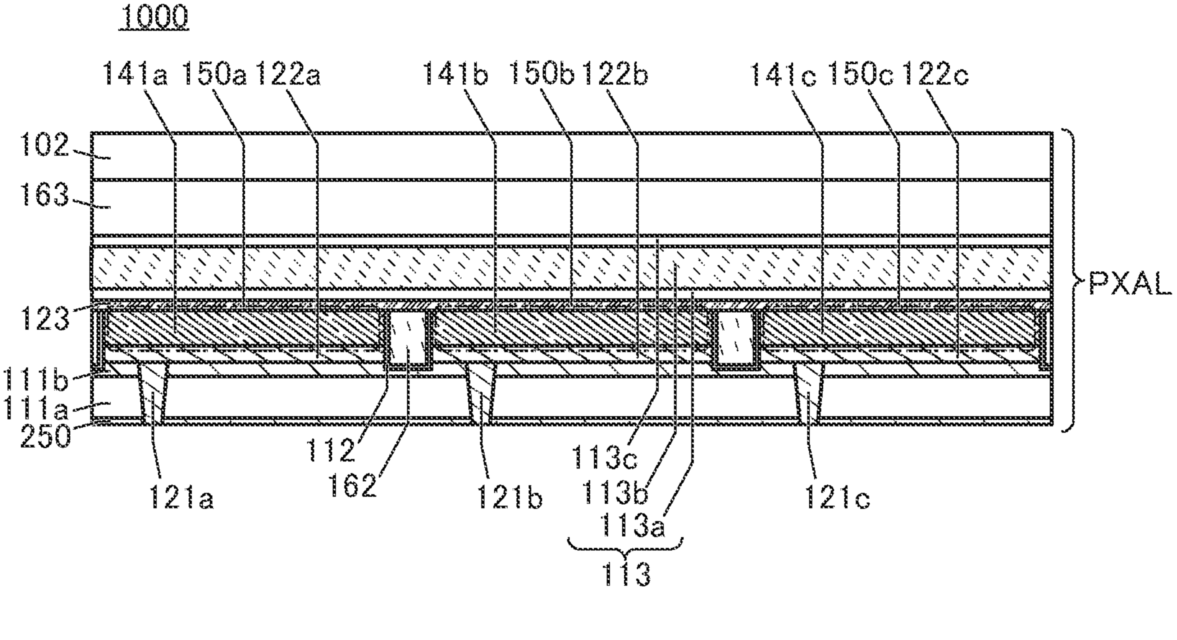

The display apparatus 1000 may have a structure in which an EL layer 142 is formed over the EL layer 141*a* to the EL layer 141*c*, for example, as illustrated in FIG. 20A. Specifically, for example, in FIG. 16A, the EL layer 142 can include the layer 4420 when the EL layer 141*a* to the EL layer 141*c* each include the layer 4430 and the light-emitting layer 4411. In that case, the layer 4420 included in the EL layer 142 functions as a common layer shared by the light-emitting device 150*a* to the light-emitting device 150*c*. Similarly, for example, in FIG. 16C, the EL layer 142 can include the layer 4420 when the EL layer 141*a* to the EL layer 141*c* each include the layer 4430, the light-emitting layer 4411, the light-emitting layer 4412, and the light-emitting layer 4413, in which case the layer 4420 included in the EL layer 142 functions as a common layer shared by the light-emitting device 150*a* to the light-emitting device 150*c*. For another example, in FIG. 16D, the EL layer 142 can include the layer 4420 of the light-emitting unit 4400*b* when the EL layer 141*a* to the EL layer 141*c* each include the layer 4430, the light-emitting layer 4412, and the layer 4420 that are included in the light-emitting unit 4400*b*, the intermediate layer 4440, and the layer 4430 and the light-emitting layer 4411 that are included in the light-emitting unit 4400*a*, in which case the layer 4420 of the light-emitting unit 4400*a* included in the EL layer 142 functions as a common layer shared by the light-emitting device 150*a* to the light-emitting device 150*c*.

In the structure of the display apparatus 1000, for example, the insulator 113 may have a stacked-layer structure of two or more layers, instead of a single layer. The insulator 113 may have a three-layer structure that includes an insulator made of an inorganic material as the first layer, an insulator made of an organic material as the second layer, and an insulator made of an inorganic material as the third layer. FIG. 21B illustrates a cross-sectional view of part of the display apparatus 1000 in which the insulator 113 has a multilayer structure including an insulator 113*a*, an insulator 113*b*, and an insulator 113*c*; the insulator 113*a* is an insulator made of an inorganic material, the insulator 113*b* is an insulator made of an organic material, and the insulator 20) 113*c* is an insulator made of an inorganic material.

In the structure of the display apparatus 1000, for example, the EL layer 141*a* to the EL layer 141*c* may each have a microcavity structure. In the microcavity structure, for example, the conductor 122 as an upper electrode (common electrode) is formed using a light-transmitting and light-reflective conductive material, the conductor 121 as a lower electrode (pixel electrode) is formed using a light-reflective conductive material, and the distance between the bottom surface of the light-emitting layer and the top surface of the lower electrode. i.e., the thickness of the layer 4430 in FIG. 16A, is set to the thickness corresponding to the wavelength of the color of light emitted from the light-emitting layer included in the EL layer 141.

For example, light that is reflected back from the lower electrode (reflected light) considerably interferes with light that directly enters the upper electrode from the light-emitting layer (incident light); therefore, the optical path length between the lower electrode and the light-emitting layer is preferably adjusted to $(2n-1)\lambda/4$ (n is a natural number of 1 or more and $\lambda$ is a wavelength of emitted light to be amplified). By adjusting the optical path length, the phases of the reflected light and the incident light each having the wavelength $\lambda$ can be aligned with each other, and the light emitted from the light-emitting layer can be further amplified. In the case where the reflected light and the incident light have a wavelength other than the wavelength $\lambda$, their phases are not aligned with each other, resulting in attenuation without resonation.

The EL layer included in the structure may include a plurality of light-emitting layers or a single light-emitting layer. Furthermore, for example, in combination with the aforementioned tandem light-emitting device structure, a structure may be employed in which one light-emitting device includes a plurality of EL layers with a charge-generation layer interposed therebetween and each EL layer includes one or more light-emitting layers.

With the microcavity structure, emission intensity with a specific wavelength in the front direction can be increased, whereby power consumption can be reduced. Particularly in the case of a device for XR such as VR and AR, light emitted from the light-emitting device in the front direction often enters the eyes of the user wearing the device; thus, a display apparatus of a device for XR suitably has a microcavity structure. Note that in the case of a display apparatus that displays an image with subpixels of four colors of red, yellow; green, and blue, the display apparatus can have excellent characteristics because a microcavity structure suitable for the wavelength of the corresponding color is employed in each subpixel, in addition to the effect of improving luminance owing to yellow light emission.

Figure 21A:
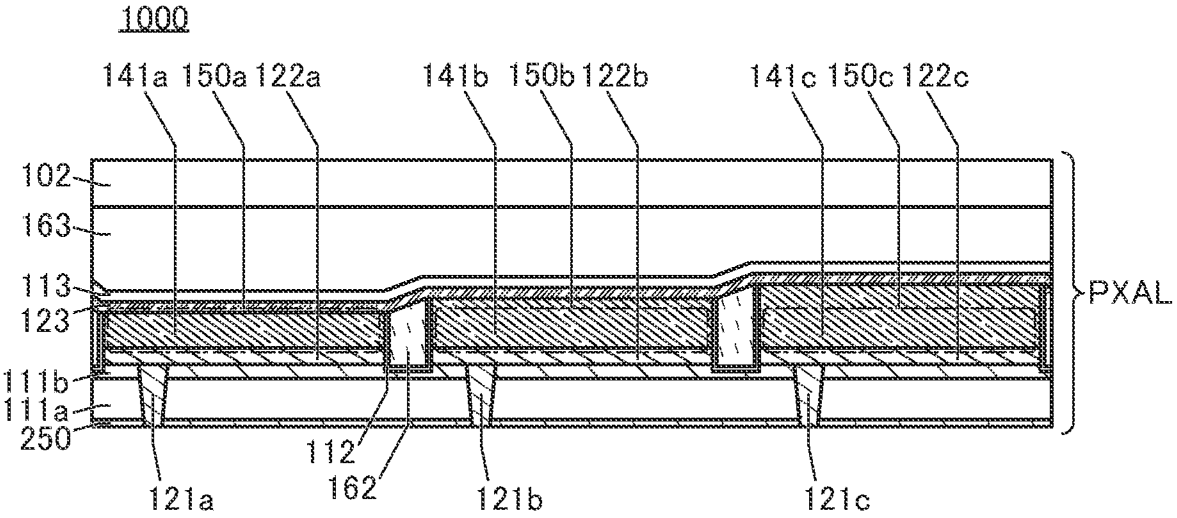
FIG. 21A and FIG. 21B are schematic cross-sectional views illustrating structure examples of a display apparatus.
Figure 21B:
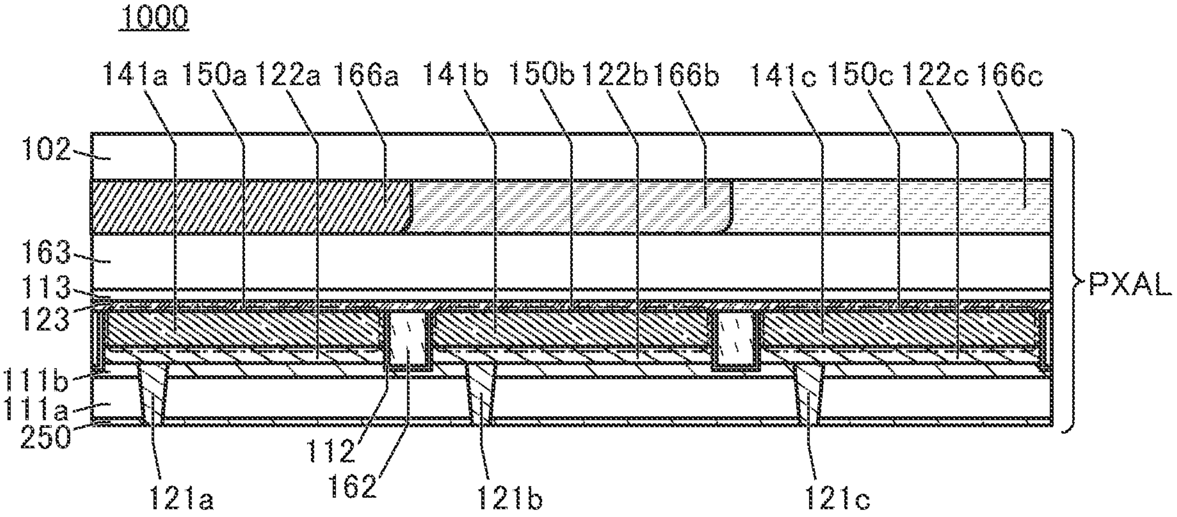

FIG. 21A illustrates a cross-sectional view of part of the display apparatus 1000 having a microcavity structure, for example. In the case where the light-emitting device 150*a* includes a light-emitting layer emitting blue (B) light, the light-emitting device 150*b* includes a light-emitting layer emitting green (G) light, and the light-emitting device 150*c* includes a light-emitting layer emitting red (R) light, it is preferable that the EL layer 141*a* have the smallest thickness, the EL layer 141*b* have the second largest thickness, and the EL layer 141*c* have the largest thickness as illustrated in FIG. 21A. Specifically, the thicknesses of the layers 4430 included in the EL layer 141*a*, the EL layer 141*b*, and the EL layer 141*c* may be determined depending on the color 30) of the light emitted from the corresponding light-emitting layer. In that case, the layer 4430 included in the EL layer 141*a* has the smallest thickness and the layer 4430 included in the EL layer 141*c* has the largest thickness.

The display apparatus 1000 may include a coloring layer (color filter), for example. FIG. 21B illustrates a structure in which a coloring layer 166*a*, a coloring layer 166*b*, and a coloring layer 166*c* are included between the resin layer 163 and the substrate 102, for example. Note that the coloring layer 166*a* to the coloring layer 166*c* can be formed on the substrate 102, for example. In the case where the light-emitting device 150*a* includes a light-emitting layer emitting blue (B) light, the light-emitting device 150*b* includes a light-emitting layer emitting green (G) light, and the light-emitting device 150*c* includes a light-emitting layer emitting red (R) light, the coloring layer 166*a* is a blue coloring layer, the coloring layer 166*b* is a green coloring layer, and the coloring layer 166*c* is a red coloring layer.

The display apparatus 1000 illustrated in FIG. 21B can be fabricated in the following manner: the substrate 102 provided with the coloring layer 166*a* to the coloring layer 166*c* and the substrate 310 over which components up to the light-emitting device 150*a* to the light-emitting device 150*c* are formed are bonded to each other with the resin layer 163 therebetween. At this time, the bonding is preferably performed such that the light-emitting device 150*a* and the coloring layer 166*a* overlap with each other, the light-emitting device 150*b* and the coloring layer 166*b* overlap with each other, and the light-emitting device 150*c* and the coloring layer 166*c* overlap with each other. In the display apparatus 1000 provided with the coloring layer 166*a* to the coloring layer 166*c*, for example, light emitted from the light-emitting device 150*b* is not extracted to above the substrate 102 through the coloring layer 166*a* or the coloring layer 166*c*, but is extracted to above the substrate 102 through the coloring layer 166*b*. That is, light emitted from 20) the light-emitting device 150 in an oblique direction (a direction at an elevation angle with the top surface of the substrate 102 used as a horizontal plane) can be blocked in the display apparatus 1000; thus, the viewing angle dependence of the display apparatus 1000 can be reduced, preventing the display quality of an image displayed on the display apparatus 1000 from decreasing when the image is viewed from an oblique direction.

The coloring layer 166*a* to the coloring layer 166*c* formed on the substrate 102 may be covered with a resin or the like which is referred to as an overcoat layer. Specifically, the resin layer 163, the overcoat layer, the coloring layer 166*a* to the coloring layer 166*c*, and the substrate 102 may be stacked in this order in the display apparatus 1000 (not illustrated). Note that examples of the resin used for the overcoat layer include a thermosetting material having a light-transmitting property and being based on an acrylic resin or an epoxy resin.

The display apparatus 1000 may include, for example, a black matrix (not illustrated) in addition to the coloring layers. The black matrix provided between the coloring layer 166*a* and the coloring layer 166*b*, between the coloring layer 166*b* and the coloring layer 166*c*, and between the coloring layer 166*c* and the coloring layer 166*a* can block more light emitted from the light-emitting device 150 in an oblique direction (a direction at an elevation angle with the top surface of the substrate 102 used as a horizontal plane) in the display apparatus 1000; thus, the display quality of an image displayed on the display apparatus 1000 can be more prevented from decreasing when the image is viewed from an oblique direction.

In the case where the display apparatus includes coloring layers as illustrated in FIG. 21B, the light-emitting device 150*a* to the light-emitting device 150*c* of the display apparatus may each be a light-emitting device emitting white light (not illustrated). The light-emitting device can have a single structure or a tandem structure, for example.

In the above-described structure of the display apparatus 1000, the conductor 121*a* to the conductor 121*c* serve as anodes and the conductor 122 serves as a cathode; however, the display apparatus 1000 may have a structure in which the conductor 121*a* to the conductor 121*c* serve as cathodes and the conductor 122 serves as an anode. That is, in the above-described fabrication process, the stacking order of the hole-injection layer, the hole-transport layer, the light-emitting layer, the electron-transport layer, and the electron-injection layer that are included in the EL layer 141*a* to the EL layer 141*c* and the EL layer 142 may be reversed.

Structure Example of Insulator 162

Next, cross-sectional structures of a region including the insulator 162 and its periphery in the display apparatus 1000 will be described.

Figure 22A:
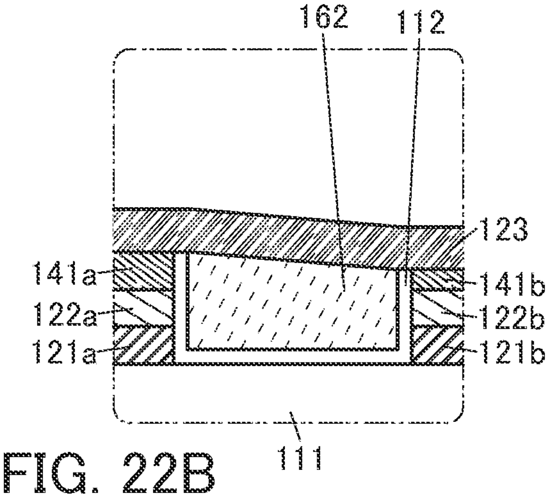
FIG. 22A to FIG. 22F are cross-sectional views illustrating an example of a method for fabricating a display apparatus.

FIG. 22A illustrates an example in which the EL layer 141*a* and the EL layer 141*b* have different thicknesses. The top surface level of the insulator 112 is equal to or substantially equal to the top surface level of the EL layer 141*a* on the EL layer 141*a* side, and equal to or substantially equal to the top surface level of the EL layer 141*b* on the EL layer 141*b* side. The top surface of the insulator 112 has a gentle slope such that the side closer to the EL layer 141*a* is higher and the side closer to the EL layer 141*b* is lower. In this manner, the top surfaces of the insulator 112 and the insulator 162 are preferably level with the top surface of an adjacent EL layer. Alternatively, the top surface levels of the insulators may be equal to the top surface level of any adjacent EL layer so that their top surfaces have a flat portion.

Figure 22B:
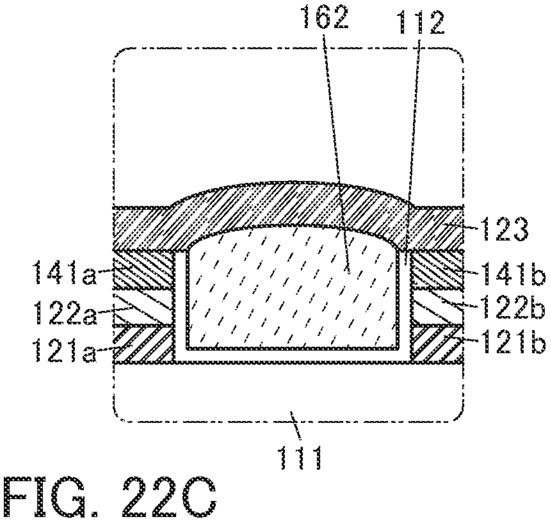

In FIG. 22B, the top surface of the insulator 162 includes a region that is at a higher level than the top surface of the EL layer 141*a* and the top surface of the EL layer 141*b*. Moreover, the top surface of the insulator 162 has a convex shape that is gently bulged toward the center.

Figure 22C:
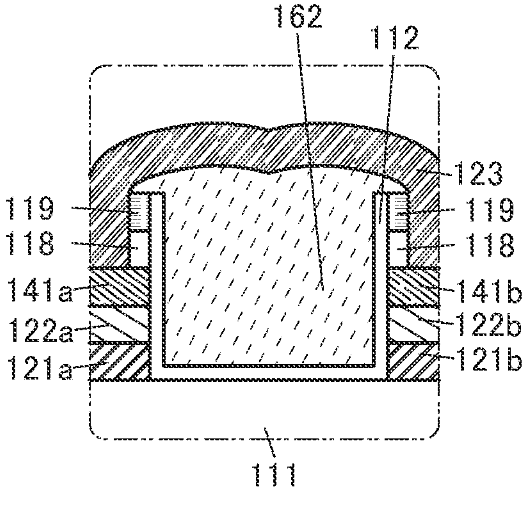

In FIG. 22C, the top surface of the insulator 112 includes a region that is at a higher level than the top surface of the EL layer 141*a* and the top surface of the EL layer 141*b*. In a region including the insulator 162 and its periphery, the display apparatus 1000 includes a first region positioned over one or both of a sacrificial layer 118 and a sacrificial layer 119. The first region is at a higher level than the top surface of the EL layer 141*a* and the top surface of the EL layer 141*b*, and part of the insulator 162 is formed in the first region. In the region including the insulator 162 and its periphery, the display apparatus 1000 includes a second region positioned over one or both of the sacrificial layer 118 and the sacrificial layer 119. The second region is at a higher level than the top surface of the EL layer 141*a* and the top surface of the EL layer 141*b*, and part of the insulator 162 is formed in the second region.

Figure 22D:
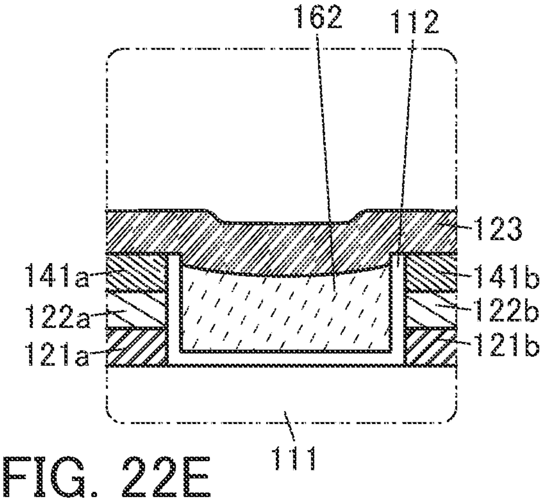

In FIG. 22D, the top surface of the insulator 162 includes a region that is at a lower level than the top surface of the EL layer 141*a* and the top surface of the EL layer 141*b*. Moreover, the top surface of the insulator 162 has a concave shape that is gently recessed toward the center.

Figure 22E:
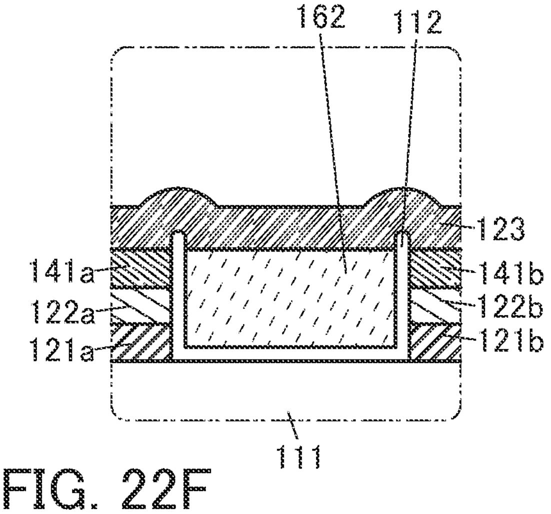

In FIG. 22E, the top surface of the insulator 112 includes a region that is at a higher level than the top surface of the EL layer 141*a* and the top surface of the EL layer 141*b*. That is, the insulator 112 protrudes from the formation surface of the EL layer 141 and forms a projecting portion.

In formation of the insulator 112, for example, when the insulator 112 is formed to be level with or substantially level with the sacrificial layer, a shape such that the insulator 112 protrudes is sometimes formed as illustrated in FIG. 22E.

Figure 22F:
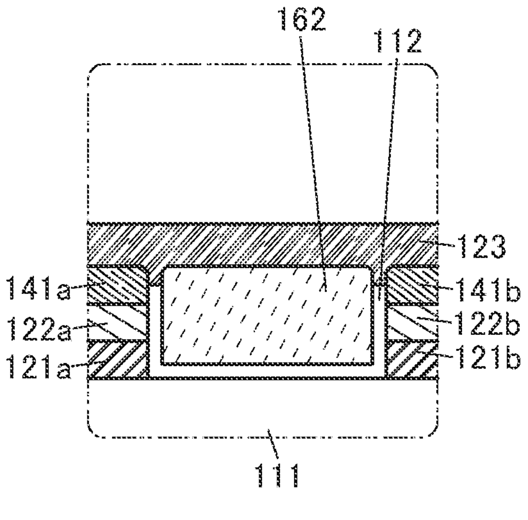

In FIG. 22F, the top surface of the insulator 112 includes a region that is at a lower level than the top surface of the EL layer 141*a* and the top surface of the EL layer 141*b*. That is, the insulator 112 forms a depressed portion on the formation surface of the EL layer 141.

As described above, the insulator 112 and the insulator 162 can have a variety of shapes.

Structure Example of Pixel Circuit

Here, structure examples of a pixel circuit that can be included in the pixel layer PXAL will be described.

Figure 23A:
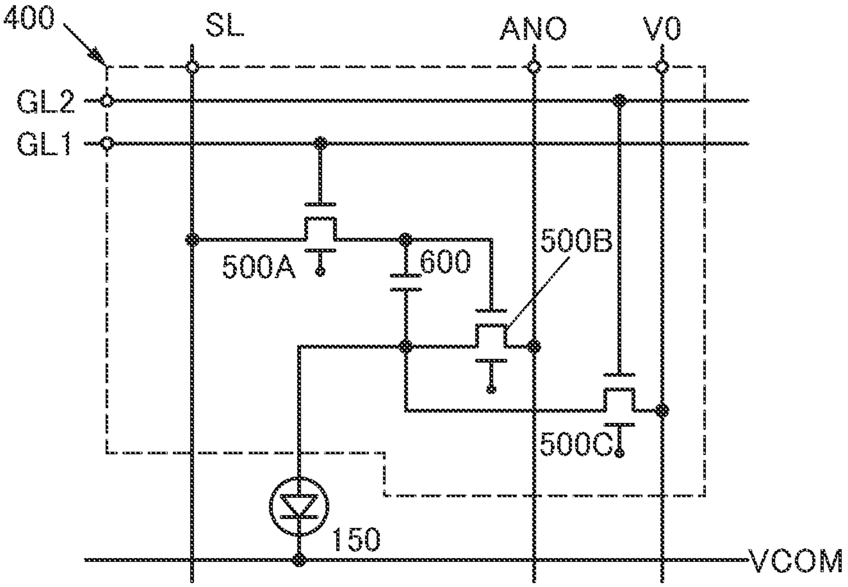
FIG. 23A and FIG. 23B are a circuit diagram and a schematic perspective view, respectively, illustrating a structure example of a pixel circuit included in a display apparatus.
Figure 23B:
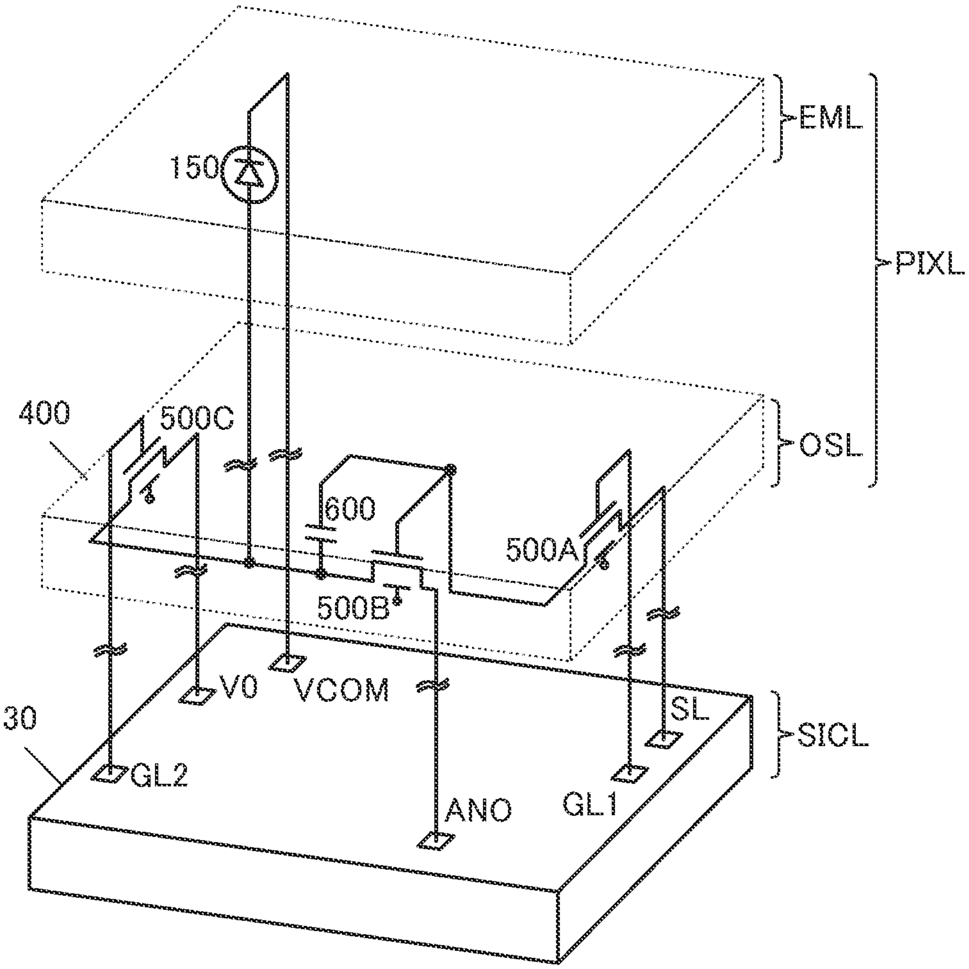

FIG. 23A and FIG. 23B illustrate a structure example of a pixel circuit that can be included in the pixel layer PXAL and the light-emitting device 150 connected to the pixel circuit. FIG. 23A is a diagram illustrating connection of circuit elements included in a pixel circuit 400 included in the pixel layer PXAL, and FIG. 23B is a diagram schematically illustrating the positional relation of the circuit layer SICL including a driver circuit 30 and the like, a layer OSL including a plurality of transistors of the pixel circuit, and a layer EML including the light-emitting device 150. Note that the pixel layer PXAL of the display apparatus 1000 illustrated in FIG. 23B includes the layer OSL and the layer EML, for example. A transistor 500A, a transistor 500B, a transistor 500C, or the like included in the layer OSL illustrated in FIG. 23B corresponds to the transistor 200 in FIG. 15. The light-emitting device 150 included in the layer EML illustrated in FIG. 23B corresponds to the light-emitting device 150*a* or the light-emitting device 150*b* in FIG. 15.

The pixel circuit 400 illustrated as an example in FIG. 23A and FIG. 23B includes the transistor 500A, the transistor 500B, the transistor 500C, and a capacitor 600. The transistor 500A, the transistor 500B, and the transistor 500C can be transistors that can be used as the transistor 200 described above as an example. That is, the transistor 500A, the transistor 500B, and the transistor 500C can be Si transistors. Alternatively, the transistor 500A, the transistor 500B, and the transistor 500C can be transistors that can be used as the transistor 500 described above as an example. That is, the transistor 500A, the transistor 500B, and the transistor 500C can be OS transistors. In particular, in the case where the transistor 500A, the transistor 500B, and the transistor 500C are OS transistors, each of the transistor 500A, the transistor 500B, and the transistor 500C preferably includes a back gate electrode, in which case a structure in which the back gate electrode is supplied with the same signals as the gate electrode or a structure in which the back gate electrode is supplied with signals different from those supplied to the gate electrode can be employed. Although each of the transistor 500A, the transistor 500B, and the transistor 500C illustrated in FIG. 23A and FIG. 23B includes a back gate electrode, each of the transistor 500A, the transistor 500B, and the transistor 500C does not necessarily include a back gate electrode.

The transistor 500B includes a gate electrode electrically connected to the transistor 500A, a first electrode electrically connected to the light-emitting device 150, and a second electrode electrically connected to a wiring ANO. The wiring ANO supplies a potential for supplying current to the light-emitting device 150.

The transistor 500A includes a first terminal electrically connected to the gate electrode of the transistor 500B, a second terminal electrically connected to the wiring SL functioning as a source line, and the gate electrode having a function of controlling the conducting state or the non-conducting state on the basis of the potential of the wiring GL1 functioning as a gate line.

The transistor 500C includes a first terminal electrically connected to a wiring V0, a second terminal electrically connected to the light-emitting device 150, and the gate electrode having a function of controlling the conducting state or the non-conducting state on the basis of the potential of the wiring GL2 functioning as a gate line. The wiring V0 is a wiring for supplying a reference potential and a wiring for outputting current flowing through the pixel circuit 400 to the driver circuit 30.

The capacitor 600 includes a conductive film electrically connected to the gate electrode of the transistor 500B and a conductive film electrically connected to the second electrode of the transistor 500C.

The light-emitting device 150 includes a first electrode electrically connected to the first electrode of the transistor 500B and a second electrode electrically connected to a wiring VCOM. The wiring VCOM is a wiring for supplying a potential for supplying current to the light-emitting device 150.

Accordingly, the intensity of light emitted from the light-emitting device 150 can be controlled in accordance with an image signal supplied to the gate electrode of the transistor 500B. Furthermore, variations in the gate-source voltage of the transistor 500B can be reduced by the reference potential of the wiring V0 supplied through the transistor 500C.

A current in amount that can be used for setting pixel parameters can be output from the wiring V0. Specifically, the wiring V0 can function as a monitor line for outputting current flowing through the transistor 500B or current flowing through the light-emitting device 150 to the outside. Current output to the wiring V0 is converted into voltage by a source follower circuit or the like and output to the outside. Alternatively, for example, current output to the wiring V0 can be converted into a digital signal by an analog-digital conversion circuit and output to the AI accelerator described in the above embodiment.

Note that in the structure illustrated as an example in FIG. 23B, the wirings electrically connecting the pixel circuit 400 and the driver circuit 30 can be shortened, so that wiring resistance of the wirings can be reduced. Thus, data writing can be performed at high speed, leading to high-speed operation of the display apparatus 1000. Therefore, even when the number of pixel circuits 400 included in the display apparatus 1000 is large, a sufficiently long frame period can be ensured and thus the pixel density of the display apparatus 1000 can be increased. In addition, the increased pixel density of the display apparatus 1000 enables a higher definition image to be displayed on the display apparatus 1000. For example, the pixel density of the display apparatus 1000 can be higher than or equal to 1000 ppi, higher than or equal to 5000 ppi, or higher than or equal to 7000 ppi. Thus, the display apparatus 1000 can be, for example, a display apparatus for AR or VR and can be suitably used in an electronic device with a short distance between a display portion and the user, such as a head-mounted display.

Figure 24A:
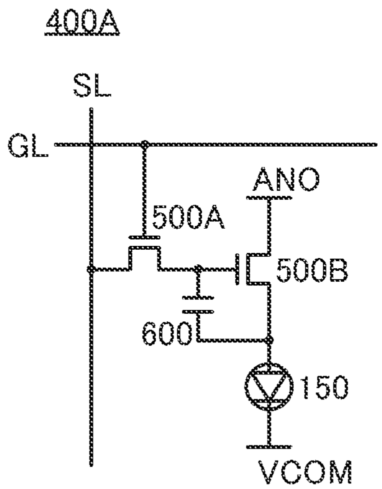
FIG. 24A to FIG. 24D are circuit diagrams each illustrating a structure example of a pixel circuit included in a display apparatus.

Although FIG. 23A and FIG. 23B illustrate, as an example, the pixel circuit 400 including three transistors in total, the pixel circuit of the electronic device of one embodiment of the present invention is not limited thereto. Structure examples of a pixel circuit that can be used as the pixel circuit 400 will be described below:

A pixel circuit 400A illustrated in FIG. 24A includes the transistor 500A, the transistor 500B, and the capacitor 600. FIG. 24A illustrates the light-emitting device 150 connected to the pixel circuit 400A. The wiring SL, the wiring GL, the wiring ANO, and the wiring VCOM are electrically connected to the pixel circuit 400A.

A gate of the transistor 500A is electrically connected to the wiring GL, one of a source and a drain of the transistor 500A is electrically connected to the wiring SL, and the other of the source and the drain of the transistor 500A is electrically connected to a gate of the transistor 500B and one electrode of the capacitor 600. One of a source and a drain of the transistor 500B is electrically connected to the wiring ANO and the other of the source and the drain of the transistor 500B is electrically connected to an anode of the light-emitting device 150. The other electrode of the capacitor 600 is electrically connected to the anode of the light-emitting device 150. A cathode of the light-emitting device 150 is electrically connected to the wiring VCOM.

Figure 24B:
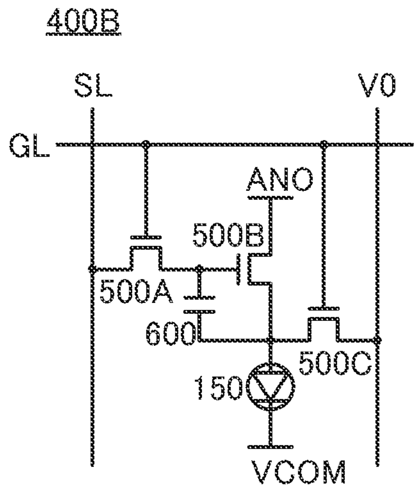

A pixel circuit 400B illustrated in FIG. 24B has a structure in which the transistor 500C is added to the pixel circuit 400A. In addition, the wiring V0 is electrically connected to the pixel circuit 400B.

Figure 24C:
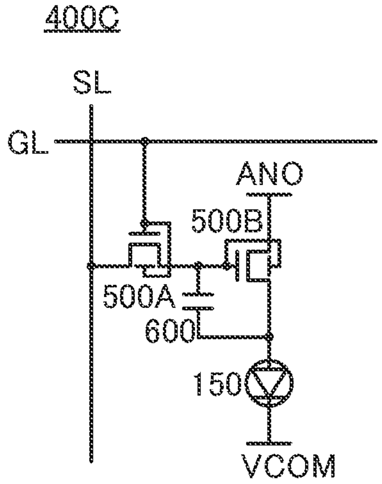
Figure 24D:
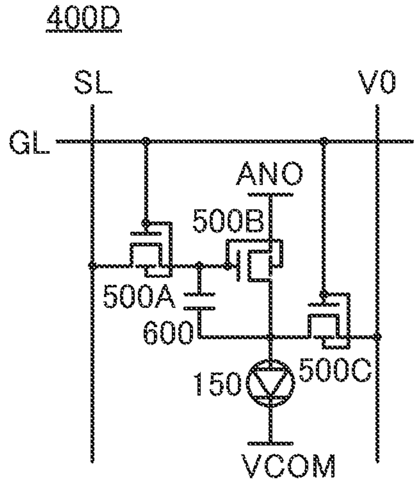

A pixel circuit 400C illustrated in FIG. 24C is an example of the case in which a transistor having a gate and a back gate electrically connected to each other is used as each of the transistor 500A and the transistor 500B of the pixel circuit 400A. A pixel circuit 400D illustrated in FIG. 24D is an example of the case where such transistors are used in the pixel circuit 400B. Thus, current that can flow through the transistors can be increased. Note that although transistors having a pair of gates electrically connected to each other are used as all the transistors here, one embodiment of the present invention is not limited thereto. A transistor having a pair of gates electrically connected to different wirings may be used. For example, when a transistor in which one of gates is electrically connected to a source is used, the reliability can be increased.

Figure 25A:
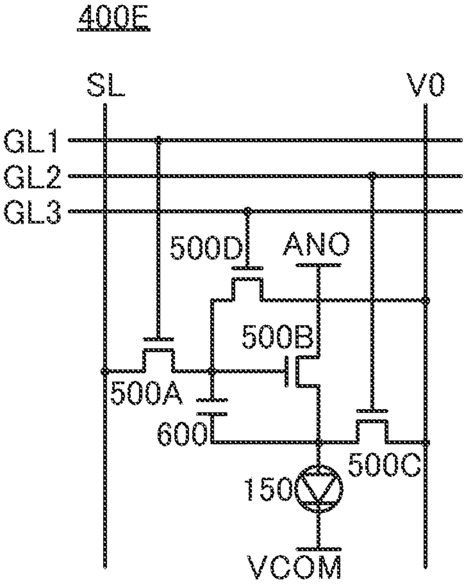
FIG. 25A to FIG. 25D are circuit diagrams each showing a structure example of a pixel circuit included in a display apparatus.

A pixel circuit 400E illustrated in FIG. 25A has a structure in which a transistor 500D is added to the pixel circuit 400B. Three wirings (the wiring GL1, the wiring GL2, and a wiring GL3) functioning as gate lines are electrically connected to the pixel circuit 400E.

A gate of the transistor 500D is electrically connected to the wiring GL3, one of a source and a drain of the transistor 500D is electrically connected to the gate of the transistor 500B, and the other of the source and the drain of the transistor 500D is electrically connected to the wiring V0. The gate of the transistor 500A is electrically connected to the wiring GL1, and the gate of the transistor 500C is electrically connected to the wiring GL2.

When the transistor 500C and the transistor 500D are brought into in conducting states at the same time, the source and the gate of the transistor 500B have the same potential, so that the transistor 500B can be brought into a non-conducting state. Thus, current flowing through the light-emitting device 150 can be blocked forcibly. Such a pixel circuit is suitable for the case of using a display method in which a display period and a non-lighting period are alternately provided.

Figure 25B:
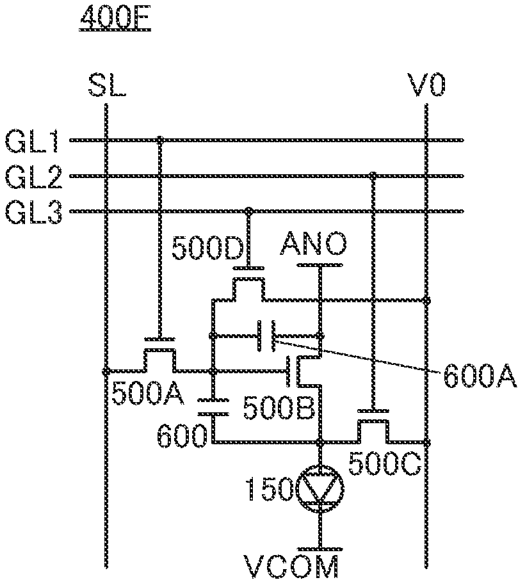

A pixel circuit 400F illustrated in FIG. 25B is an example of the case where a capacitor 600A is added to the pixel circuit 400E. The capacitor 600A functions as a storage capacitor.

Figure 25C:
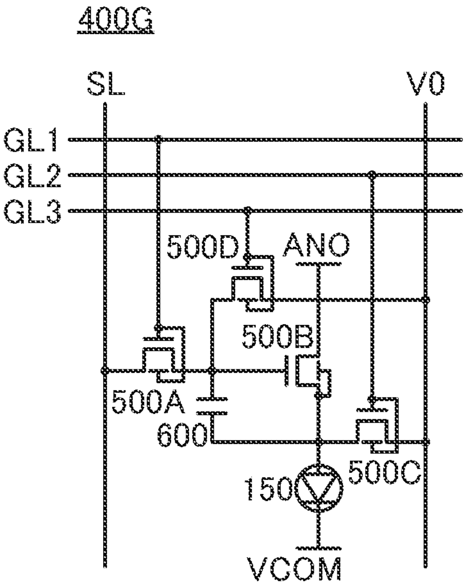
Figure 25D:
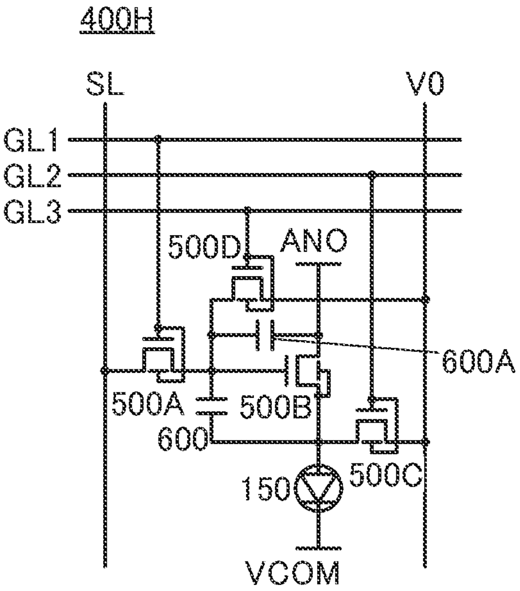

A pixel circuit 400G illustrated in FIG. 25C and a pixel circuit 400H illustrated in FIG. 25D are respectively examples of the cases where transistors each having a gate and a back gate that are electrically connected to each other are used in the pixel circuit 400E and the pixel circuit 400F. A transistor having a gate and a back gate electrically connected to each other is used as each of the transistor 500A, the transistor 500C, and the transistor 500D, and a transistor having a gate and a source electrically connected to each other is used as the transistor 500B.

<Pixel Layout>

Here, a pixel layout that can be used in a display apparatus of one embodiment of the present invention will be described. There is no particular limitation on the arrangement of subpixels, and a variety of methods can be employed. Examples of the arrangement of subpixels include stripe arrangement, S-stripe arrangement, matrix arrangement, delta arrangement, Bayer arrangement, and pentile arrangement.

Examples of a top surface shape of the subpixel include polygons such as a triangle, a quadrangle (including a rectangle and a square), and a pentagon; polygons with rounded corners; an ellipse; and a circle. Here, the top surface shape of the subpixel corresponds to the top surface shape of a light-emitting region of a light-emitting device.

Figure 26A:
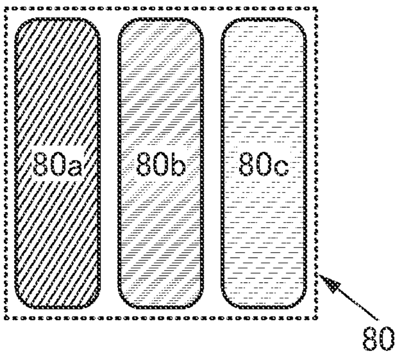
FIG. 26A to FIG. 26G are top views illustrating examples of a pixel.
Figure 27A:
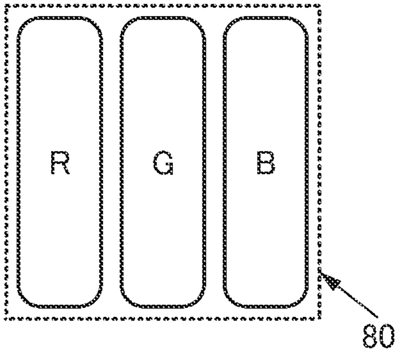
FIG. 27A to FIG. 27F are top views illustrating examples of a pixel.

The pixel 80 illustrated in FIG. 26A employs stripe arrangement. The pixel 80 illustrated in FIG. 26A is configured with three subpixels: a subpixel 80*a*, a subpixel 80*b*, and a subpixel 80*c*. For example, as illustrated in FIG. 27A, the subpixel 80*a* may be a red subpixel R, the subpixel 80*b* may be a green subpixel G, and the subpixel 80*c* may be a blue subpixel B.

Figure 26B:
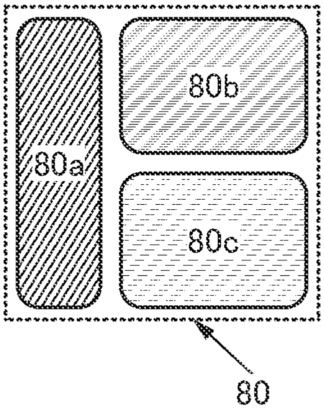
Figure 27B:
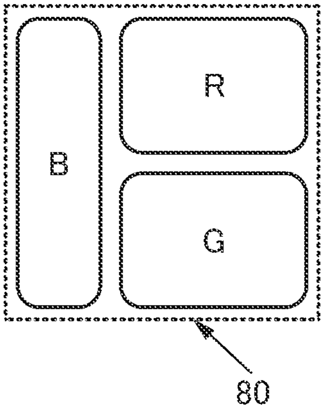

The pixel 80 illustrated in FIG. 26B employs S-stripe arrangement. The pixel 80 illustrated in FIG. 26B is configured with three subpixels: the subpixel 80*a*, the subpixel 80*b*, and the subpixel 80*c*. For example, as illustrated in FIG. 27B, the subpixel 80*a* may be the blue subpixel B, the subpixel 80*b* may be the red subpixel R, and the subpixel 80*c* may be the green subpixel G.

Figure 26C:
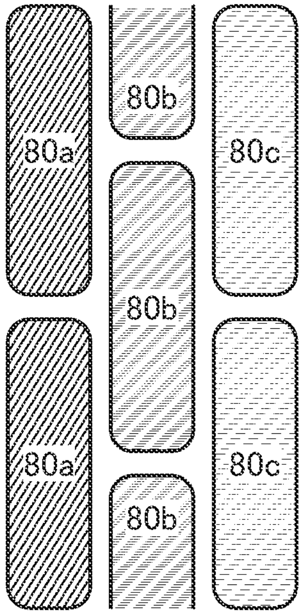
Figure 27C:
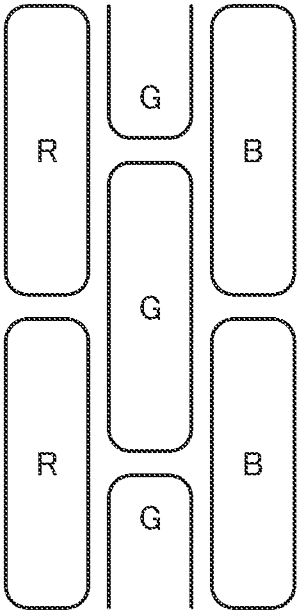

FIG. 26C illustrates an example in which subpixels of different colors are arranged in a zigzag manner. Specifically, the positions of the top sides of two subpixels arranged in the column direction (e.g., the subpixel 80*a* and the subpixel 80*b* or the subpixel 80*b* and the subpixel 80*c*) are not aligned in the plan view. For example, as illustrated in FIG. 27C, the subpixel 80*a* may be the red subpixel R, the subpixel 80*b* may be the green subpixel G, and the subpixel 80*c* may be the blue subpixel B.

Figure 26D:
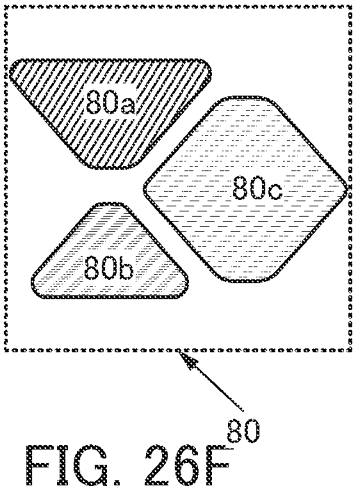
Figure 27D:
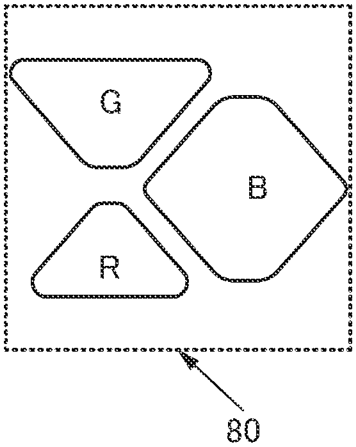

The pixel 80 illustrated in FIG. 26D includes the subpixel 80*a* whose top surface has a rough trapezoidal shape with rounded corners, the subpixel 80*b* whose top surface has a rough triangle shape with rounded corners, and the subpixel 80*c* whose top surface has a rough tetragonal or rough hexagonal shape with rounded corners. The subpixel 80*a* has a larger light-emitting area than the subpixel 80*b*. In this manner, the shapes and sizes of the subpixels can be determined independently. For example, the size of a subpixel including a light-emitting device with higher reliability can be smaller. For example, as illustrated in FIG. 27D, the subpixel 80*a* may be the green subpixel G, the subpixel 80*b* may be the red subpixel R, and the subpixel 80*c* may be the blue subpixel B.

Figure 26E:
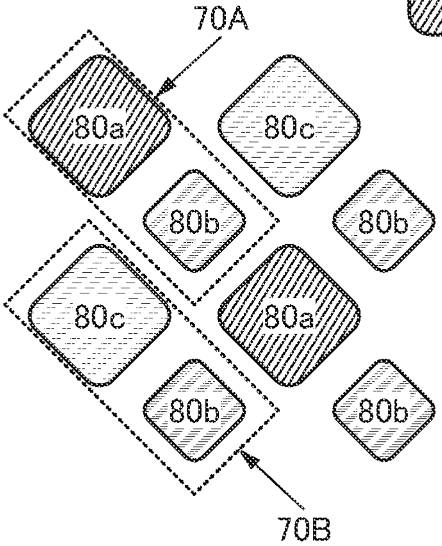
Figure 27E:
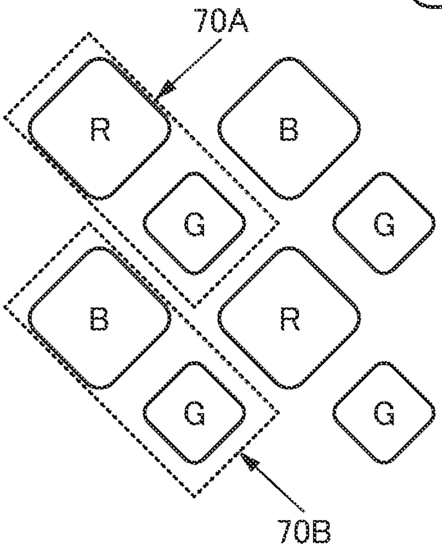

A pixel 70A and a pixel 70B illustrated in FIG. 26E employ pentile arrangement. FIG. 26E illustrates an example in which the pixels 70A including the subpixel 80*a* and the subpixel 80*b* and the pixels 70B including the subpixel 80*b* and the subpixel 80*c* are alternately arranged. For example, as illustrated in FIG. 27E, the subpixel 80*a* may be the red subpixel R, the subpixel 80*b* may be the green subpixel G, and the subpixel 80*c* may be the blue subpixel B.

Figure 26F:
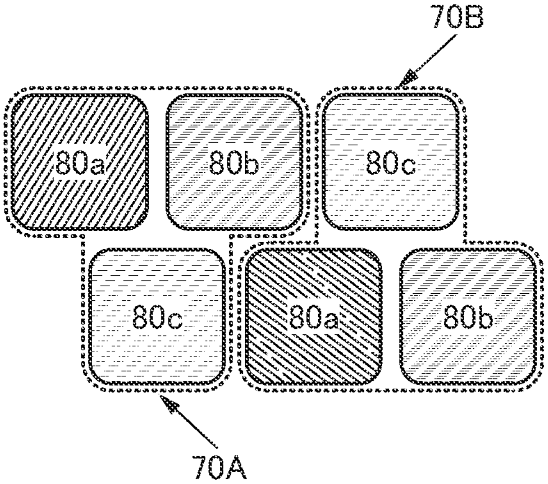
Figure 26G:
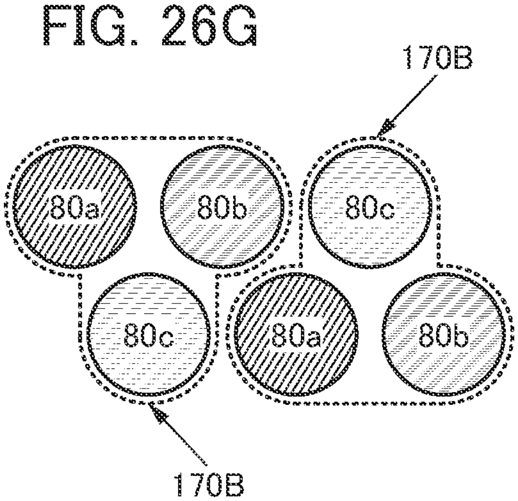
Figure 27F:
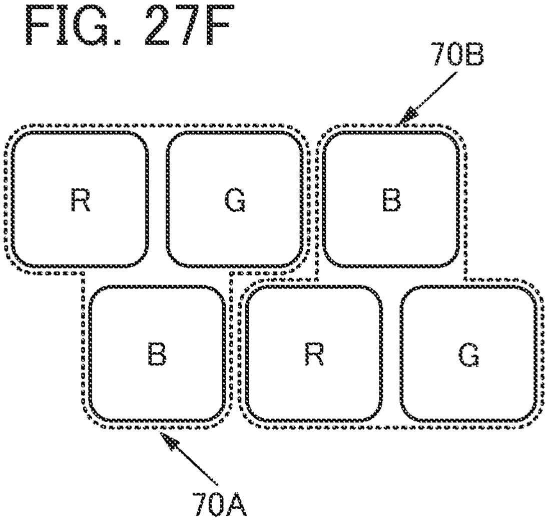

The pixel 70A and the pixel 70B illustrated in FIG. 26F and FIG. 26G employ delta arrangement. The pixel 70A includes two subpixels (the subpixel 80*a*, the subpixel 80*b*) in the upper row (first row) and one subpixel (the subpixel 80*c*) in the lower row (second row). The pixel 70B includes one subpixel (the subpixel 80*c*) in the upper row (first row) and two subpixels (the subpixel 80*a* and the subpixel 80*b*) in the lower row (second row). For example, as illustrated in FIG. 27F, the subpixel 80*a* may be the red subpixel R, the subpixel 80*b* may be the green subpixel G, and the subpixel 80*c* may be the blue subpixel B.

FIG. 26F illustrates an example in which the top surface of each subpixel has a rough quadrangular shape with rounded corners, and FIG. 26G illustrates an example in which the top surface of each subpixel has a circular shape.

In a photolithography method, as a pattern to be processed becomes finer, the influence of light diffraction becomes more difficult to ignore; therefore, the fidelity in transferring a photomask pattern by light exposure is degraded, and it becomes difficult to process a resist mask into a desired shape. Thus, a pattern with rounded corners is likely to be formed even with a rectangular photomask pattern. Consequently, the top surface of a subpixel can have a polygonal shape with rounded corners, an elliptical shape, or a circular shape in some cases.

Furthermore, in the method for fabricating the display apparatus of one embodiment of the present invention, the EL layer is processed into an island shape with the use of a resist mask. A resist film formed over the EL layer needs to be cured at a temperature lower than the upper temperature limit of the EL layer. Therefore, the resist film is insufficiently cured in some cases depending on the upper temperature limit of the material of the EL layer and the curing temperature of the resist material. An insufficiently cured resist film may have a shape different from a desired shape by processing. As a result, the top surface of the EL layer may have a polygonal shape with rounded corners, an elliptical shape, or a circular shape. For example, when a resist mask with a square top surface is intended to be formed, a resist mask with a circular top surface may be formed, and the top surface of the EL layer may be circular.

To obtain a desired top surface shape of the EL layer, a technique of correcting a mask pattern in advance such that a transferred pattern agrees with a design pattern (OPC (Optical Proximity Correction) technique) may be used. Specifically, with the OPC technique, a pattern for correction is added to a corner portion or the like of a figure on a mask pattern.

Figure 28A:
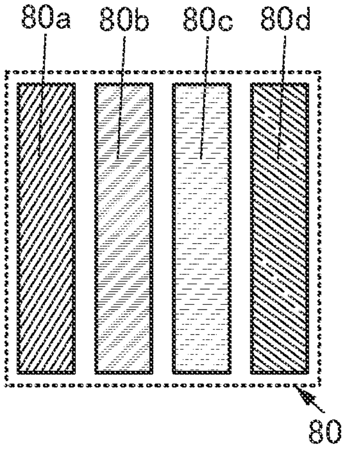
FIG. 28A to FIG. 28H are top views illustrating examples of a pixel.
Figure 28B:
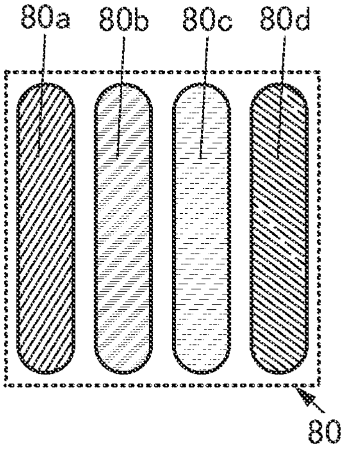
Figure 28C:
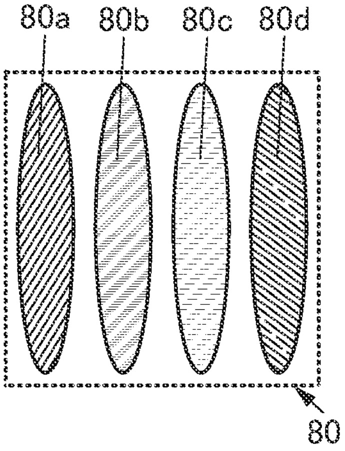

The pixels 80 illustrated in FIG. 28A to FIG. 28C employ stripe arrangement.

FIG. 28A illustrates an example in which each subpixel has a rectangular top surface shape, FIG. 28B illustrates an example in which each subpixel has a top surface shape formed by combining two half circles and a rectangle, and FIG. 28C illustrates an example in which each subpixel has an elliptical top surface shape.

Figure 28D:
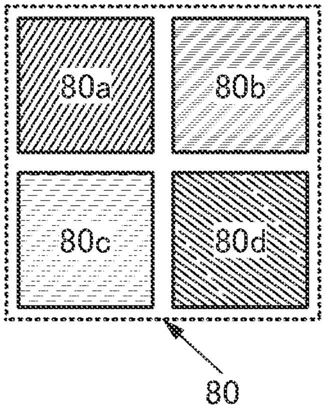
Figure 28E:
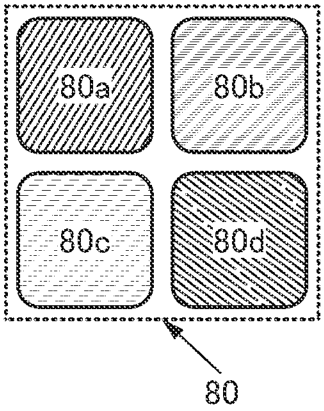
Figure 28F:
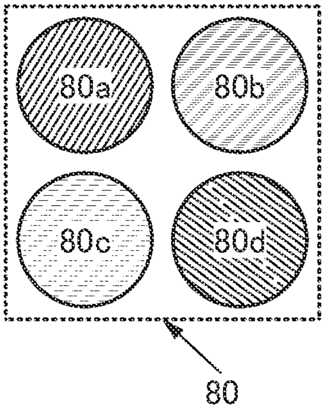

The pixels 80 illustrated in FIG. 28D to FIG. 28F employ matrix arrangement.

FIG. 28D illustrates an example in which each subpixel has a square top surface shape, FIG. 28E illustrates an example in which each subpixel has a rough square top surface shape with rounded corners, and FIG. 28F illustrates an example in which each subpixel has a circular top surface shape.

Figure 29A:
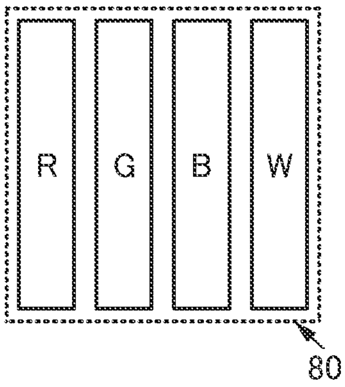
FIG. 29A to FIG. 29D are top views illustrating examples of a pixel.
Figure 29B:
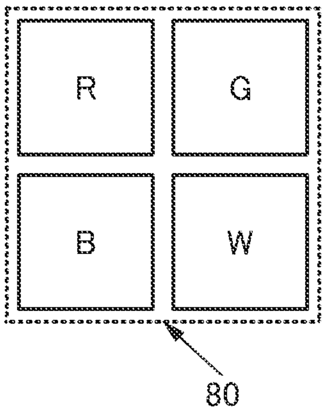

The pixels 80 illustrated in FIG. 28A to FIG. 28F are each configured with four subpixels: the subpixel 80*a*, the subpixel 80*b*, the subpixel 80*c*, and a subpixel 80*d*. The subpixel 80*a*, the subpixel 80*b*, the subpixel 80*c*, and the subpixel 80*d* emit light of different colors. For example, the subpixel 80*a*, the subpixel 80*b*, the subpixel 80*c*, and the subpixel 80*d* can be red, green, blue, and white subpixels, respectively. For example, the subpixel 80*a*, the subpixel 80*b*, the subpixel 80*c*, and the subpixel 80*d* can be red, green, blue, and white subpixels, respectively, as illustrated in FIG. 29A and FIG. 29B. Alternatively, the subpixel 80*a*, the subpixel 80*b*, the subpixel 80*c*, and the subpixel 80*d* can be red, green, blue, and infrared-light subpixels, respectively.

The subpixel 80*d* includes a light-emitting device. The light-emitting device includes, for example, a pixel electrode, an EL layer, and the conductor 121CM functioning as a common electrode. For the pixel electrode, a material similar to those for the conductor 121*a*, the conductor 121*b*, the conductor 121*c*, the conductor 122*a*, the conductor 122*b*, and the conductor 122*c* can be used. For the EL layer, a material similar to that for the EL layer 141*a*, the EL layer 141*b*, and the EL layer 141*c* can be used, for example.

Figure 28G:
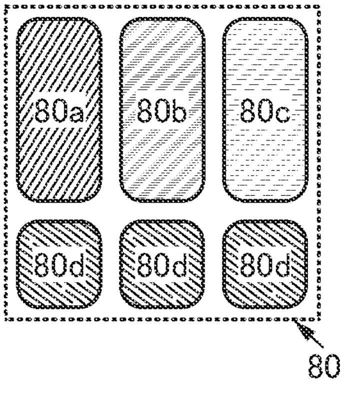

FIG. 28G illustrates an example in which one pixel 80 is configured with two rows and three columns. The pixel 80 includes three subpixels (the subpixel 80*a*, the subpixel 80*b*, and the subpixel 80*c*) in the upper row (first row) and three subpixels 80*d* in the lower row (second row). In other words, the pixel 80 includes the subpixel 80*a* and the subpixel 80*d* in the left column (first column), the subpixel 80*b* and another subpixel 80*d* in the center column (second column), and the subpixel 80*c* and another subpixel 80*d* in the right column (third column). Matching the positions of the subpixels in the upper row and the lower row as illustrated in FIG. 28G enables dust and the like that would be produced in the manufacturing process to be removed efficiently. Thus, a display apparatus with high display quality can be provided.

Figure 28H:
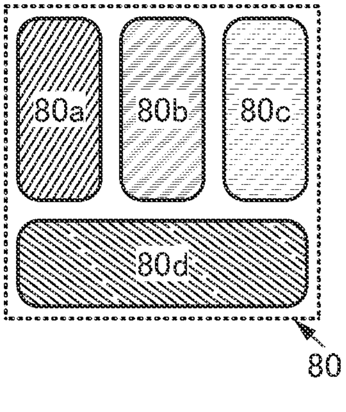

FIG. 28H illustrates an example in which one pixel 80 is configured with two rows and three columns. The pixel 80 includes three subpixels (the subpixel 80*a*, the subpixel 80*b*, and the subpixel 80*c*) in the upper row (first row) and one subpixel (the subpixel 80*d*) in the lower row (second row). In other words, the pixel 80 includes the subpixel 80*a* in the left column (first column), the subpixel 80*b* in the center column (second column), the subpixel 80*c* in the right column (third column), and the subpixel 80*d* across these three columns.

Figure 29C:
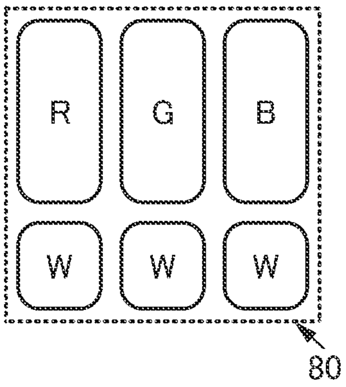
Figure 29D:
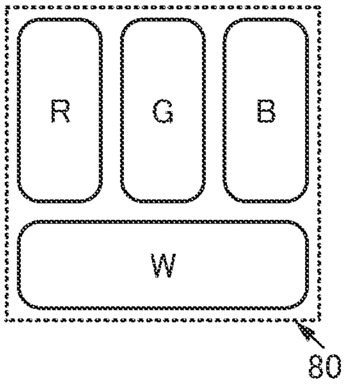

In the pixel 80 illustrated in each of FIG. 28G and FIG. 28H, for example, the subpixel 80*a* can be the red subpixel R, the subpixel 80*b* can be the green subpixel G, the subpixel 80*c* can be the blue subpixel B, and the subpixel 80*d* can be a white subpixel W, as illustrated in FIG. 29C and FIG. 29D.

Note that the insulators, the conductors, the semiconductors, and the like disclosed in this specification and the like can be formed by a PVD (Physical Vapor Deposition) method or a CVD method. Examples of a PVD method include a sputtering method, a resistance heating evaporation method, an electron beam evaporation method, and a PLD method. Examples of the CVD method include a plasma CVD method and a thermal CVD method. In particular, examples of a thermal CVD method include an MOCVD (Metal Organic Chemical Vapor Deposition) method and an ALD (Atomic Layer Deposition) method.

A thermal CVD method, which is a deposition method not using plasma, has an advantage that a defect due to plasma damage is not generated.

Deposition by a thermal CVD method may be performed in the following manner: a source gas and an oxidizer are supplied into a chamber at a time, the pressure in the chamber is set to an atmospheric pressure or a reduced pressure, and they are made to react with each other in the vicinity of the substrate or over the substrate to be deposited over the substrate.

Deposition by an ALD method may be performed in the following manner: pressure in a chamber is set to an atmospheric pressure or a reduced pressure, source gases for reaction are sequentially introduced into the chamber, and then the sequence of the gas introduction is repeated. For example, two or more kinds of source gases are sequentially supplied to the chamber by switching respective switching valves (also referred to as high-speed valves); in order to avoid mixing of the plurality of kinds of source gases, an inert gas (e.g., argon or nitrogen) or the like is introduced at the same time as or after introduction of a first source gas and then a second source gas is introduced. Note that in the case where the first source gas and the inert gas are introduced at a time, the inert gas serves as a carrier gas, and the inert gas may also be introduced at the same time as the introduction of the second source gas. Alternatively, the second source gas may be introduced after the first source gas is exhausted by vacuum evacuation instead of the introduction of the inert gas. The first source gas is adsorbed on the surface of the substrate to deposit a first thin layer, and then the second source gas is introduced to react with the first thin layer; as a result, a second thin layer is stacked over the first thin layer, so that a thin film is formed. The sequence of the gas introduction is controlled and repeated a plurality of times until a desired thickness is obtained, so that a thin film with excellent step coverage can be formed. The thickness of the thin film can be adjusted by the number of repetition times of the sequence of the gas introduction; therefore, an ALD method makes it possible to accurately adjust the thickness and is thus suitable for fabricating a minute FET.

A variety of films such as the metal film, the semiconductor film, and the inorganic insulating film disclosed in the above-described embodiments can be formed by a thermal CVD method such as an MOCVD method and an ALD method; for example, in the case of depositing an In—Ga—Zn—O film, trimethylindium ($In(CH_3)_3$), trimethylgallium ($Ga(CH_3)_3$), and dimethylzinc ($Zn(CH_3)_2$) are used. Without limitation to the above combination, triethylgallium ($Ga(C_2H_5)_3$) can also be used instead of trimethylgallium, and diethylzinc ($Zn(C_2H_5)_2$) can also be used instead of dimethylzinc.

For example, in the case where a hafnium oxide film is formed with a deposition apparatus utilizing an ALD method, two kinds of gases, ozone ($O_3$) as an oxidizer and a source gas which is obtained by vaporizing liquid containing a solvent and a hafnium precursor compound (e.g., hafnium alkoxide or hafnium amide such as tetrakis(dimethylamide)hafnium (TDMAH, $Hf[N(CH_3)_2]_4$)), are used. Examples of another material include tetrakis(ethylmethylamide)hafnium.

For example, in the case where an aluminum oxide film is formed with a deposition apparatus utilizing an ALD method, two kinds of gases, $H_2O$ as an oxidizer and a source gas which is obtained by vaporizing liquid containing a solvent and an aluminum precursor compound (e.g., trimethylaluminum (TMA, $Al(CH_3)_3$)) are used. Examples of another material include tris(dimethylamide)aluminum, triisobutylaluminum, and aluminum tris(2,2,6,6-tetramethyl-3,5-heptanedionate).

For example, in the case where a silicon oxide film is formed with a deposition apparatus utilizing an ALD method, hexachlorodisilane is adsorbed on a surface on which a film is to be formed, and radicals of an oxidizing gas (e.g., $O_2$ or dinitrogen monoxide) are supplied to react with the adsorbate.

For example, in the case where a tungsten film is deposited by a deposition apparatus utilizing an ALD method, a $WF_6$ gas and a $B_2H_6$ gas are sequentially and repeatedly introduced to form an initial tungsten film, and then a $WF_6$ gas and an $H_2$ gas are sequentially and repeatedly introduced to form a tungsten film. Note that a $SiH_4$ gas may be used instead of a $B_2H_6$ gas.

In the case where an In—Ga—Zn—O film is deposited as an oxide semiconductor film with a deposition apparatus utilizing an ALD method, for example, a precursor (generally referred to as a precursor, a metal precursor or the like in some cases) and an oxidizer (generally referred to as a reactant, a non-metal precursor, or the like in some cases) are sequentially and repeatedly introduced. Specifically, for example, an $In(CH_3)_3$ gas as a precursor and an $O_3$ gas as an oxidizer are introduced to form an In—O layer; a $Ga(CH_3)_3$ gas as a precursor and an $O_3$ gas as an oxidizer are introduced to form a GaO layer; and then, a $Zn(CH_3)_2$ gas as a precursor and an $O_3$ gas as an oxidizer are introduced to form a ZnO layer. Note that the order of these layers is not limited to this example. A mixed oxide layer such as an In—Ga—O layer, an In—Zn—O layer, or a Ga—Zn—O layer may be formed with the use of these gases. Note that although an $H_2O$ gas which is obtained by bubbling water with an inert gas such as Ar may be used instead of an $O_3$ gas, it is preferable to use an $O_3$ gas which does not contain H. Furthermore, instead of an $In(CH_3)_3$ gas, an $In(C_2H_5)_3$ gas may be used. Furthermore, instead of a $Ga(CH_3)_3$ gas, a $Ga(C_2H_5)_3$ gas may be used. Furthermore, a $Zn(CH_3)_2$ gas may be used.

There is no particular limitation on the screen ratio (aspect ratio) of the display portion of the electronic device of one embodiment of the present invention. For example, the display portion is compatible with a variety of screen ratios such as 1:1 (a square), 4:3, 16:9, and 16:10.

There is no particular limitation on the shape of the display portion of the electronic device of one embodiment of the present invention. The display portion can have any of various shapes such as a rectangular shape, a polygonal shape (e.g., octagon), a circular shape, and an elliptical shape.

Note that this embodiment can be combined with any of the other embodiments described in this specification as appropriate.

Embodiment 4

In this embodiment, a display module that can be used for the electronic device of one embodiment of the present invention will be described.

Structure Example of Display Module

First, a display module including the display apparatus that can be used for the electronic device of one embodiment of the present invention will be described.

Figure 30A:
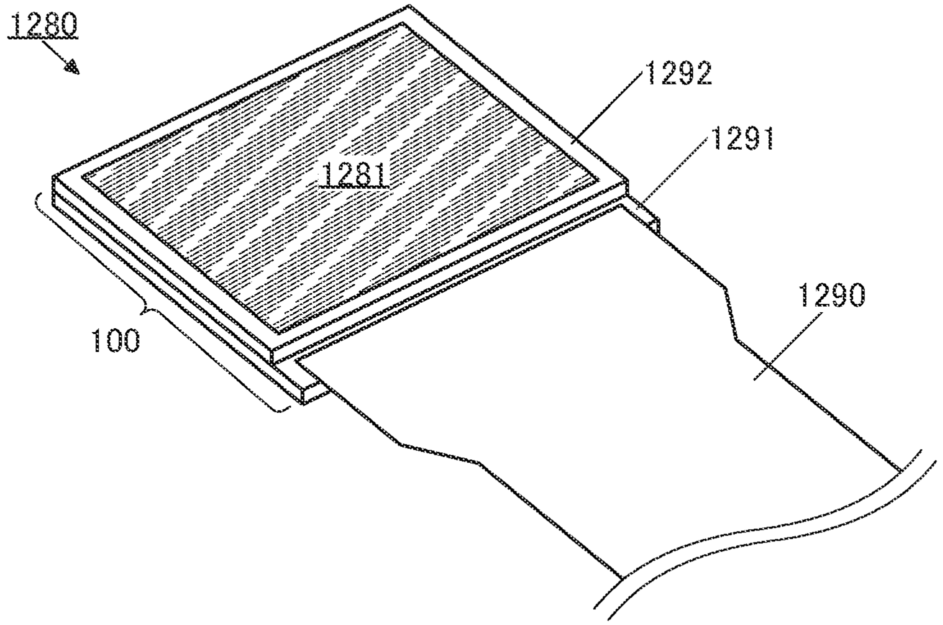
FIG. 30A and FIG. 30B are diagrams illustrating a structure example of a display module.

FIG. 30A is a perspective view of a display module 1280. The display module 1280 includes the display apparatus 1000 and an FPC 1290.

The display module 1280 includes a substrate 1291 and a substrate 1292. The display module 1280 includes a display portion 1281. The display portion 1281 is a region of the display module 1280 where an image is displayed, and is a region where light emitted from pixels provided in a pixel portion 1284 described later can be seen.

Figure 30B:
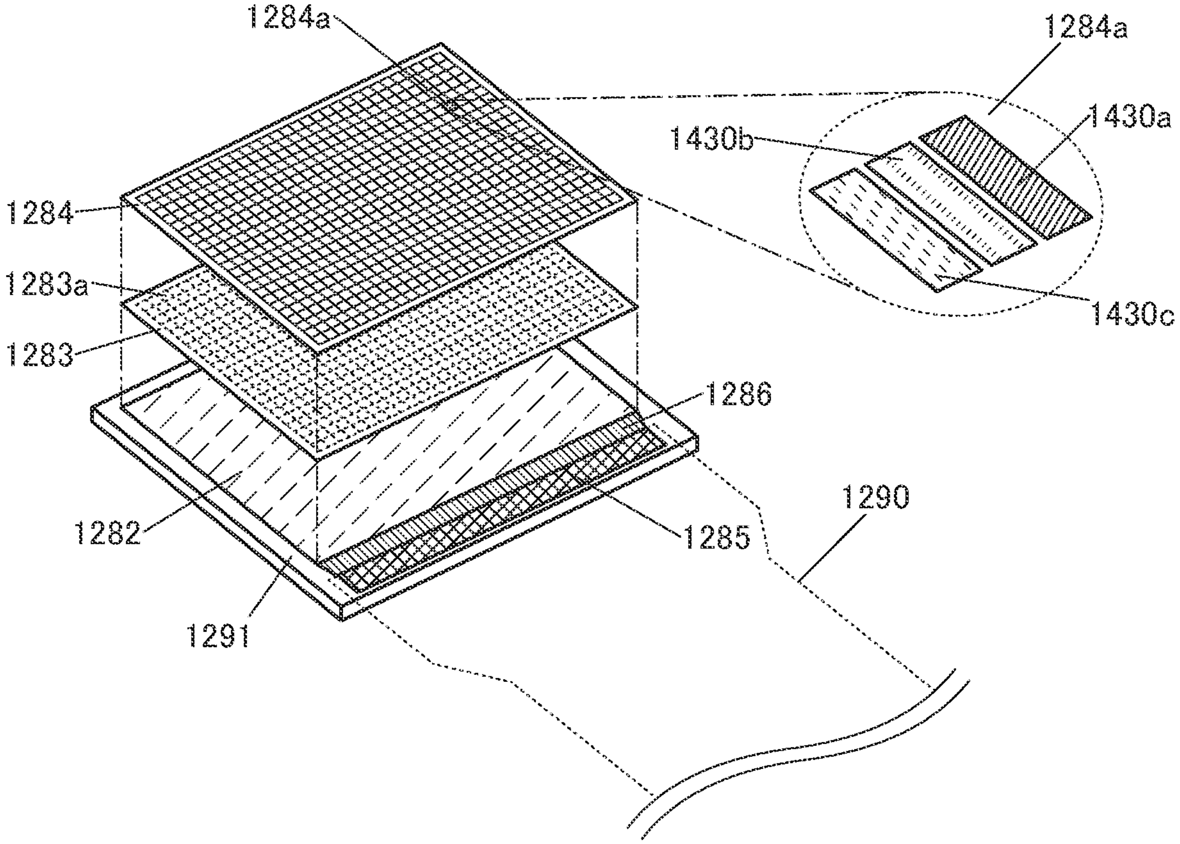

FIG. 30B is a perspective view schematically illustrating a structure on the substrate 1291 side. A circuit portion 1282, a pixel circuit portion 1283 over the circuit portion 1282, and the pixel portion 1284 over the pixel circuit portion 1283 are stacked over the substrate 1291. In addition, a terminal portion 1285 for connection to the FPC 1290 is provided in a portion not overlapping with the pixel portion 1284 over the substrate 1291. The terminal portion 1285 and the circuit portion 1282 are electrically connected to each other through a wiring portion 1286 formed of a plurality of wirings.

Note that the pixel portion 1284 and the pixel circuit portion 1283 correspond to the pixel layer PXAL described above, for example. The circuit portion 1282 corresponds to the circuit layer SICL described above, for example.

The pixel portion 1284 includes a plurality of pixels 1284*a* arranged periodically. An enlarged view of one pixel 1284*a* is illustrated on the right side in FIG. 30B. The pixel 1284*a* includes a light-emitting device 1430*a*, a light-emitting device 1430*b*, and a light-emitting device 1430*c* that emit light of different colors. Note that the light-emitting device 1430*a*, the light-emitting device 1430*b*, and the light-emitting device 1430*c* correspond to the light-emitting device 150*a*, the light-emitting device 150*b*, and the light-emitting device 150*c* described above, for example. The above-described light-emitting devices may be arranged in a stripe pattern as illustrated in FIG. 30B. Alternatively, a variety of arrangement methods, such as delta arrangement and pentile arrangement, can be employed.

The pixel circuit portion 1283 includes a plurality of pixel circuits 1283*a* arranged periodically.

One pixel circuit 1283*a* is a circuit that controls light emission from three light-emitting devices included in one pixel 1284*a*. One pixel circuit 1283*a* may be provided with three circuits each of which controls light emission from one light-emitting device. For example, the pixel circuit 1283*a* can include at least one selection transistor, one current control transistor (driving transistor), and a capacitor for one light-emitting device. In that case, a gate signal is input to a gate of the selection transistor, and a source signal is input to one of a source and a drain of the selection transistor. Thus, an active-matrix display apparatus is achieved.

The circuit portion 1282 includes a circuit for driving the pixel circuits 1283*a* in the pixel circuit portion 1283. For example, one or both of a gate line driver circuit and a source line driver circuit are preferably included. In addition, one or more selected from an arithmetic circuit, a memory circuit, and a power supply circuit may be included.

The FPC 1290 functions as a wiring for supplying a video signal or a power supply potential to the circuit portion 1282 from the outside. In addition, an IC may be mounted on the FPC 1290.

The display module 1280 can have a structure in which one or both of the pixel circuit portion 1283 and the circuit portion 1282 are stacked below the pixel portion 1284; thus, the aperture ratio (the effective display area ratio) of the display portion 1281 can be significantly high. For example, the aperture ratio of the display portion 1281 can be higher than or equal to 40% and lower than 100%, preferably higher than or equal to 50% and lower than or equal to 95%, further preferably higher than or equal to 60% and lower than or equal to 95%. Furthermore, the pixels 1284*a* can be arranged extremely densely and thus the display portion 1281 can have an extremely high definition. For example, the pixels 1284*a* are preferably arranged in the display portion 1281 with a definition higher than or equal to 2000 ppi, preferably higher than or equal to 3000 ppi, further preferably higher than or equal to 5000 ppi, still further preferably higher than or equal to 6000 ppi, and lower than or equal to 20000 ppi or lower than or equal to 30000 ppi.

Such a display module 1280 has an extremely high resolution and thus can be suitably used for a VR device such as a head-mounted display or a glasses-type AR device. For example, even with a structure in which the display portion of the display module 1280 is seen through a lens, pixels of the extremely-high-resolution display portion 1281 included in the display module 1280 are prevented from being perceived when the display portion is enlarged by the lens, so that display providing a strong sense of immersion can be performed. Without being limited thereto, the display module 1280 can be suitably used for electronic devices including relatively small display portions. For example, the display module 1280 can be suitably used for a display portion of a wearable electronic device such as a wristwatch.

Note that this embodiment can be combined with any of the other embodiments described in this specification as appropriate.

Embodiment 5

In this embodiment, electronic devices each including a display apparatus will be described as examples of an electronic device of one embodiment of the present invention.

Figure 31A:
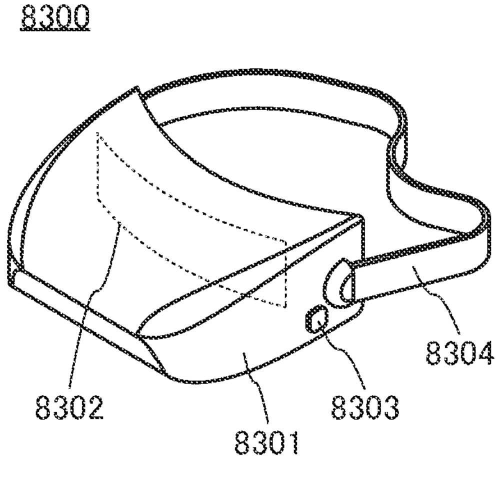
FIG. 31A to FIG. 31F are diagrams illustrating a structure example of an electronic device.
Figure 31B:
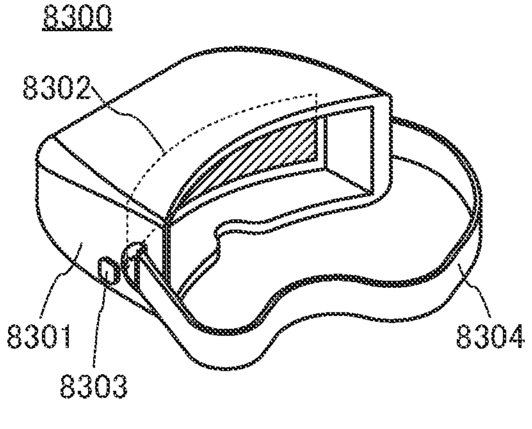

FIG. 31A and FIG. 31B each illustrate an appearance of an electronic device 8300 that is a head-mounted display.

The electronic device 8300 includes a housing 8301, a display portion 8302, an operation button 8303, and a band-shaped fixing unit 8304.

The operation button 8303 has a function of a power button or the like. The electronic device 8300 may include a button other than the operation button 8303.

Figure 31C:
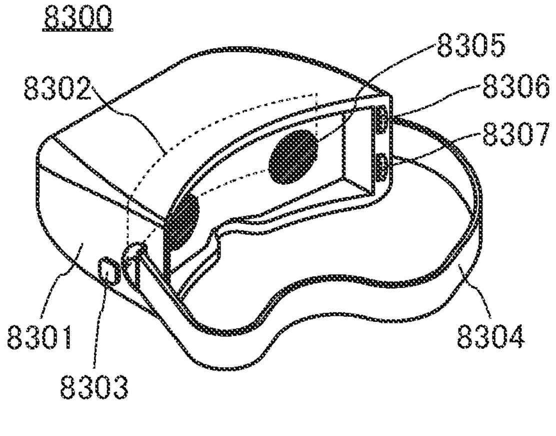

As illustrated in FIG. 31C, lenses 8305 may be included between the display portion 8302 and the positions of the user's eyes. The user can see magnified images on the display portion 8302 through the lenses 8305, leading to a higher realistic sensation. In that case, as illustrated in FIG. 31C, a dial 8306 for changing the positions of the lenses to adjust visibility may be included.

For the display portion 8302, a display apparatus with an extremely high definition is preferably used, for example. When a high-definition display apparatus is used for the display portion 8302, it is possible to display a more realistic image that does not allow the user to perceive pixels even when the image is magnified using the lenses 8305 as illustrated in FIG. 31C.

FIG. 31A to FIG. 31C illustrate an example in which one display portion 8302 is provided. Such a structure can reduce the number of components.

The display portion 8302 can display an image for the right eye and an image for the left eye side by side on a right region and a left region, respectively. Thus, a three-dimensional image using binocular disparity can be displayed.

One image that can be seen by both eyes may be displayed on the entire display portion 8302. A panorama image can thus be displayed from end to end of the field of view, which can provide a stronger sense of reality.

Here, the display portion 8302 of the electronic device 8300 preferably has, for example, a mechanism for changing the curvature of the display portion 8302 to an optimal value in accordance with at least one of the size of the user's head and the positions of the user's eyes. For example, the user himself or herself may adjust the curvature of the display portion 8302 by operating a dial 8307 for adjusting the curvature of the display portion 8302. Alternatively, a sensor for detecting the size of the user's head or the positions of the user's eyes (e.g., a camera, a contact sensor, and a noncontact sensor) may be provided on the housing 8301, and a mechanism for adjusting the curvature of the display portion 8302 on the basis of detection data obtained by the sensor may be provided.

In the case where the lenses 8305 are used, a mechanism for adjusting the positions and angle of the lenses 8305 in synchronization with the curvature of the display portion 8302 is preferably provided. Alternatively, the dial 8306 may have a function of adjusting the angle of the lenses.

Figure 31D:
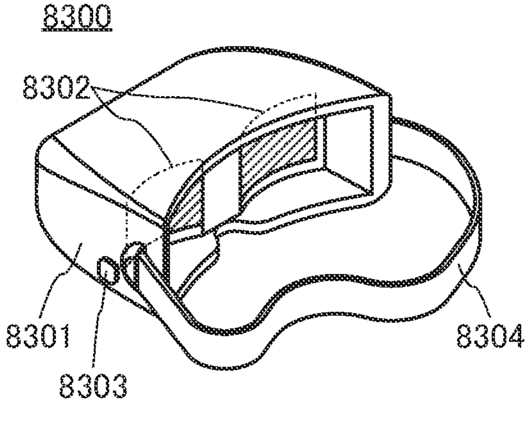
Figure 31E:
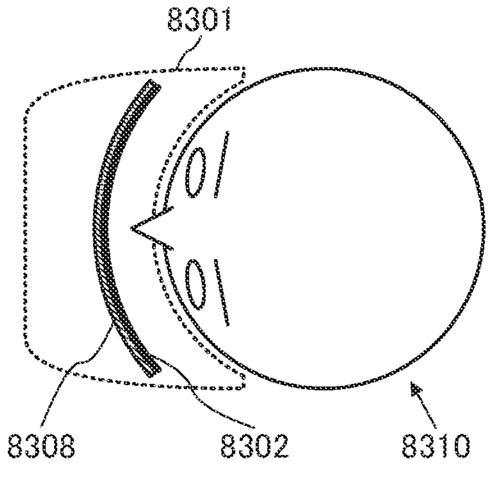
Figure 31F:
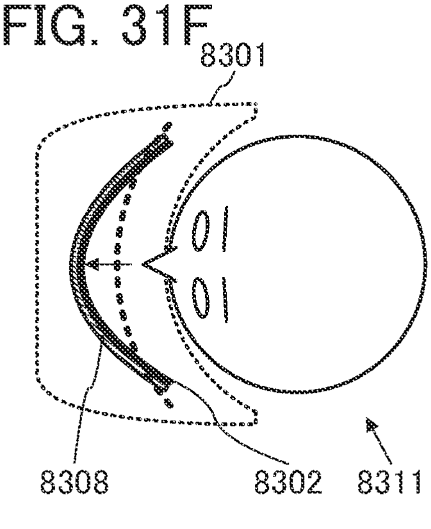

FIG. 31E and FIG. 31F illustrate an example in which a driver portion 8308 controlling the curvature of the display portion 8302 is provided. The driver portion 8308 is fixed to at least part of the display portion 8302. The driver portion 8308 has a function of changing the shape of the display portion 8302 when the part that is fixed to the display portion 8302 changes in shape or moves.

FIG. 31E is a schematic view illustrating the case where a user 8310 having a relatively large head wears the housing 8301. In that case, the driver portion 8308 adjusts the shape of the display portion 8302 such that the curvature is relatively small (the radius of curvature is large).

By contrast, FIG. 31F illustrates the case where a user 8311 having a smaller head than the user 8310 wears the housing 8301. The user 8311 has a shorter distance between the eyes than the user 8310. In that case, the driver portion 8308 adjusts the shape of the display portion 8302 such that the curvature of the display portion 8302 is large (the radius of curvature is small). In FIG. 31F, the position and shape of the display portion 8302 in FIG. 31E are denoted by a dashed line.

When the electronic device 8300 has such a mechanism for adjusting the curvature of the display portion 8302, an optimal display can be offered to a variety of users of all ages and genders.

When the curvature of the display portion 8302 is changed in accordance with contents displayed on the display portion 8302, the user can have a more realistic sensation. For example, shaking can be expressed by fluctuating the curvature of the display portion 8302. In this way, it is possible to produce various effects depending on the scene in contents, and provide the user with new experiences. A further realistic display can be provided when the display portion 8302 operates in conjunction with a vibration module provided in the housing 8301.

Note that the electronic device 8300 may include two display portions 8302 as illustrated in FIG. 31D.

Since the two display portions 8302 are included, the user's eyes can see their respective display portions. This allows a high screen resolution image to be displayed even when three-dimensional display using parallax is performed. In addition, the display portion 8302 is curved around an arc with the user's eye as an approximate center. This allows a uniform distance between the user's eye and the display surface of the display portion; thus, the user can see a more natural image. Even when the luminance or chromaticity of light from the display portion is changed depending on the angle at which the user sees it, since the user's eye is positioned in a normal direction of the display surface of the display portion, the influence of the change can be substantially ignorable and thus a more realistic image can be displayed.

Figure 32A:
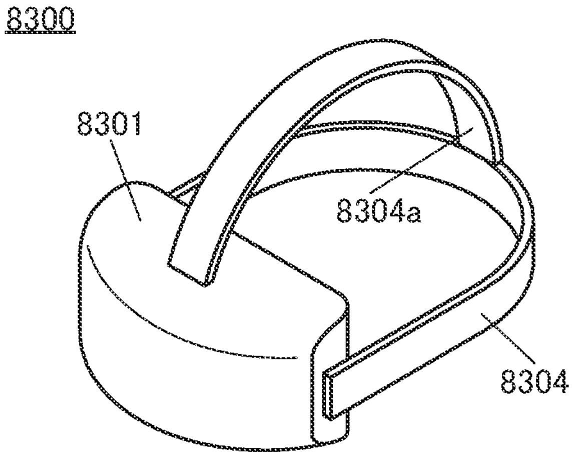
FIG. 32A to FIG. 32D are diagrams illustrating structure examples of electronic devices.
Figure 32B:
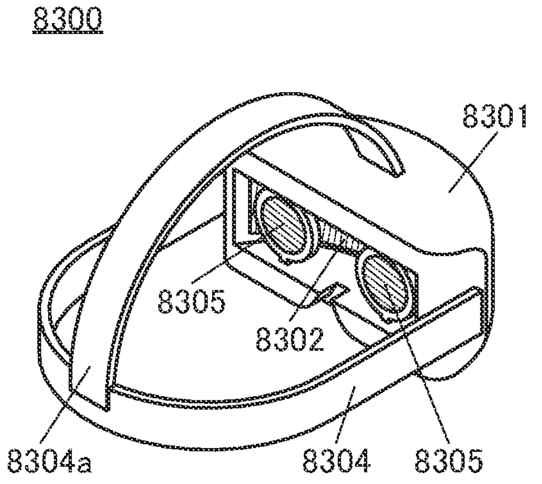
Figure 32C:
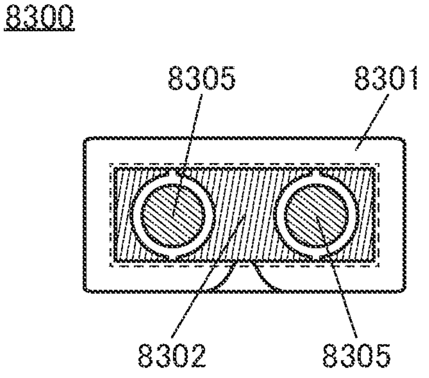

FIG. 32A to FIG. 32C are diagrams illustrating an appearance of another electronic device 8300, which is different from the electronic devices 8300 illustrated in FIG. 31A to FIG. 31D. Specifically, FIG. 32A to FIG. 32C are different from FIG. 31A to FIG. 31D in including a fixing unit 8304*a* worn on a head and a pair of lenses 8305, for example.

A user can see display on the display portion 8302 through the lenses 8305. The display portion 8302 is preferably curved so that the user can feel high realistic sensation. Another image displayed on another region of the display portion 8302 is seen through the lenses 8305, so that three-dimensional display using parallax can be performed. Note that the structure is not limited to the structure in which one display portion 8302 is provided; two display portions 8302 may be provided and one display portion may be provided per eye of the user.

For the display portion 8302, a display apparatus with an extremely high definition is preferably used, for example. When a high-definition display apparatus is used for the display portion 8302, it is possible to display a more realistic image that does not allow the user to perceive pixels even when the image is magnified using the lenses 8305 as illustrated in FIG. 32C.

Figure 32D:
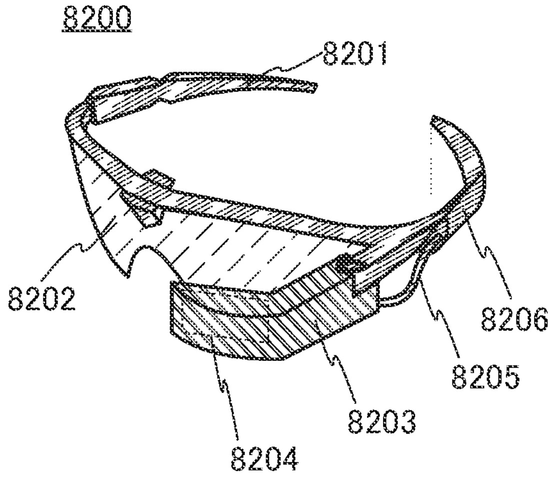

The head-mounted display, which is an electronic device of one embodiment of the present invention, may be an electronic device 8200 illustrated in FIG. 32D, which is a glasses-type head-mounted display.

The electronic device 8200 includes a mounting portion 8201, a lens 8202, a main body 8203, a display portion 8204, and a cable 8205. A battery 8206 is incorporated in the mounting portion 8201.

The cable 8205 supplies power from the battery 8206 to the main body 8203. The main body 8203 includes a wireless receiver or the like and can display received image information on the display portion 8204. The main body 8203 includes a camera, and information on the movement of the eyeballs or the eyelids of the user can be used as an input means.

The mounting portion 8201 may include a plurality of electrodes capable of sensing current flowing accompanying with the movement of the user's eyeballs at a position in contact with the user to recognize the user's sight line. The mounting portion 8201 may also have a function of monitoring the user's pulse with use of current flowing through the electrodes. The mounting portion 8201 may include a variety of sensors such as a temperature sensor, a pressure sensor, and an acceleration sensor to have a function of displaying the user's biological information on the display portion 8204, a function of changing an image displayed on the display portion 8204 in accordance with the movement of the user's head, and the like.

Figure 33A:
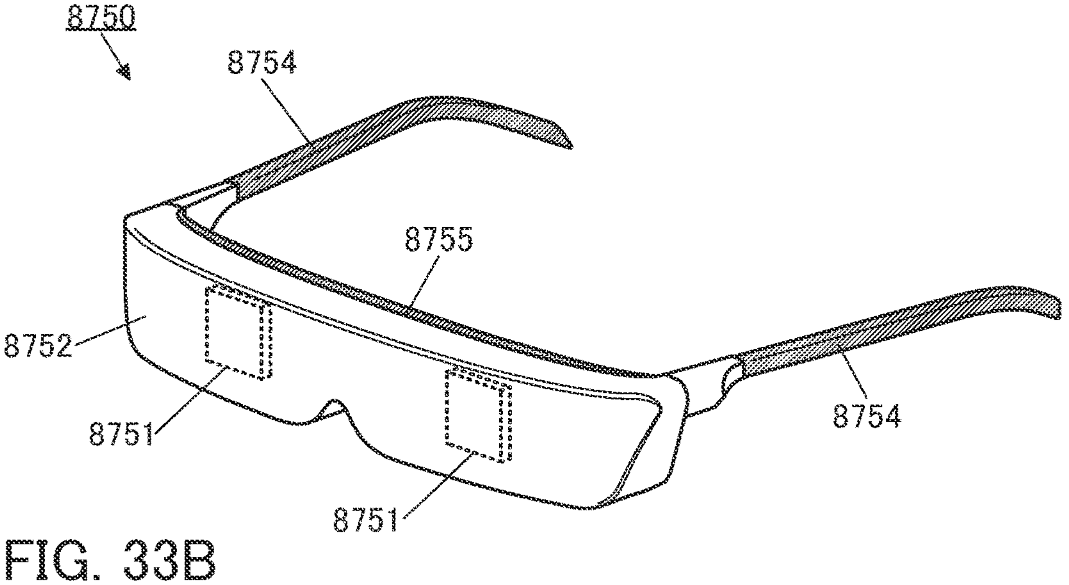
FIG. 33A to FIG. 33C are diagrams illustrating structure examples of electronic devices.
Figure 33B:
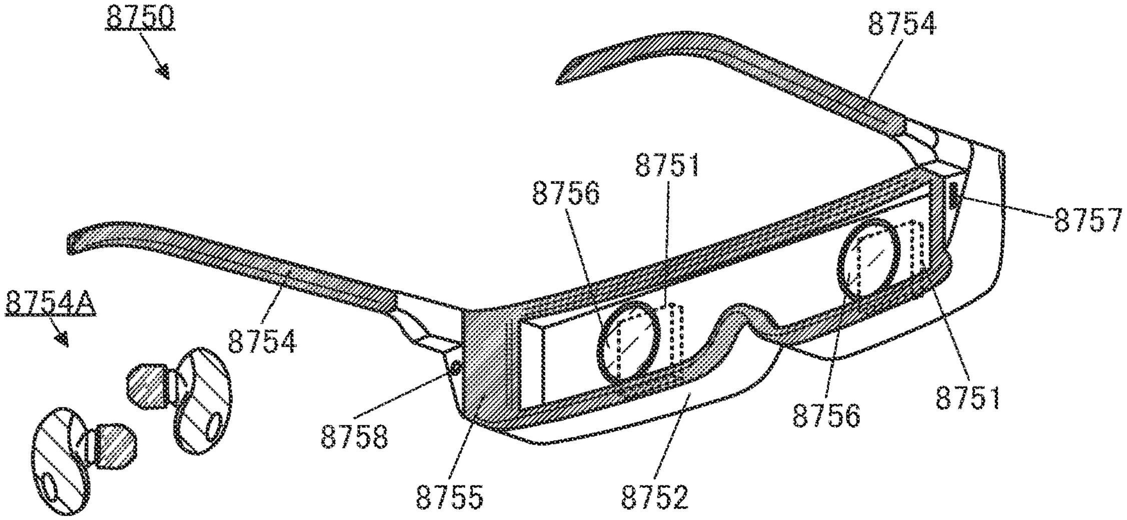
Figure 33C:
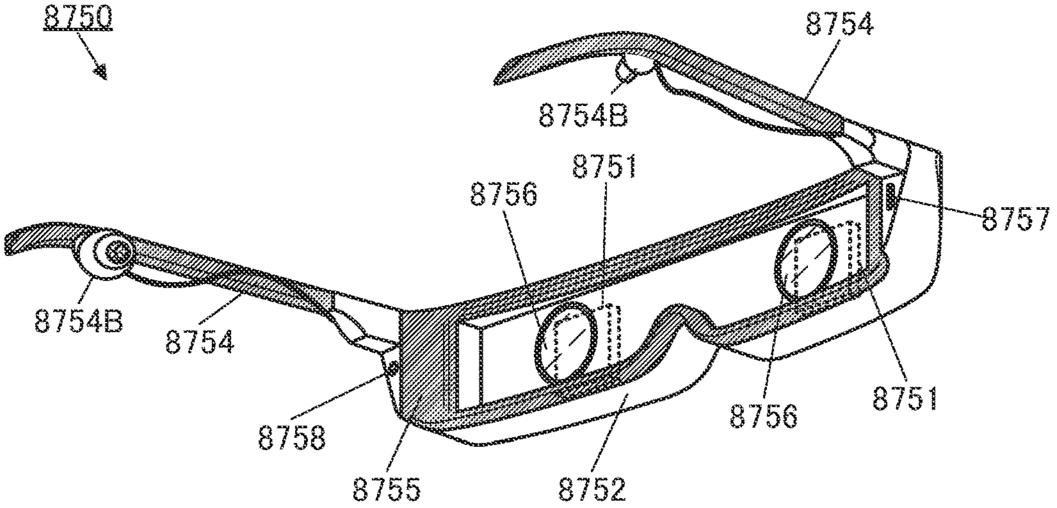

FIG. 33A to FIG. 33C are diagrams illustrating an appearance of an electronic device 8750, which is different from the electronic devices 8300 illustrated in FIG. 31A to FIG. 31D and FIG. 32A to FIG. 32C and the electronic device 8200 illustrated in FIG. 32D.

FIG. 33A is a perspective view illustrating the front surface, the top surface, and the left side surface of the electronic device 8750, and FIG. 33B and FIG. 33C are each a perspective view illustrating the back surface, the bottom surface, and the right side surface of the electronic device 8750.

The electronic device 8750 includes a pair of display apparatuses 8751, a housing 8752, a pair of mounting portions 8754, a cushion 8755, a pair of lenses 8756, and the like. The pair of display apparatuses 8751 is positioned to be seen through the lenses 8756 inside the housing 8752.

Here, one of the pair of display apparatuses 8751 corresponds to the display apparatus DSP described in Embodiment 1, for example. Although not illustrated, the electronic device 8750 illustrated in FIG. 33A to FIG. 33C includes an electronic component including the processing unit described in the above embodiment (e.g., the circuits included in the peripheral circuit PRPH illustrated in FIG. 6 and the circuits included in the head-mounted display HMD illustrated in FIG. 10). Although not illustrated, the electronic device 8750 illustrated in FIG. 33A to FIG. 33C includes a camera. The camera can take an image of the user's eye and its periphery. Although not illustrated, in the housing 8752 of the electronic device 8750 illustrated in FIG. 33A to FIG. 33C, a motion detection portion, an audio, a control portion, a communication portion, and a battery are provided.

The electronic device 8750 is an electronic device for VR. A user wearing the electronic device 8750 can see an image displayed on the display apparatus 8751 through the lens 8756. Furthermore, the pair of display apparatuses 8751 may display different images, whereby three-dimensional display using parallax can be performed.

An input terminal 8757 and an output terminal 8758 are provided on the back side of the housing 8752. To the input terminal 8757, a cable for supplying an image signal from an image output device or power for charging a battery provided in the housing 8752 can be connected. The output terminal 8758 can function as, for example, an audio output terminal to which earphones or headphones can be connected.

The housing 8752 preferably includes a mechanism by which the left and right positions of the lens 8756 and the display apparatus 8751 can be adjusted to the optimal positions in accordance with the position of the user's eye. In addition, the housing 8752 preferably includes a mechanism for adjusting focus by changing the distance between the lens 8756 and the display apparatus 8751.

With use of the camera, the display apparatus 8751, and the electronic component, the electronic device 8750 can estimate the state of a user of the electronic device 8750 and can display information on the estimated user's state on the display apparatus 8751. Alternatively, information on a state of a user of an electronic device connected to the electronic device 8750 through a network can be displayed on the display apparatus 8751.

The cushion 8755 is a portion in contact with the user's face (e.g., forehead and cheek). The cushion 8755 is in close contact with the user's face, so that light leakage can be prevented, which increases the sense of immersion. A soft material is preferably used for the cushion 8755 so that the cushion 8755 is in close contact with the face of the user wearing the electronic device 8750. For example, any of materials such as rubber, silicone rubber, urethane, and sponge can be used. Furthermore, when a sponge whose surface is covered with cloth or leather (for example, natural leather and synthetic leather) is used, a gap is unlikely to be generated between the user's face and the cushion 8755, whereby light leakage can be suitably prevented. Furthermore, using such a material is preferable because it has a soft texture and the user does not feel cold when wearing the device in a cold season, for example. The member in contact with user's skin, such as the cushion 8755 or the mounting portion 8754, is preferably detachable because cleaning or replacement can be easily performed.

The electronic device in this embodiment may further include earphones 8754A. The earphones 8754A include a communication portion (not illustrated) and have a wireless communication function. The earphones 8754A can output audio data with the wireless communication function. Note that the earphones 8754A may include a vibration mechanism to function as bone-conduction earphones.

Like earphones 8754B illustrated in FIG. 33C, the earphones 8754A can be connected to the mounting portion 8754 directly or by wiring. The earphones 8754B and the mounting portion 8754 may each have a magnet. This is preferable because the earphones 8754B can be fixed to the mounting portion 8754 with magnetic force and thus can be easily housed.

The earphones 8754A may include a sensor portion. With use of the sensor portion, the state of the user of the electronic device can be estimated.

The electronic device of one embodiment of the present invention may include one or more selected from an antenna, a battery, a camera, a speaker, a microphone, a touch sensor, and an operation button, in addition to any one of the above components.

The electronic device of one embodiment of the present invention may include a secondary battery, and it is preferable that the secondary battery be capable of being charged by contactless power transmission.

Examples of the secondary battery include a lithium ion secondary battery (e.g., a lithium polymer battery using a gel electrolyte (lithium ion polymer battery)), a nickel-hydride battery, a nickel-cadmium battery, an organic radical battery, a lead-acid battery, an air secondary battery, a nickel-zinc battery, and a silver-zinc battery.

The electronic device of one embodiment of the present invention may include an antenna. When a signal is received by the antenna, the electronic device can display an image, information, or the like on a display portion. When the electronic device includes an antenna and a secondary battery, the antenna may be used for contactless power transmission.

A display portion in an electronic device of one embodiment of the present invention can display an image with a screen resolution of, for example, full high definition, 4K2K, 8K4K, 16K8K, or higher.

Note that this embodiment can be combined with any of the other embodiments described in this specification as appropriate.

Embodiment 6

In this embodiment, electronic devices each including a display apparatus fabricated using one embodiment of the present invention will be described.

Electronic devices described below as examples each include the display apparatus of one embodiment of the present invention in a display portion. Thus, the electronic devices achieve high screen resolution. In addition, the electronic devices can each achieve both high screen resolution and a large screen.

One embodiment of the present invention includes the display apparatus and one or more selected from an antenna, a battery, a housing, a camera, a speaker, a microphone, a touch sensor, and an operation button.

The electronic device of one embodiment of the present invention may include the secondary battery described in Embodiment 5, and it is preferable that the secondary battery be capable of being charged by contactless power transmission.

As the secondary battery, the secondary battery described in Embodiment 5 can be used, for example.

The electronic device of one embodiment of the present invention may include the antenna described in Embodiment 5.

A display portion in an electronic device of one embodiment of the present invention can display an image with a screen resolution of, for example, full high vision, 4K2K, 8K4K, 16K8K, or higher.

Examples of the electronic devices include electronic devices with relatively large screens, such as a television device, a laptop personal computer, a monitor device, digital signage, a pachinko machine, and a game machine. Moreover, examples of electronic devices with relatively small screens include a digital camera, a digital video camera, a digital photo frame, a mobile phone, a portable game machine, a portable information terminal, and an audio reproducing device.

The electronic device using one embodiment of the present invention can be incorporated along a surface (e.g., a flat surface and a curved surface) of an inner wall or an outer wall of a building (e.g., a house, a commercial facility and an industrial facility) or an interior or exterior surface (e.g., a flat surface and a curved surface) of a moving object (e.g., a car, a train, a ship, and a flying object).

[Mobile Phone]

Figure 34A:
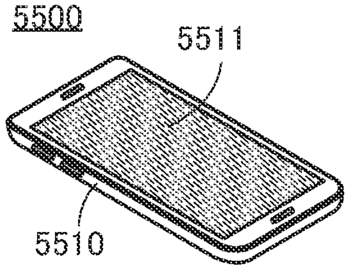
FIG. 34A to FIG. 34H are diagrams illustrating structure examples of electronic devices.

An information terminal 5500 illustrated in FIG. 34A is a mobile phone (smartphone), which is a type of information terminal. The information terminal 5500 includes a housing 5510 and a display portion 5511, and as input interfaces, a touch panel is provided in the display portion 5511 and a button is provided in the housing 5510.

The display portion 5511 of the information terminal 5500 can be divided into an image region for displaying an image and a black region for displaying black and a character string by including the display apparatus described in the above embodiment.

[Wearable Terminal]

Figure 34B:
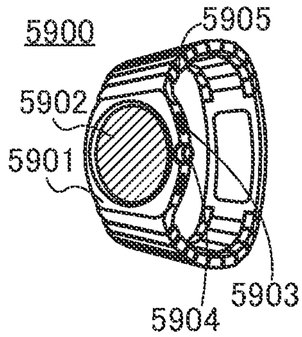

FIG. 34B is an external view of an information terminal 5900 that is an example of a wearable terminal. The information terminal 5900 includes a housing 5901, a display portion 5902, an operation button 5903, a crown 5904, and a band 5905.

The display portion 5902 of the wearable terminal can be divided into an image region for displaying an image and a black region for displaying black and a character string by including the display apparatus described in the above embodiment.

[Information terminal]

Figure 34C:
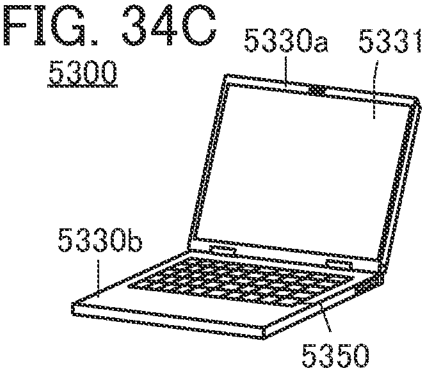

FIG. 34C illustrates a laptop information terminal 5300. The laptop information terminal 5300 illustrated in FIG. 24C includes, for example, a display portion 5331 in a housing 5330*a* and a keyboard portion 5350 in a housing 5330*b*.

Like the information terminal 5500 described above, the display portion 5331 of the laptop information terminal 5300 can be divided into an image region for displaying an image and a black region for displaying black and a character string by including the display apparatus described in the above embodiment.

Although the smartphone, the wearable terminal, and the laptop information terminal are respectively illustrated in FIG. 34A to FIG. 34C as examples of the electronic devices, one embodiment of the present invention can be used for information terminals other than a smartphone, a wearable terminal, and a laptop information terminal. Examples of information terminals other than a smartphone, a wearable terminal, and a laptop information terminal include a PDA (Personal Digital Assistant), a desktop information terminal, and a workstation.

[Camera]

Figure 34D:
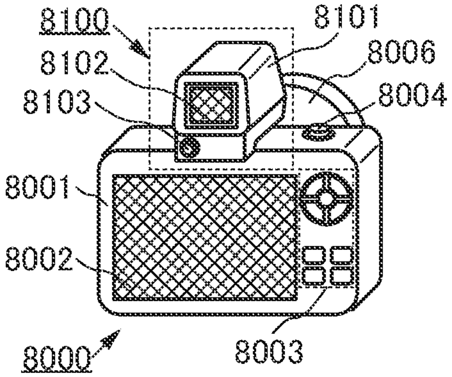

FIG. 34D is an external view of a camera 8000 to which a finder 8100 is attached.

The camera 8000 includes a housing 8001, a display portion 8002, operation buttons 8003, a shutter button 8004, and the like. In addition, a detachable lens 8006 is attached to the camera 8000.

Note that the lens 8006 and the housing may be integrated with each other in the camera 8000.

The camera 8000 can take images by the press of the shutter button 8004 or touch on the display portion 8002 functioning as a touch panel.

The housing 8001 includes a mount including an electrode, so that, in addition to the finder 8100, a stroboscope or the like can be connected to the housing.

The finder 8100 includes a housing 8101, a display portion 8102, and a button 8103.

The housing 8101 is attached to the camera 8000 in engagement with a mount of the camera 8000. In the finder 8100, an image or the like received from the camera 8000 can be displayed on the display portion 8102.

The button 8103 has a function of a power button.

The display apparatus of one embodiment of the present invention can be used for the display portion 8002 of the camera 8000 and the display portion 8102 of the finder 8100. Note that a finder may be incorporated in the camera 8000.

[Game Machine]

Figure 34E:
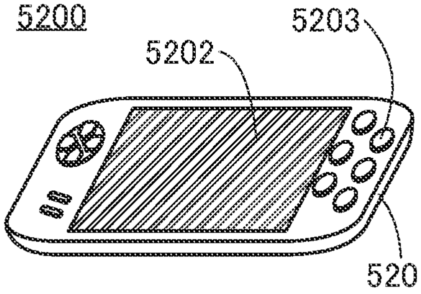

FIG. 34E is an external view of a portable game machine 5200 which is an example of a game machine. The portable game machine 5200 includes a housing 5201, a display portion 5202, and a button 5203.

Images displayed on the portable game machine 5200 can be output with a display apparatus such as a television device, a personal computer display, a game display, or a head-mounted display, for example.

The display portion 5202 of the portable game machine 5200 can be divided into an image region for displaying an image and a black region for displaying black and a character string by including the display apparatus described in the above embodiment. In addition, the portable game machine 5200 with low power consumption can be provided. Moreover, heat generation from a circuit can be reduced owing to low power consumption; thus, the influence of heat generation on the circuit itself, a peripheral circuit, and a module can be reduced.

Although FIG. 34E illustrates the portable game machine as an example of a game machine, the electronic device of one embodiment of the present invention is not limited thereto. Examples of the electronic device of one embodiment of the present invention include a stationary game machine, an arcade game machine installed in entertainment facilities (e.g., a game center and an amusement park), and a throwing machine for batting practice installed in sports facilities.

<Television Device>

Figure 34F:
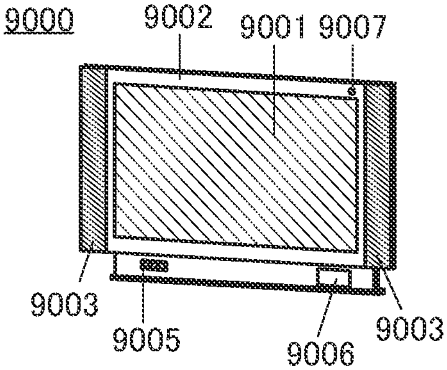

FIG. 34F is a perspective view illustrating a television device. A television device 9000 includes a housing 9002, a display portion 9001, speakers 9003, an operation key 9005 (including a power switch or an operation switch), a connection terminal 9006, and a sensor 9007 (a sensor having a function of measuring force, displacement, a position, speed, acceleration, angular velocity, rotational frequency, distance, light, liquid, magnetism, temperature, a chemical substance, sound, time, hardness, an electric field, current, voltage, power, radiation, a flow rate, humidity, gradient, oscillation, an odor, or infrared rays). The memory device of one embodiment of the present invention can be provided in the television device. The television device can include the display portion 9001 of, for example, 50 inches or more or 100 inches or more.

The display portion 9001 of the television device 9000 can be divided into an image region for displaying an image and a black region for displaying black and a character string by including the display apparatus described in the above embodiment. In addition, the television device 9000 with low power consumption can be provided. Moreover, heat generation from a circuit can be reduced owing to low power consumption; thus, the influence of heat generation on the circuit itself, a peripheral circuit, and a module can be reduced.

<Moving Vehicle>

The display apparatus of one embodiment of the present invention can be used around a driver's seat in a car, which is a moving vehicle.

Figure 34G:
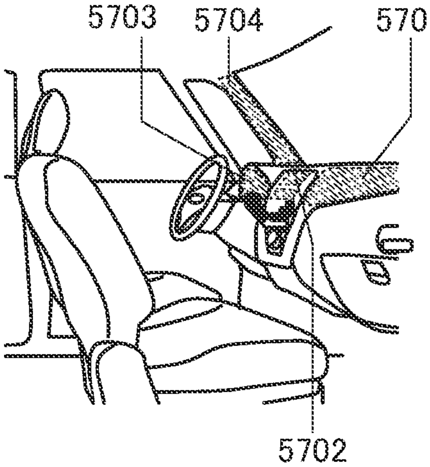

FIG. 34G is a diagram illustrating an area around a windshield inside a car. FIG. 34G illustrates a display panel 5701, a display panel 5702, and a display panel 5703 that are attached to a dashboard and a display panel 5704 that is attached to a pillar.

The display panel 5701 to the display panel 5703 can provide a variety of kinds of information by displaying navigation information, a speedometer, a tachometer, a mileage, a fuel meter, a gearshift indicator, and air-condition settings, for example. The content and layout of the display on the display panels can be changed appropriately to suit the user's preferences, so that the design can be improved. The display panel 5701 to the display panel 5703 can also be used as lighting devices.

The display panel 5704 can compensate for the view obstructed by the pillar (blind areas) by showing an image taken by an imaging unit provided for the car body. That is, showing an image taken by an imaging unit provided on the outside of the car body leads to elimination of blind areas and enhancement of safety. Display of an image that complements for a portion that cannot be seen makes it possible to confirm safety more naturally and comfortably. The display panel 5704 can also be used as a lighting device.

The display apparatus of one embodiment of the present invention can be used for the display panel 5701 to the display panel 5704, for example.

Although a car is described above as an example of a moving vehicle, the moving vehicle is not limited to a car. Examples of moving vehicles include a train, a monorail train, a ship, and a flying object (e.g., a helicopter, an unmanned aircraft (a drone), an airplane, and a rocket), and these moving vehicles can include the display apparatus of one embodiment of the present invention.

[Digital Signage]

Figure 34H:
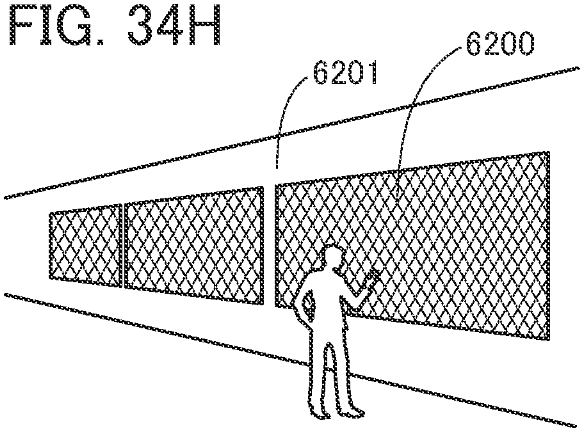

FIG. 34H illustrates an example of digital signage that can be attached to a wall. FIG. 34H illustrates a state where digital signage 6200 is attached to a wall 6201. The display apparatus of one embodiment of the present invention can be used in a display portion of the digital signage 6200, for example. An interface such as a touch panel may be provided in the digital signage 6200, for example.

Although the electronic device attachable to a wall is described above as an example of digital signage, the kind of digital signage is not limited thereto. Examples of the digital signage include digital signage attached to a pillar, freestanding digital signage placed on the ground, and digital signage mounted on a rooftop or a side wall of an architecture such as a building.

Note that this embodiment can be combined with any of the other embodiments described in this specification as appropriate.

REFERENCE NUMERALS

DSP: display apparatus, DIS: display portion, MA: image region, BA: black region, BA1: black region, BA2: black region, BA3: black region, BA4: black region, LA: character string, LA1: character string, LA2: character string. LA3: character string, LA4: character string, CSB: center portion, LI: image, ARA: display region, ARD: circuit region, SICL: circuit layer, LINL: wiring layer, PXAL: pixel layer, BS: substrate, DRV: driver circuit region, LIA: region, SDS: circuit, SD: driver circuit, GDS: circuit, GD: driver circuit, PRPH: peripheral circuit, DMG: distribution circuit, DMS: distribution circuit, CTR: control unit, MD: memory device, PG: voltage generation circuit, TMC: timing controller, CKS: clock signal generation circuit, CK1: circuit, CK2: circuit, GPS: image processing unit, GP1: circuit, GP2: circuit, INT: interface BW: bus wiring, HMD: head-mounted display, SNC: sensor, SOP: sound output portion, SIP: sound input portion, MU: memory 20) unit, CP: control portion, PGP: image generation portion, HKB: conversion portion, ANT: antenna. BE: bus wiring. RMC: controller, SMP: information terminal, UR: user, OTH: another person, SND: sound, WV: wireless signal, ST1: step. ST2: step, ST3: step, ST4: step, ST5: step, SU1: step, SU2: step, SU3: step, SU4: step, SU5: step, SV1: step, SV2: step, SV3: step, SV4: step, SV5: step, SV6: step. SW1: step, SW2: step, SW3: step, SW4: step, SW5: step, SW6: step, SW7: step, OSL: layer, EML: layer, ANO: wiring, VCOM: wiring, V0: wiring, SL: wiring, GL: wiring, GL1: wiring, GL2: wiring. GL3: wiring, 30: driver circuit, 70A: pixel, 70B: pixel, 80: pixel, 80*a*: subpixel, 80*b*: subpixel, 80*c*: subpixel, 80*d*: subpixel, 102: substrate, 111*a*: insulator, 111*b*: insulator, 112: insulator, 113: insulator, 113*a*: insulator, 113*b*: insulator, 113*c*: insulator, 118: sacrificial layer, 119: sacrificial layer, 121*a*: conductor, 121*b*: conductor, 121*c*: conductor, 121CM: conductor, 122*a*: conductor, 122*b*: conductor, 122*c*: conductor, 123: conductor, 123CM: region, 141: EL layer, 141*a*: EL layer, 141*b*: EL layer, 141*c*: EL layer, 142: EL layer, 150: light-emitting device, 150*a*: light-emitting device, 150*b*: light-emitting device, 150*c*: light-emitting device, 162: insulator, 163: resin layer, 164: adhesive layer, 165: adhesive layer, 166*a*: coloring layer, 166*b*: coloring layer, 166*c*: coloring layer, 200: transistor, 202: insulator, 210): substrate, 214: insulator, 216: conductor, 220; insulator, 222: insulator, 224: insulator, 226: insulator, 228: conductor, 230: conductor, 250): insulator, 300: transistor, 310: substrate, 312: element isolation layer, 313: semiconductor region, 314*a*: low-resistance region, 314*b*: low-resistance region, 315: insulator, 316: conductor, 317: insulator, 320: insulator, 322: insulator, 324: insulator, 326: insulator, 328: conductor, 330: conductor, 350: insulator, 352: insulator, 354: insulator, 356: conductor, 360: insulator, 362: insulator, 364: insulator, 366: conductor, 370: insulator, 372: insulator, 376: conductor, 380: insulator, 400: pixel circuit, 400A: pixel circuit, 400B: pixel circuit, 400C: pixel circuit, 400D: pixel circuit, 400E: pixel circuit, 400F: pixel circuit, 400G: pixel circuit, 400H: pixel circuit, 500: transistor, 500A: transistor, 500B: transistor, 500C: transistor, 500D: transistor, 501: substrate, 512: insulator, 514: insulator, 540: conductor, 576: insulator, 581: insulator, 600: capacitor, 600A: capacitor, 1000: display apparatus, 1280: display module, 1281: display portion, 1290: FPC, 1282: circuit portion, 1283: pixel circuit portion, 1283*a*: pixel circuit, 1284: pixel portion, 1284*a*: pixel, 1285: terminal portion, 1286: wiring portion, 1291: substrate, 1292: substrate, 1430*a*: light-emitting device, 1430*b*: light-emitting device, 1430*c*: light-emitting device, 4400*a*: light-emitting unit, 4400*b*: light-emitting unit, 4411: light-emitting layer, 4412: light-emitting layer, 4413: light-emitting layer, 4420: layer, 4420-1: layer, 4420-2: layer, 4430: layer, 4430-1: layer, 4430-2: layer, 4440: intermediate layer, 5200: portable game machine, 5201: housing, 5202: display portion, 5203: button, 5300: laptop information terminal, 5330*a*: housing, 5330*b*: housing, 5331: display portion, 5350: key board portion, 5500: information terminal, 5510: housing, 5511: display portion, 5701: display panel, 5702: display panel, 5703: display panel, 5704: display panel, 5900: information terminal, 5901: housing, 5902: display portion, 5903: operation button, 5904: crown, 5905: band, 6200: digital signage, 6201: wall, 8000: camera, 8001: housing, 8002: display portion, 8003: operation button, 8004: shutter button, 8006: lens, 8100: finder, 8101: housing, 8102: display portion, 8103: button, 8200: electronic device, 8201: mounting portion, 8202: lens, 8203: main body, 8204: display portion, 8205: cable, 8206: battery, 8300: electronic device, 8301: housing, 8302: display portion, 8303: operation button, 8304: fixing unit, 8304*a*: fixing unit, 8305: lens, 8306: dial, 8307: dial, 8308: driver portion, 8310: user, 8311: user, 8750: electronic device, 8751: display apparatus, 8752: housing, 8754: mounting portion, 8754A: earphones, 8754B: earphones, 8756: lens, 8757: input terminal, 8758: output terminal, 9000: television device, 9001: display portion, 9002: housing, 9003: speaker, 9005: operation key, 9006: connection terminal, 9007: sensor

The invention claimed is:

1. A display apparatus comprising:

a display portion including a first region and a second region;

a first driver circuit electrically connected to the first region;

a second driver circuit electrically connected to the second region;

a first circuit configured to generate a first image signal corresponding to a first image;

a second circuit configured to generate a second image signal corresponding to a second image;

a first signal generation circuit configured to generate a clock signal with a first frame frequency;

a second signal generation circuit configured to generate a clock signal with a second frame frequency; and a voltage generation circuit configured to generate power supply voltages supplied to the first circuit, the second circuit, the first signal generation circuit, and the second signal generation circuit, wherein the voltage generation circuit stops supply of voltage to the first circuit, the second circuit, the first signal generation circuit, and the second signal generation circuit in a period in which a still image is displayed on the display portion, wherein, when an aspect ratio of an image displayed on the display portion is greater than an aspect ratio of the display apparatus, the image is displayed on the first region so as to be in contact with left and right edges of the display portion, wherein black is displayed in the second region so as to be in contact with the left and right edges of the display portion, wherein the first image is a moving image, wherein the second image is a still image and contains a first character string, wherein a frame frequency of the second region is higher than or equal to $\frac{1}{60}$ Hz and lower than or equal to 10 Hz, wherein the first frame frequency is higher than the second frame frequency, wherein the display apparatus is configured to display the first image on the first region with the first frame frequency when the first image signal is transmitted to the first driver circuit, and wherein the display apparatus is configured to display the second image on the second region with the second frame frequency when the second image signal is transmitted to the second driver circuit.

2. The display apparatus according to claim 1, wherein when a length of a diagonal line of the display portion is L, a center portion of the display portion is a circular region having an intersection portion of two diagonal lines of the display portion as a center and a radius of L/64 or less, and wherein the first region includes a region overlapping with the center portion.

3. An electronic device comprising:

the display apparatus according to claim 1;

a sound input portion;

a conversion portion; and an image generation portion, wherein the sound input portion is configured to obtain an external sound, wherein the conversion portion is configured to generate text information corresponding to the external sound, wherein the image generation portion is configured to generate data of the second image containing a second character string corresponding to the text information, and wherein the second circuit is configured to obtain the data and to generate the second image signal corresponding to the second image.

4. An electronic device comprising:

the display apparatus according to claim 1;

a sensor;

a conversion portion; and an image generation portion, wherein the sensor is configured to capture movement of a person or an object, wherein the conversion portion is configured to generate text information corresponding to the captured movement, wherein the image generation portion is configured to generate data of the second image containing a second character string corresponding to the text information, and wherein the second circuit is configured to obtain the data and to generate the second image signal corresponding to the second image.

5. An electronic device comprising:

the display apparatus according to claim 1;

an antenna;

a conversion portion; and an image generation portion, wherein the antenna is configured to receive notification information from an external device, wherein the conversion portion is configured to generate text information corresponding to the notification information received by the antenna, wherein the image generation portion is configured to generate data of the second image containing a second character string corresponding to the text information, and wherein the second circuit is configured to obtain the data and to generate the second image signal corresponding to the second image.

* * * * *